(12) United States Patent
Mikuriya et al.

(10) Patent No.: US 7,330,788 B2
(45) Date of Patent: Feb. 12, 2008

(54) DATA ARCHITECTURE OF MAP DATA, DATA ARCHITECTURE OF UPDATE INSTRUCTION DATA, MAP INFORMATION PROCESSING APPARATUS, AND MAP INFORMATION PROVIDING APPARATUS

(75) Inventors: Makoto Mikuriya, Tokyo (JP); Mitsuo Shimotani, Tokyo (JP); Masaharu Umezu, Tokyo (JP); Tomoya Ikeuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/331,094

(22) Filed: Jan. 13, 2006

(65) Prior Publication Data
US 2006/0122771 A1 Jun. 8, 2006

Related U.S. Application Data

(62) Division of application No. 10/687,887, filed on Oct. 20, 2003.

(30) Foreign Application Priority Data
Nov. 1, 2002 (JP) ............................. 2002-320161

(51) Int. Cl.
*G01C 21/30* (2006.01)
*G08G 1/123* (2006.01)
*G06F 12/12* (2006.01)

(52) U.S. Cl. ................. 701/208; 701/210; 340/995.12; 340/995.18; 707/200; 707/203

(58) Field of Classification Search ................ 701/200, 701/208, 210, 201, 206, 209, 25, 26, 36; 340/988, 990, 995.1, 995.12, 995.14, 995.16, 340/995.18; 707/100, 103, 104.1, 200, 203
See application file for complete search history.

(56) References Cited

U.S. PATENT DOCUMENTS 5,289,184 A * 2/1994 Suzuki ....................... 340/905
6,230,098 B1 * 5/2001 Ando et al. .................. 701/208

(Continued)

FOREIGN PATENT DOCUMENTS

JP          8-69247 A       3/1996

(Continued)

*Primary Examiner*—Jack Keith
*Assistant Examiner*—Edward Pipala
(74) *Attorney, Agent, or Firm*—Birch, Stewart, Kolasch & Birch, LLP

(57) ABSTRACT

In a road data frame for displaying road maps, each node/link data record describing a link corresponding to a road part includes link identification information identifying an original link, and auxiliary link identification information used for identifying a plurality of alternative links which substitute for any of the original links in the map data. In a route planning data frame for route planning, each connection record describing the interconnection of nodes also includes corresponding link identification information identifying an original link, and corresponding auxiliary link identification information used for identifying a plurality of alternative links which substitute for any of the original links in the map data. By means of identification information of the original link and auxiliary links, it is facilitated to identify the correlation among links in the road data frame and the route planning data frame having different versions.

10 Claims, 33 Drawing Sheets

U.S. PATENT DOCUMENTS

| | | | |
|---|---|---|---|
| 6,546,334 B1 * | 4/2003 | Fukuchi et al. | 701/208 |
| 6,546,344 B1 * | 4/2003 | Rodrian et al. | 702/65 |
| 6,704,649 B2 * | 3/2004 | Miyahara | 701/208 |
| 6,766,248 B2 * | 7/2004 | Miyahara | 701/208 |
| 6,868,334 B2 * | 3/2005 | Nakane et al. | 701/208 |
| 7,079,946 B2 * | 7/2006 | Hunzinger | 701/208 |
| 2002/0004701 A1 * | 1/2002 | Nakano | 701/200 |
| 2002/0091485 A1 | 7/2002 | Mikuriya et al. | |
| 2003/0204308 A1 * | 10/2003 | Uchida | 701/209 |

FOREIGN PATENT DOCUMENTS

| | | |
|---|---|---|
| JP | 8-292716 A | 5/1996 |

* cited by examiner

FIG.11

MULTILINK DATA RECORD MR0

| DATA ITEM | | NODE/LINK DATA RECORD | | | | | |
|---|---|---|---|---|---|---|---|
| | | NLR00 | NLR01 | NLR02 | NLR03 | NLR04 | NLR05 |
| NODE/LINK DATA HEADER | TOTAL # OF INTERMEDIATE POINTS | 1 | 1 | 0 | 2 | 1 | 0 |
| | AUXILIARY DISPLAY-RELATED LINK ID PRESENCE INFORMATION | ABSENT | ABSENT | ABSENT | ABSENT | ABSENT | ABSENT |
| INTERSECTION DESCRIPTION | MULTILINK # | -1 | 2 | 3 | 4 | 5 | -1 |
| | NODE/LINK DATA # | -1 | 0 | 0 | 0 | 0 | -1 |
| COORDINATES OF NODE | | COORDINATES OF Nd0 | COORDINATES OF Nd1 | COORDINATES OF Nd2 | COORDINATES OF Nd3 | COORDINATES OF Nd4 | COORDINATES OF Nd5 |
| DISPLAY-RELATED LINK ID INFORMATION | | 100 | 101 | 102 | 103 | 104 | -1 |
| AUXILIARY DISPLAY-RELATED LINK ID INFORMATION | | NULL | NULL | NULL | NULL | NULL | NULL |
| INTERMEDIATE POINT INFORMATION | | COORDINATES OF P0 | COORDINATES OF P1 | ABSENT | COORDINATES OF P2 AND P3 | COORDINATES OF P4 | ABSENT |

MULTILINK DATA RECORD MR5

| DATA ITEM | | NODE/LINK DATA RECORD | |
|---|---|---|---|
| | | NLR50 | NLR51 |
| NODE/LINK DATA HEADER | TOTAL # OF INTERMEDIATE POINTS | 4 | 0 |
| | AUXILIARY DISPLAY-RELATED LINK ID PRESENCE INFORMATION | ABSENT | ABSENT |
| INTERSECTION DESCRIPTION | MULTILINK # | 0 | 1 |
| | NODE/LINK DATA # | 4 | 4 |
| COORDINATES OF NODE | | COORDINATES OF Nd4' | COORDINATES OF Nd10' |
| DISPLAY-RELATED LINK ID INFORMATION | | 113 | -1 |
| AUXILIARY DISPLAY-RELATED LINK ID INFORMATION | | NULL | NULL |
| INTERMEDIATE POINT INFORMATION | | COORDINATES OF P21-P24 | ABSENT |

FIG.12

MULTILINK DATA RECORD MR1

| DATA ITEM | | NODE/LINK DATA RECORD | | | | | |
|---|---|---|---|---|---|---|---|
| | | NLR10 | NLR11 | NLR12 | NLR13 | NL104 | NLR15 |
| NODE/LINK DATA HEADER | TOTAL # OF INTERMEDIATE POINTS | 1 | 1 | 0 | 2 | 1 | 0 |
| | AUXILIARY DISPLAY-RELATED LINK ID PRESENCE INFORMATION | ABSENT | ABSENT | ABSENT | ABSENT | ABSENT | ABSENT |
| INTERSECTION DESCRIPTION | MULTILINK # | -1 | 2 | 3 | 4 | 5 | -1 |
| | NODE/LINK DATA # | -1 | 1 | 1 | 1 | 1 | -1 |
| COORDINATES OF NODE | | COORDINATES OF Nd6 | COORDINATES OF Nd7 | COORDINATES OF Nd8 | COORDINATES OF Nd9 | COORDINATES OF Nd10 | COORDINATES OF Nd11 |
| DISPLAY-RELATED LINK ID INFORMATION | | 105 | 106 | 107 | 108 | 109 | -1 |
| AUXILIARY DISPLAY-RELATED LINK ID INFORMATION | | NULL | NULL | NULL | NULL | NULL | NULL |
| INTERMEDIATE POINT INFORMATION | | COORDINATES OF P5 | COORDINATES OF P6 | ABSENT | COORDINATES OF P7 AND P8 | COORDINATES OF P9 | ABSENT |

MULTILINK DATA RECORD MR3

| DATA ITEM | | NODE/LINK DATA RECORD | |
|---|---|---|---|
| | | NLR30 | NLR31 |
| NODE/LINK DATA HEADER | TOTAL # OF INTERMEDIATE POINTS | 5 | 0 |
| | AUXILIARY DISPLAY-RELATED LINK ID PRESENCE INFORMATION | ABSENT | ABSENT |
| INTERSECTION DESCRIPTION | MULTILINK # | 0 | 1 |
| | NODE/LINK DATA # | 2 | 2 |
| COORDINATES OF NODE | | COORDINATES OF Nd2' | COORDINATES OF Nd8' |
| DISPLAY-RELATED LINK ID INFORMATION | | 111 | -1 |
| AUXILIARY DISPLAY-RELATED LINK ID INFORMATION | | NULL | NULL |
| INTERMEDIATE POINT INFORMATION | | COORDINATES OF P13-P17 | ABSENT |

MULTILINK DATA RECORD MR0'

| DATA ITEM | | NODE/LINK DATA RECORD | | | | | | |
|---|---|---|---|---|---|---|---|---|
| | | NLR00 | NLR01 | NLR02 | NLR03' | NLR04I | NLR04 | NLR05 |
| NODE/LINK DATA HEADER | TOTAL # OF INTERMEDIATE POINTS | 1 | 1 | 0 | 1 | 1 | 1 | 0 |
| | AUXILIARY DISPLAY-RELATED LINK ID PRESENCE INFORMATION | ABSENT | ABSENT | ABSENT | PRESENT | PRESENT | ABSENT | ABSENT |
| INTERSECTION DESCRIPTION | MULTILINK # | -1 | 2 | 3 | 4 | 6 | 5 | -1 |
| | NODE/LINK DATA # | -1 | 0 | 0 | 0 | 0 | 0 | -1 |
| COORDINATES OF NODE | | COOR-DINATES OF Nd0 | COOR-DINATES OF Nd1 | COOR-DINATES OF Nd2 | COOR-DINATES OF Nd3 | COOR-DINATES OF Nd12 | COOR-DINATES OF Nd4 | COOR-DINATES OF Nd5 |
| DISPLAY-RELATED LINK ID INFORMATION | | 100 | 101 | 102 | 103 | 103 | 104 | -1 |
| AUXILIARY DISPLAY-RELATED LINK ID INFORMATION | | NULL | NULL | NULL | 0 | 128 | NULL | NULL |
| INTERMEDIATE POINT INFORMATION | | COOR-DINATES OF P0 | COOR-DINATES OF P1 | ABSENT | COOR-DINATES OF P2 | COOR-DINATES OF P3 | COOR-DINATES OF P4 | ABSENT |

MULTILINK DATA RECORD MR5'

| DATA ITEM | | NODE/LINK DATA RECORD | |
|---|---|---|---|
| | | NLR50 | NLR51 |
| NODE/LINK DATA HEADER | TOTAL # OF INTERMEDIATE POINTS | 4 | 0 |
| | AUXILIARY DISPLAY-RELATED LINK ID PRESENCE INFORMATION | ABSENT | ABSENT |
| INTERSECTION DESCRIPTION | MULTILINK # | 0 | 1 |
| | NODE/LINK DATA # | 5 | 5 |
| COORDINATES OF NODE | | COORDINATES OF Nd4' | COORDINATES OF Nd10' |
| DISPLAY-RELATED LINK ID INFORMATION | | 113 | -1 |
| AUXILIARY DISPLAY-RELATED LINK ID INFORMATION | | NULL | NULL |
| INTERMEDIATE POINT INFORMATION | | COORDINATES OF P21-P24 | ABSENT |

MULTILINK DATA RECORD MR1'

| DATA ITEM | | NODE/LINK DATA RECORD | | | | | | |
|---|---|---|---|---|---|---|---|---|
| | | NLR10 | NLR11 | NLR12 | NLR13' | NLR14I | NLR14 | NLR15 |
| NODE/LINK DATA HEADER | TOTAL # OF INTERMEDIATE POINTS | 1 | 1 | 0 | 1 | 1 | 1 | 0 |
| | AUXILIARY DISPLAY-RELATED LINK ID PRESENCE INFORMATION | ABSENT | ABSENT | ABSENT | PRESENT | PRESENT | ABSENT | ABSENT |
| INTERSECTION DESCRIPTION | MULTILINK # | -1 | 2 | 3 | 4 | 6 | 5 | -1 |
| | NODE/LINK DATA # | -1 | 1 | 1 | 1 | 1 | 1 | -1 |
| COORDINATES OF NODE | | COORDINATES OF Nd6 | COORDINATES OF Nd7 | COORDINATES OF Nd8 | COORDINATES OF Nd9 | COORDINATES OF Nd13 | COORDINATES OF Nd10 | COORDINATES OF Nd11 |
| DISPLAY-RELATED LINK ID INFORMATION | | 105 | 106 | 107 | 108 | 108 | 109 | -1 |
| AUXILIARY DISPLAY-RELATED LINK ID INFORMATION | | NULL | NULL | NULL | 0 | 128 | NULL | NULL |
| INTERMEDIATE POINT INFORMATION | | COORDINATES OF P5 | COORDINATES OF P6 | ABSENT | COORDINATES OF P7 | COORDINATES OF P8 | COORDINATES OF P9 | ABSENT |

FIG.21

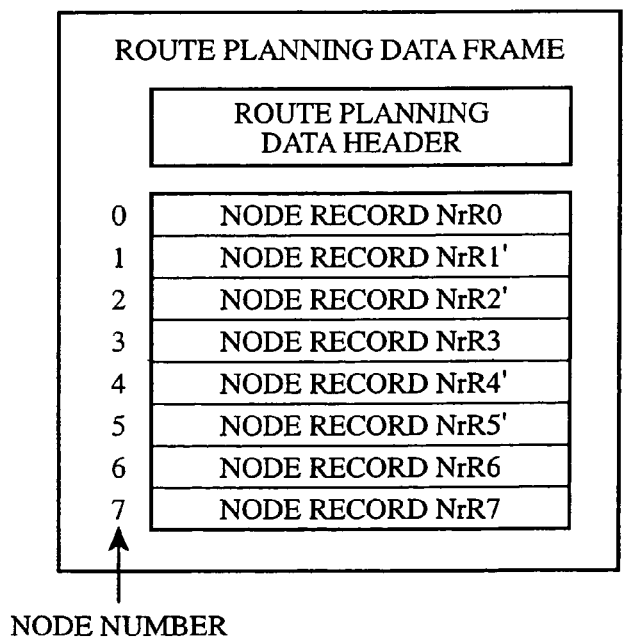

NODE NUMBER

FIG.22

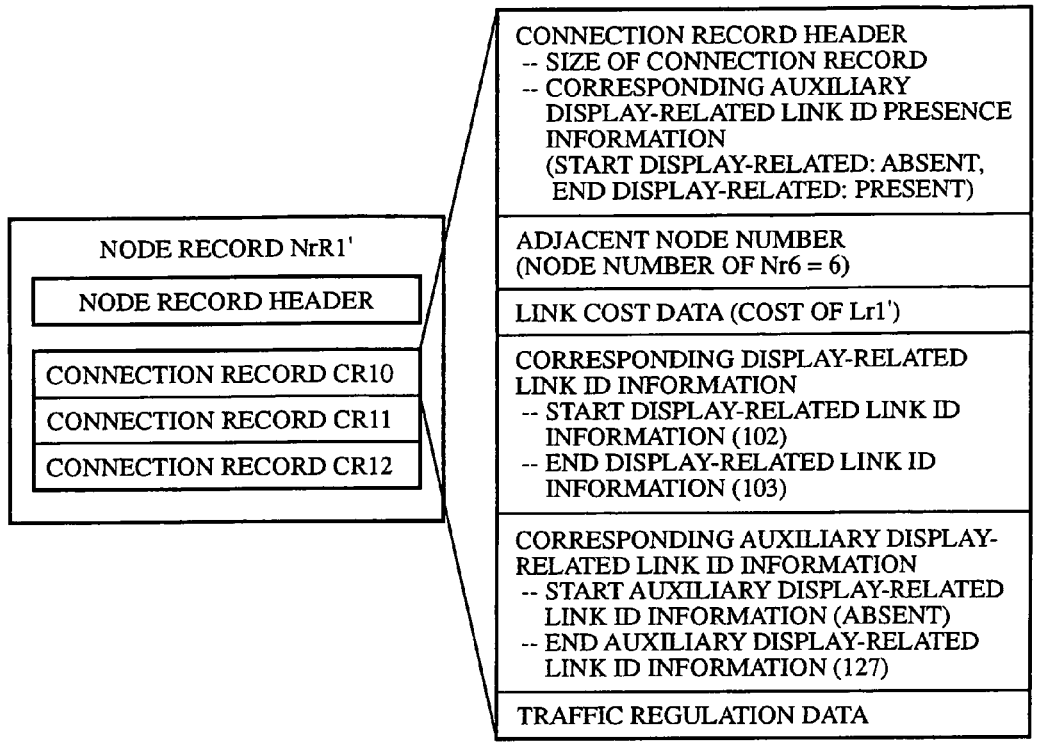

FIG.23

NODE RECORD NrR6

| DATA ITEM | | CONNECTION RECORD CR60 | CONNECTION RECORD CR61 | CONNECTION RECORD CR62 |
|---|---|---|---|---|
| CORRESPONDING AUXILIARY DISPLAY-RELATED LINK ID PRESENCE INFORMATION | START DISPLAY-RELATED | PRESENT | ABSENT | ABSENT |
| | END DISPLAY-RELATED | ABSENT | ABSENT | PRESENT |
| ADJACENT NODE NUMBER | | NODE NUMBER OF Nr2 = 2 | NODE NUMBER OF Nr7 = 7 | NODE NUMBER OF Nr1 = 1 |
| LINK COST DATA | | COST OF Lr1" | COST OF Lr5 | COST OF Lr1' |
| CORRESPONDING DISPLAY-RELATED LINK ID INFORMATION | START DISPLAY-RELATED | 103 | 114 | 102 |
| | END DISPLAY-RELATED | 104 | 114 | 103 |
| CORRESPONDING AUXILIARY DISPLAY-RELATED LINK ID INFORMATION | START DISPLAY-RELATED | 128 | NULL | NULL |
| | END DISPLAY-RELATED | NULL | NULL | 127 |

FIG.26A

- UPDATE INSTRUCTION DATA SET
  - UPDATE INSTRUCTION DATA HEADER
  - ...
  - UPDATE-OPERATION RECORD GROUP OPD1
  - UPDATE-OPERATION RECORD GROUP OPD2
  - UPDATE-OPERATION RECORD GROUP OPD3
  - ...

FIG.26B

| | | UPDATE-OPERATION RECORD 0 | UPDATE-OPERATION RECORD 1 | UPDATE-OPERATION RECORD 2 | UPDATE-OPERATION RECORD 3 |
|---|---|---|---|---|---|
| TYPE OF DATA TO BE UPDATED | | ROAD DATA FRAME | ROAD DATA FRAME | ROAD DATA FRAME | ROAD DATA FRAME |
| TYPE OF UPDATE-OPERATION | | OVERWRITING | DELETION | INSERTION | INSERTION |
| POSITION OF UPDATED SUBJECT | FIRST RECORD NUMBER | 0 | 0 | 0 | 0 |
| | SECOND RECORD NUMBER | −1 | 3 | 4 | 4 |
| | OFFSET OF UPDATED SUBJECT | −1 | −1 | −1 | −1 |
| | SIZE OF UPDATED SUBJECT | d0 | d1 | d2 | d3 |
| NEW EFFECTIVE SUBJECT | | MULTILINK HEADER | ABSENT | NODE/LINK DATA RECORD NLR03′ (NODE/LINK DATA NUMBER = 3) IN FIG. 19 | NODE/LINK DATA RECORD NLR04I (NODE/LINK DATA NUMBER = 4) IN FIG. 19 | d0: SIZE OF MULTILINK HEAD
d1: SIZE OF NODE/LINK DATA RECORD NLR03 (NODE/LINK DATA NUMBER = 3) IN FIG. 11
d2: SIZE OF NODE/LINK DATA RECORD NLR03′ (NODE/LINK DATA NUMBER = 3) IN FIG. 19
d3: SIZE OF NODE/LINK DATA RECORD NLR04I (NODE/LINK DATA NUMBER = 4) IN FIG. 19

FIG.27A

- UPDATE INSTRUCTION DATA SET
  - UPDATE INSTRUCTION DATA HEADER
  - ...
  - UPDATE-OPERATION RECORD GROUP OPR1
  - UPDATE-OPERATION RECORD GROUP OPR2
  - UPDATE-OPERATION RECORD GROUP OPR3
  - ...

FIG.27B

| | | UPDATE-OPERATION RECORD 0 | UPDATE-OPERATION RECORD 1 | UPDATE-OPERATION RECORD 2 |
|---|---|---|---|---|
| TYPE OF DATA TO BE UPDATED | | ROUTE PLANNING DATA FRAME | ROUTE PLANNING DATA FRAME | ROUTE PLANNING DATA FRAME |
| TYPE OF UPDATE-OPERATION | | OVERWRITING | DELETION | INSERTION |
| POSITION OF UPDATED SUBJECT | FIRST RECORD NUMBER | 1 | 1 | 1 |
| | SECOND RECORD NUMBER | -1 | 0 | 1 |
| | OFFSET OF UPDATED SUBJECT | -1 | -1 | -1 |
| | SIZE OF UPDATED SUBJECT | d0 | d1 | d2 |
| NEW EFFECTIVE SUBJECT | | NODE RECORD HEADER IN FIG. 22 | | CONNECTION RECORD CR10 IN FIG. 22 | d0: SIZE OF NODE RECORD HEADER IN FIG. 22
d1: SIZE OF CONNECTION RECORD CR10 IN FIG. 14
d2: SIZE OF CONNECTION RECORD CR10 IN FIG. 22

FIG.35

| | | PASS LINK RECORD 0 | PASS LINK RECORD 1 | PASS LINK RECORD 2 | PASS LINK RECORD 3 |
|---|---|---|---|---|---|
| AUXILIARY DISPLAY-RELATED LINK ID PRESENCE INFORMATION | | START DISPLAY-RELATED: ABSENT END DISPLAY-RELATED: ABSENT | START DISPLAY-RELATED: ABSENT END DISPLAY-RELATED: ABSENT | START DISPLAY-RELATED: ABSENT END DISPLAY-RELATED: ABSENT | START DISPLAY-RELATED: ABSENT END DISPLAY-RELATED: ABSENT |
| CORRESPONDING DISPLAY-RELATED LINK ID INFORMATION | START DISPLAY-RELATED LINK ID NUMBER | 105 | 111 | 102 | 103 |
| | END DISPLAY-RELATED LINK ID NUMBER | 106 | 111 | 103 | 104 |
| CORRESPONDING AUXILIARY DISPLAY-RELATED LINK ID INFORMATION | START AUXILIARY DISPLAY-RELATED LINK ID NUMBER | NULL | NULL | NULL | 128 |
| | END AUXILIARY DISPLAY-RELATED LINK ID NUMBER | NULL | NULL | 127 | NULL |

FIG.36

| | | PASS LINK RECORD 0 | PASS LINK RECORD 1 | PASS LINK RECORD 2 |
|---|---|---|---|---|
| AUXILIARY DISPLAY-RELATED LINK ID PRESENCE INFORMATION | | START DISPLAY-RELATED: ABSENT END DISPLAY-RELATED: ABSENT | START DISPLAY-RELATED: ABSENT END DISPLAY-RELATED: ABSENT | START DISPLAY-RELATED: ABSENT END DISPLAY-RELATED: ABSENT |
| CORRESPONDING DISPLAY-RELATED LINK ID INFORMATION | START DISPLAY-RELATED LINK ID NUMBER | 105 | 111 | 102 |
| | END DISPLAY-RELATED LINK ID NUMBER | 106 | 111 | 104 |
| CORRESPONDING AUXILIARY DISPLAY-RELATED LINK ID INFORMATION | START AUXILIARY DISPLAY-RELATED LINK ID NUMBER | NULL | NULL | NULL |
| | END AUXILIARY DISPLAY-RELATED LINK ID NUMBER | NULL | NULL | NULL |

FIG.37A   FIG.37B
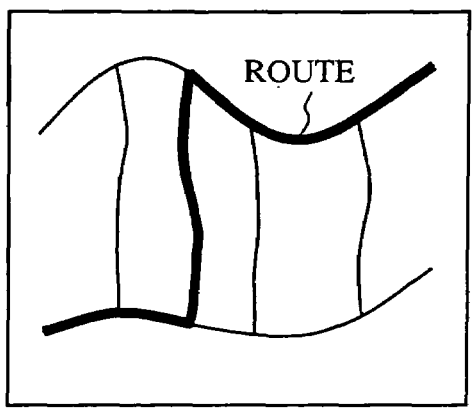
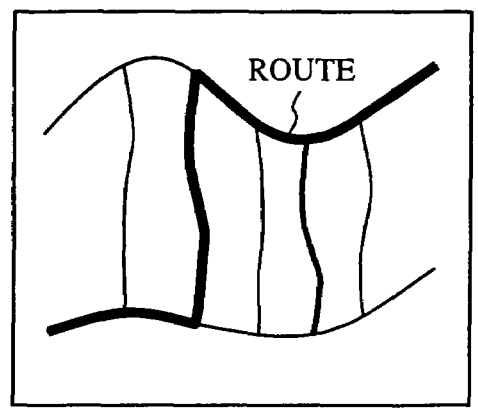
FIG.40
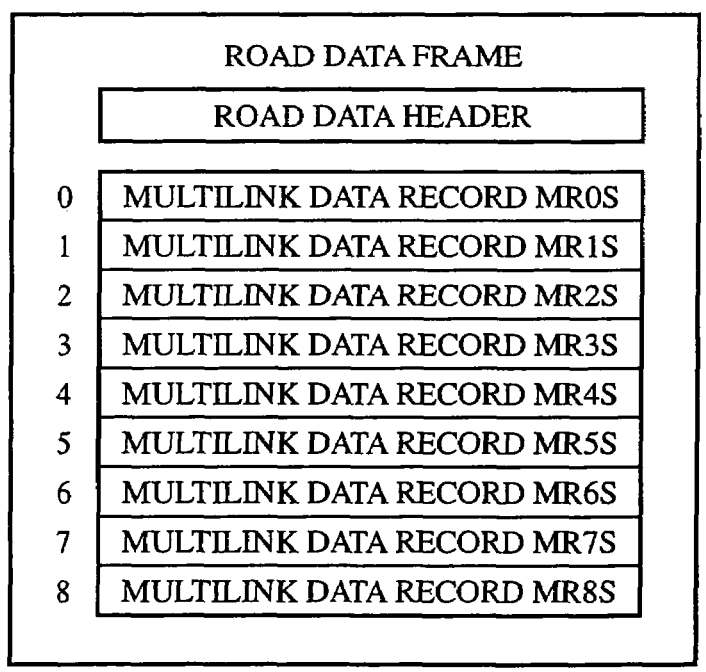

MULTILINK DATA RECORD MR0

| DATA ITEM | | NODE/LINK DATA RECORD | | | | | |
|---|---|---|---|---|---|---|---|
| | | NLR00 | NLR01 | NLR02 | NLR03 | NLR04 | NLR05 |
| NODE/LINK DATA HEADER | TOTAL # OF INTERMEDIATE POINTS | 1 | 1 | 0 | 2 | 1 | 0 |
| | AUXILIARY DISPLAY-RELATED LINK ID PRESENCE INFORMATION | ABSENT | ABSENT | ABSENT | ABSENT | ABSENT | ABSENT |
| | LINK VALIDITY INFORMATION | VALID | VALID | VALID | VALID | VALID | VALID |
| INTERSECTION DESCRIPTION | MULTILINK # | -1 | 2 | 3 | 4 | 5 | -1 |
| | NODE/LINK DATA # | -1 | 0 | 0 | 0 | 0 | -1 |
| COORDINATES OF NODE | | COOR-DINATES OF Nd0 | COOR-DINATES OF Nd1 | COOR-DINATES OF Nd2 | COOR-DINATES OF Nd3 | COOR-DINATES OF Nd4 | COOR-DINATES OF Nd5 |
| DISPLAY-RELATED LINK ID INFORMATION | | 100 | 101 | 102 | 103 | 104 | -1 |
| AUXILIARY DISPLAY-RELATED LINK ID INFORMATION | | NULL | NULL | NULL | NULL | NULL | NULL |
| INTERMEDIATE POINT INFORMATION | | COOR-DINATES OF P0 | COOR-DINATES OF P1 | ABSENT | COOR-DINATES OF P2 AND P3 | COOR-DINATES OF P4 | ABSENT |

MULTILINK DATA RECORD MR5

| DATA ITEM | | NODE/LINK DATA RECORD | |
|---|---|---|---|
| | | NLR50 | NLR51 |
| NODE/LINK DATA HEADER | TOTAL # OF INTERMEDIATE POINTS | 4 | 0 |
| | AUXILIARY DISPLAY-RELATED LINK ID PRESENCE INFORMATION | ABSENT | ABSENT |
| | LINK VALIDITY INFORMATION | VALID | VALID |
| INTERSECTION DESCRIPTION | MULTILINK # | 0 | 1 |
| | NODE/LINK DATA # | 4 | 4 |
| COORDINATES OF NODE | | COORDINATES OF Nd4' | COORDINATES OF Nd10' |
| DISPLAY-RELATED LINK ID INFORMATION | | 113 | -1 |
| AUXILIARY DISPLAY-RELATED LINK ID INFORMATION | | NULL | NULL |
| INTERMEDIATE POINT INFORMATION | | COORDINATES OF P21-P24 | ABSENT |

MULTILINK DATA RECORD MR0S

| DATA ITEM | | NODE/LINK DATA RECORD | | | | | |
|---|---|---|---|---|---|---|---|
| | | NLR00 | NLR01 | NLR02 | NLR03S | NLR04S | NLR05 |
| NODE/LINK DATA HEADER | TOTAL # OF INTERMEDIATE POINTS | 1 | 1 | 0 | 2 | 1 | 0 |
| | AUXILIARY DISPLAY-RELATED LINK ID PRESENCE INFORMATION | ABSENT | ABSENT | ABSENT | ABSENT | ABSENT | ABSENT |
| | LINK VALIDITY INFORMATION | VALID | VALID | VALID | INVALID | VALID | VALID |
| INTERSECTION DESCRIPTION | MULTILINK # | -1 | 2 | 3 | 7 | 7 | -1 |
| | NODE/LINK DATA # | -1 | 0 | 0 | 0 | 2 | -1 |
| COORDINATES OF NODE | | COORDINATES OF Nd0 | COORDINATES OF Nd1 | COORDINATES OF Nd2 | COORDINATES OF Nd3 | COORDINATES OF Nd4 | COORDINATES OF Nd5 |
| DISPLAY-RELATED LINK ID INFORMATION | | 100 | 101 | 102 | 103 | 104 | -1 |
| AUXILIARY DISPLAY-RELATED LINK ID INFORMATION | | NULL | NULL | NULL | NULL | NULL | NULL |
| INTERMEDIATE POINT INFORMATION | | COORDINATES OF P0 | COORDINATES OF P1 | ABSENT | COORDINATES OF P2 AND P3 | COORDINATES OF P4 | ABSENT |

FIG.42

MULTILINK DATA RECORD MR7S

| DATA ITEM | | NODE/LINK DATA RECORD | | |
|---|---|---|---|---|
| | | NLR70S | NLR71S | NLR72S |
| NODE/LINK DATA HEADER | TOTAL # OF INTERMEDIATE POINTS | 1 | 1 | 0 |
| | AUXILIARY DISPLAY-RELATED LINK ID PRESENCE INFORMATION | PRESENT | PRESENT | ABSENT |
| | LINK VALIDITY INFORMATION | VALID | VALID | VALID |
| INTERSECTION DESCRIPTION | MULTILINK # | 4 | 6 | 5 |
| | NODE/LINK DATA # | 0 | 0 | 0 |
| COORDINATES OF NODE | | COORDINATES OF Nd3" | COORDINATES OF Nd12 | COORDINATES OF Nd4" |
| DISPLAY-RELATED LINK ID INFORMATION | | 103 | 103 | -1 |
| AUXILIARY DISPLAY-RELATED LINK ID INFORMATION | | 0 | 128 | NULL |
| INTERMEDIATE POINT INFORMATION | | COORDINATES OF P2 | COORDINATES OF P3 | ABSENT |

FIG.43

MULTILINK DATA RECORD MR6S

| DATA ITEM | | NODE/LINK DATA RECORD | |
|---|---|---|---|
| | | NLR60S | NLR61S |
| NODE/LINK DATA HEADER | TOTAL # OF INTERMEDIATE POINTS | TOTAL # OF INTERMEDIATE POINTS IN Ld14 | 0 |
| | AUXILIARY DISPLAY-RELATED LINK ID PRESENCE INFORMATION | ABSENT | ABSENT |
| | LINK VALIDITY INFORMATION | VALID | VALID |
| INTERSECTION DESCRIPTION | MULTILINK # | 7 | 8 |
| | NODE/LINK DATA # | 1 | 1 |
| COORDINATES OF NODE | | Nd12' | Nd13' |
| DISPLAY-RELATED LINK ID INFORMATION | | 114 | -1 |
| AUXILIARY DISPLAY-RELATED LINK ID INFORMATION | | NULL | NULL |
| INTERMEDIATE POINT INFORMATION | | COORDINATES OF INTERMEDIATE POINT(S) IN Ld14 | ABSENT |

FIG.44

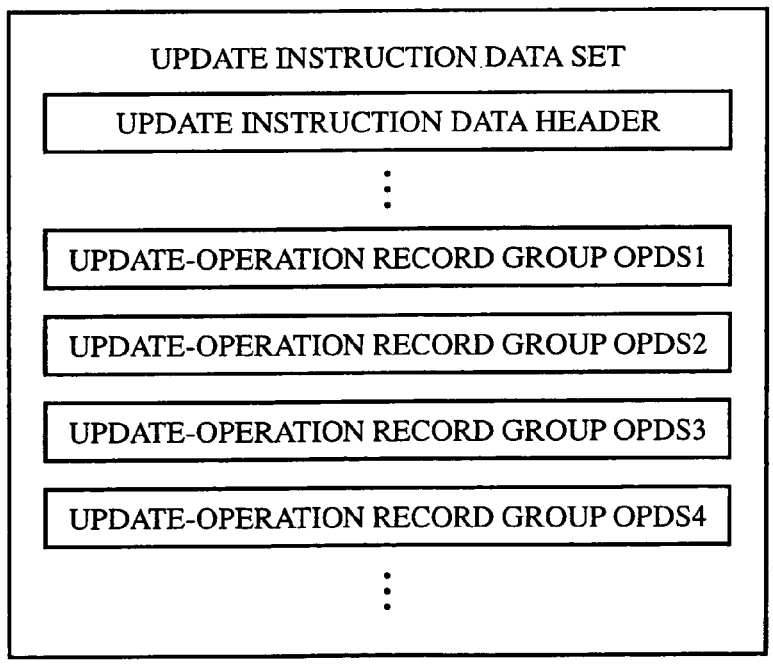

DATA ARCHITECTURE OF MAP DATA, DATA ARCHITECTURE OF UPDATE INSTRUCTION DATA, MAP INFORMATION PROCESSING APPARATUS, AND MAP INFORMATION PROVIDING APPARATUS

This application is a Divisional of application Ser. No. 10/687,887, filed on Oct. 20, 2003, which claims priority under 35 U.S.C. § 119(a) on Patent Application No. 2002-320161 filed in Japan on Nov. 1, 2002; the entire contents of which is hereby incorporated by reference and for which priority is claimed under 35 U.S.C. § 120.

BACKGROUND OF THE INVENTION

1. Field of the Invention

The present invention relates to a data architecture of map data used in a mobile processor, such as a car navigation system, a mobile phone, a personal digital assistance or the like, or fixed computer terminals. The present invention also relates to a data architecture of update instruction data, a map data processing apparatus, and a map data providing apparatus that are adapted to updating the map data having the invented map data.

2. Description of the Related Art

A car navigation system conducts route planning (route seeking) from a place of departure to a destination, and presents an optimal candidate route resulting from route planning on a display device together with a road map. Similar functions can be achieved by other mobile processors, such as mobile phones and personal digital assistances, or fixed computer terminals.

A data architecture of map data used in an apparatus that can make route planning includes a data set for displaying road maps and another data set for route planning in order to enhance the speed of processing. For example, JP-8-292716-A discloses this kind of data architecture. According to JP-8-292716-A, data for displaying road maps comprise a group of link information units, each of which indicates a road and includes node information units indicating nodes (start points, endpoints and/or intersections) of the road. Data for route planning comprises a set of node data, wherein each node data part includes a node information unit indicating a node and adjacent-node information units indicating one or more adjacent nodes. Interconnection of roads can be recognized by tracking adjacent-node information units, route planning from a place of departure to a destination can be achieved on the basis of adjacent-node information units within the data for route planning. Consequently, necessary link information units indicating the candidate route can be acquired on the basis of the node information units corresponding to a candidate route resulting from route planning, and the optimal candidate route may be displayed.

In accordance with the above-mentioned conventional data architecture of map data, when data have been updated due to new construction or elimination of a road, replenishment of map data, and so on, it is contemplated that both of the updated data set for displaying road maps and the updated data set for route planning should be stored in each user's apparatus in order to accommodate the data set for displaying road maps and the data set for route planning to each other. The method for updating the data sets in each user's apparatus may include distributing storage media storing the updated data and distributing the updated data by communications. In any event, however, there is likelihood that only one data set is updated in a user's apparatus, whereby data mismatching may occur. Although storage media are distributed, update of one data set may fail for the reason of malfunction of the user apparatus. When data sets are distributed by communications, even the data set for route planning can be updated successfully, the update instruction concerning the data set for displaying road maps may not be received by an obstruction to communication. If a user apparatus thus stores data sets of different versions in a user apparatus, there is likelihood that although the apparatus can conduct route planning, it cannot show the optimal route on the display device.

SUMMARY OF THE INVENTION

It is therefore an object of the present invention to provide a data architecture of map data for accomplishing an appropriate process although a user apparatus stores an updated data set and a non-updated data set.

It is another object of the present invention to provide a data architecture of update instruction data, a map data processing apparatus, and a map data providing apparatus that are adapted to updating the map data having the invented map data.

In accordance with an aspect of the present invention, there is provided a data architecture of map data including link identification information identifying a plurality of original links, each of which corresponds to a part of a road constituting an actual road network; and auxiliary link identification information used for identifying a plurality of alternative links which substitute for any of the original links in the map data. The link identification information for each original link replaced by the alternative links is associated with the auxiliary link identification information for the alternative links, whereby a map data processing apparatus can recognize relationship between the original link and the alternative links. Therefore, although the map data processing apparatus possesses a data set updated successfully and another data set that fails to be updated, the map data processing apparatus may realize a suitable operation, recognizing the relationship between the alternative links and the original link.

In another aspect of the present invention, a data architecture of map data includes a plurality of node/link data items designating a plurality of links, respectively, each of links corresponding to a part of a road constituting an actual road network. Each node/link data item includes: link identification information identifying the corresponding link; link validity information identifying whether the corresponding link is valid or invalid; and interconnection information for indicating interconnections between the corresponding link and other links. When the corresponding link is an original link replaced by a plurality of alternative links in the map data, the link validity information identifies that the corresponding link is invalid, and the interconnection information indicates that the original link is associated with the alternative links, whereby a map data processing apparatus can recognize relationship between the original link and the alternative links. Therefore, although the map data processing apparatus possesses a data set updated successfully and another data set that fails to be updated, the map data processing apparatus may realize a suitable operation, recognizing the relationship between the alternative links and the original link.

BRIEF DESCRIPTION OF THE DRAWINGS

With reference to the accompanying drawings, various embodiments of the present invention will be described hereinafter. In the drawings:

FIG. 11 is a diagram showing in detail node/link data records in multilink data records in FIG. 10B;

FIG. 12 is a diagram showing in detail node/link data records in other multilink data records in FIG. 10B;

FIG. 19 is a diagram showing in detail node/link data records in multilink data records in the road data frame in FIG. 18;

FIG. 20 is a diagram showing in detail node/link data records in another multilink data record in the road data frame in FIG. 18;

FIG. 21 is a diagram showing a route planning data frame after being updated according to the first through fourth embodiments;

FIG. 22 is a diagram showing in detail a node record in the route planning data frame in FIG. 21;

FIG. 23 is a diagram showing in detail another node record in the route planning data frame in FIG. 21;

FIG. 26A is a diagram showing an update instruction data set containing update-operation records for updating the road data frame;

FIG. 26B is diagram showing in detail the update-operation records for updating the road data frame;

FIG. 27A is a diagram showing an update instruction data set containing update-operation records for updating the route planning data frame;

FIG. 27B is diagram showing in detail the update-operation records for updating the route planning data frame;

FIG. 35 is a diagram showing exemplified contents of a route data set based on the updated route planning data frame in detail;

FIG. 36 is a diagram showing exemplified contents of another route data set based on the non-updated route planning data frame in detail;

FIG. 37A is a diagram showing a display-screen image displaying an optimal route superimposed on a road presentation based on the non-updated road data frame;

FIG. 37B is a diagram showing another display-screen image displaying an optimal route superimposed on a road presentation based on the updated road data frame;

FIG. 38 is a diagram showing in detail node/link data records in multilink data records in the original road data frame according to the second embodiment of the present invention;

FIG. 40 is a diagram showing the format of an updated road data frame indicative of the network of roads in FIG. 39 according to the second embodiment;

FIG. 41 is a diagram showing in detail node/link data records in a multilink data record in the road data frame in FIG. 40;

FIG. 42 is a diagram showing in detail node/link data records in another multilink data record in the road data frame in FIG. 40;

FIG. 43 is a diagram showing in detail node/link data records in a further multilink data record in the road data frame in FIG. 40;

FIG. 44 is a diagram showing an example of data architecture of update instruction data set according to the second embodiment of the present invention;

DETAILED DESCRIPTION OF PREFERRED EMBODIMENTS

First Embodiment

Figure 1:
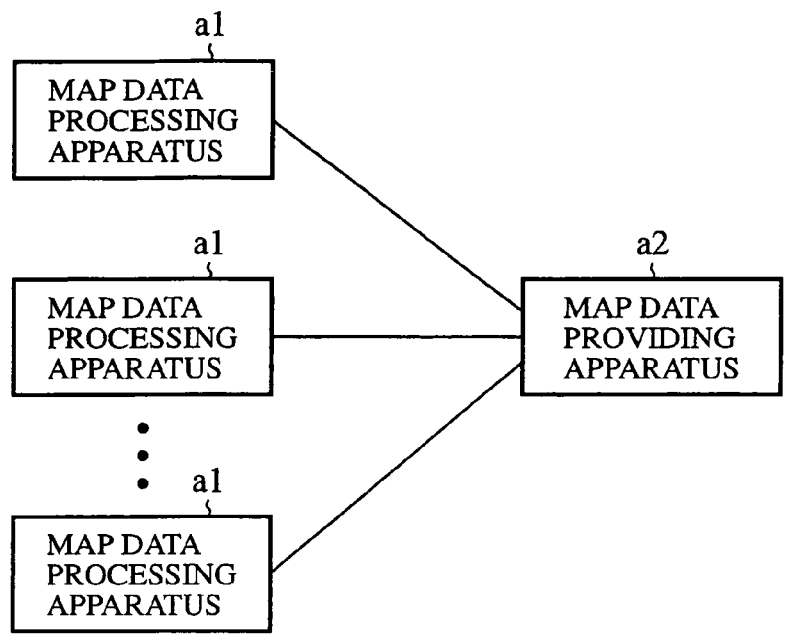
FIG. 1 is a block diagram showing a map data update system according to the first through fourth embodiments of the present invention.

FIG. 1 is a block diagram showing a map data update system according to a first embodiment of the present invention. As shown in FIG. 1, the map data update system comprises a map data providing apparatus a2, a plurality of map data processing apparatuses a1. Each map data processing apparatus a1 is, for example, a car navigation system installed in an automobile. The map data providing apparatus a2 can be linked with the plurality of map data processing apparatuses a1 via a communication network, thereby providing each map data processing apparatus a1 with an update instruction data set for updating the map data stored in each map data processing apparatus a1 when they are linked with the map data providing apparatus a2.

Figure 2:
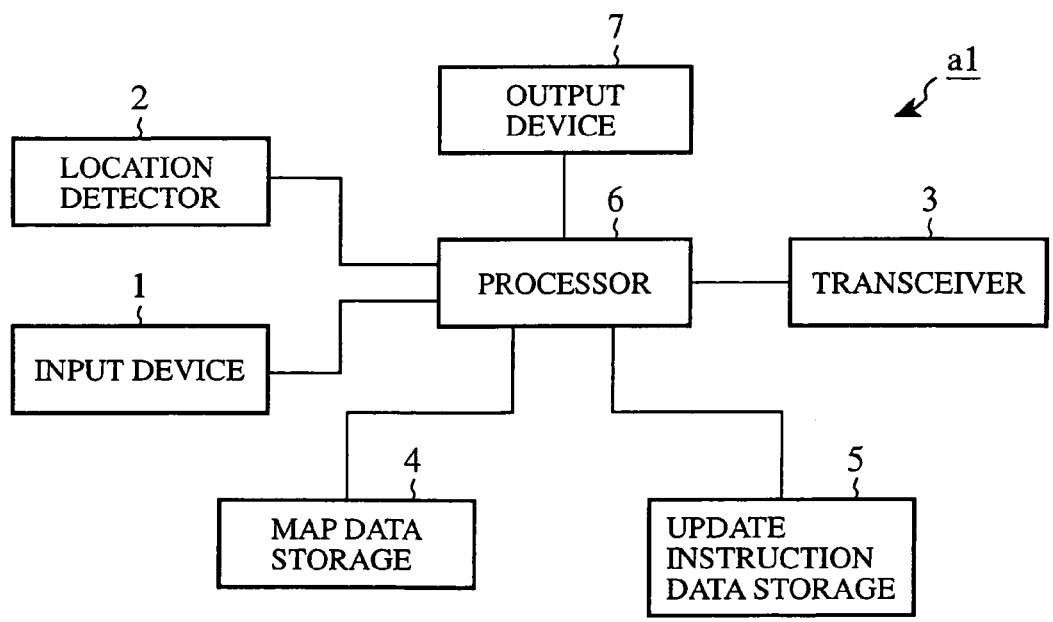
FIG. 2 is a block diagram showing a map data processing apparatus according to the first through fourth embodiments of the present invention.

FIG. 2 is a block diagram showing particulars of map data processing apparatus a1 shown in FIG. 1. As shown in FIG. 2, the map data processing apparatus a1 comprises an input device 1, a location detector 2, a transceiver (receiving unit) 3, a map data storage 4, an update instruction data storage (storage unit) 5, a processor (update processor) 6, and an output device 7.

The input device 1 gives various instruction signals in accordance with user's manipulations or instructions. More specifically, although not illustrated, the input device 1 may include at least one of appropriate input device, for example, a voice recognition device which recognizes user's voice to output instruction signals based on the user's voice, buttons or keys which output instruction signals based on the user's manipulations, or other suitable input devices. The location detector 2 is, for example, a GPS (Global Positioning System) receiver, and detects the location of the corresponding map data processing apparatus a1 for supplying the location information indicating the detected location to the processor 6.

The map data storage 4 stores the map data therein. The transceiver 3 has a function to transmit the map data providing apparatus a2 an update instruction data request in order to update the map data, and a function to receive the update instruction data set from the map data providing apparatus a2.

The update instruction data set received via the transceiver 3 is then stored by the processor 6 in the update instruction data storage 5. In addition, the processor 6 changes or updates the map data in accordance with the update instruction data, and writes the updated map data into the update instruction data storage 5. However, it is not intended to limit the present invention to the illustrated embodiment, and the updated map data may be stored to (or overwritten into) the map data storage 4.

Furthermore, the processor 6 executes various navigation processes using the current location acquired by the location detector 2 and the map data retrieved from the map data storage 4 or the update instruction data storage 5. The navigation processes include map matching for identifying the road or location on the road on which the automobile runs, route planning (route seeking) for planning the route from a place of departure to a destination, route presentation for displaying an optimal route candidate obtained as a result of route planning together with a road map on the display device, route guidance for guiding the user in accordance with the optimal route from the place of departure to the destination, and presentation of a map indicating the current location and its adjacency.

The output device 7 presents information to the user in accordance with the output of the navigation process by the processor 6. More specifically, the output device 7 includes a display device for displaying the map, current location, the optimal route, guidance information, and other information thereon, and a voice generator for instructing or guiding user through voice.

Figure 3:
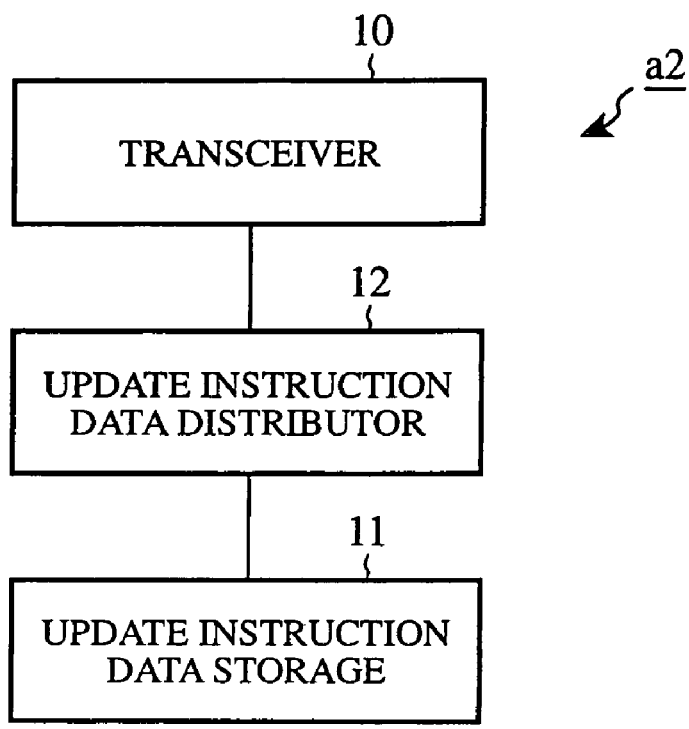
FIG. 3 is a block diagram showing a map data providing apparatus according to the first through fourth embodiments of the present invention.

FIG. 3 is a block diagram showing the construction of the map data providing apparatus a2 illustrated in FIG. 1. The map data providing apparatus a2 comprises a transceiver (transmitter) 10, an update instruction data storage 11, and an update instruction data distributor 12. In the update instruction data storage 11, stored is an update instruction database containing at least one update instruction data set for causing the dependent map data processing apparatus a1 to update the map data. The transceiver 10 receives signals from the map data processing apparatuses a1 via the communications network, and transmits signals to the transceiver 3 of the relevant map data processing apparatus a1, individually. When the transceiver 10 receives an update instruction data request from any one of the map data processing apparatus a1, the update instruction data distributor 12 obtains or retrieves necessary update instruction data set from the update instruction data storage 11 and causes the transceiver 10 to send the update instruction data set to the subject map data processing apparatus a1.

Figure 4:
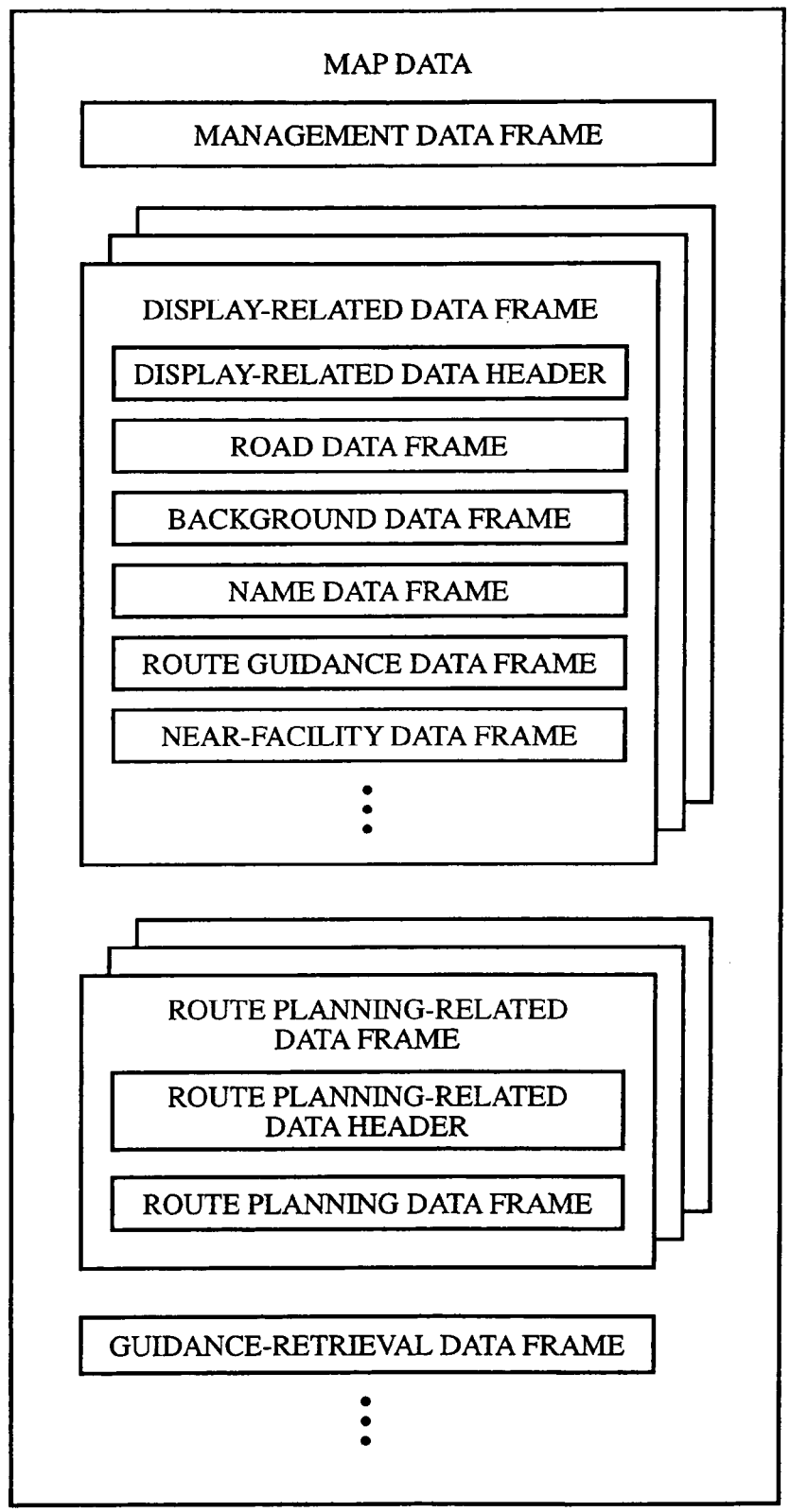
FIG. 4 is a schematic diagram showing a general data architecture of map data according to the first through fourth embodiments of the present invention.

FIG. 4 is a schematic diagram showing a general data architecture of map data stored in the map data storage 4 of each map data processing apparatus a1. The map data architecture includes a management data frame, a plurality of display-related data frames, a plurality of route planning-related data frame, guidance-retrieval data frame, and other types of data items.

Each display-related data frame corresponds to a region and contains various data items for presenting a map indicating the region and information relevant to the region on the display device of the output device 7. Each route planning-related data frame also corresponds to a region and contains data items indicating nodes (start points, endpoints, and/or intersections) along roads in the region.

The guidance-retrieval data frame contains data items indicating destinations, such as phone numbers related to addresses and buildings, and data items indicating relationship between destinations and regions. The guidance-retrieval data frame is used for selecting a display-related data frame and a route planning-related data frame corresponding to a necessary region in accordance with the destination designated by the user.

The management data frame contains data items used for management and retrieval of the display-related data frame, route planning-related data frame, guidance-retrieval data frame, and so on. For example, the management data frame contains data items indicating the storage position of each data frame in the map data architecture and the version of each data frame.

As shown in FIG. 4, each display-related data frame contains a road data frame used for map matching (identifying the road and location based on the current location) and road presentation; a background data frame for displaying background in the map, e.g., rivers and seas; a name data frame for displaying names, e.g., geographic names in alphabetic or other characters; route guidance data frame for route guidance; a near-facility data frame for retrieving near-facilities; and other data frames. In addition, each display-related data frame contains a display-related data header that indicates various attributes related to the corresponding display-related data frame, such as the region corresponding to the display-related data frame; and information for managing the storage position of each data frame in the display-related data frame.

The route planning-related data frame contains a route planning data frame for route planning, and a route planning-related data header. The route planning-related data header indicates various attributes related to the corresponding display-related data frame, such as the region corresponding to the route planning-related data frame; and information for managing the storage position of each data frame in the route planning-related data frame.

Figure 5:
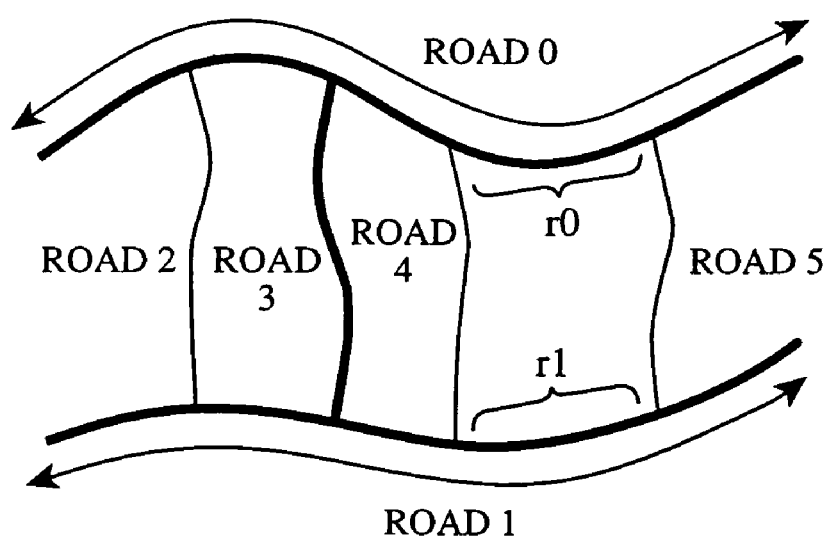
FIG. 5 is a map showing an actual network of roads before alteration.

The data architecture of map data, details of data items, and the basic principle for producing the map data will be described before explaining the updating process of the map data according to the embodiment. FIG. 5 is a map showing an actual network of roads in a region. In the map shown in FIG. 5, a plurality of roads 2 through 5 intersect two laterally extending roads 0 and 1.

Figure 6:
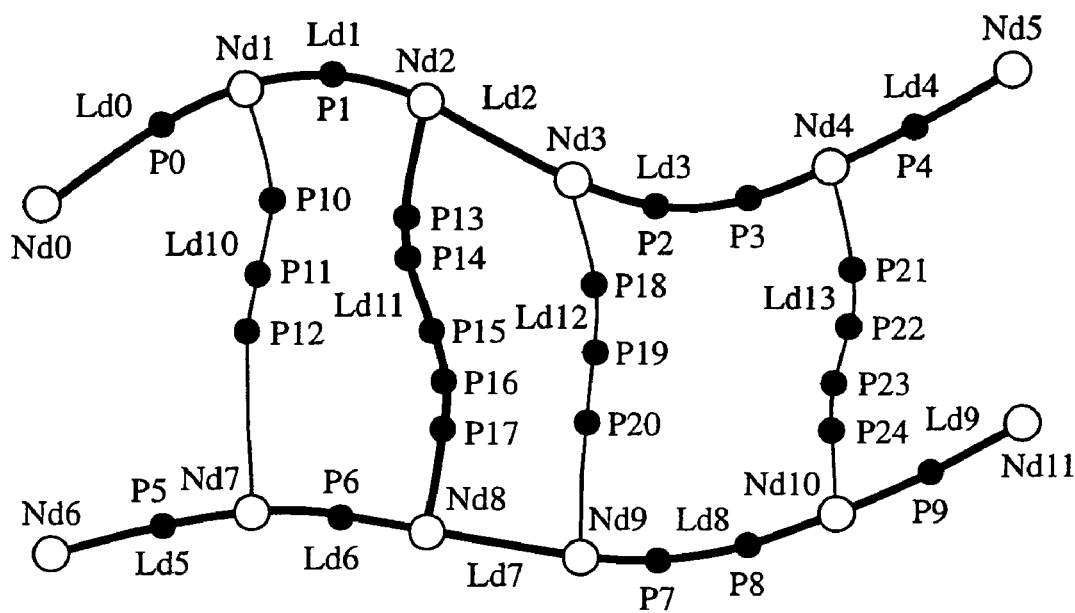
FIG. 6 is a map similar to FIG. 5, wherein nodes and links are imaginarily allocated to the roads for producing a road data frame of the map data according to the present invention.

FIG. 6 represents nodes and links that are imaginarily allocated to roads 0 through 5 for indicating the interconnections among roads 0 through 5, i.e., for indicating the network of roads 0 through 5 as data when producing a display-related data frame. As shown in FIG. 6, nodes Nd0 through Nd11 are allocated to start points, endpoints and intersections of roads 0 through 5. Additionally, links Ld0 through Ld13 are allocated to road parts, each of which connects two adjacent nodes. Hereinafter, the links (such as illustrated links Ld0 through Ld13) constituting the network of roads used for map presentation and map matching will be referred to as display-related links. Furthermore, intermediate points P0 through P24 are allocated to flections of roads in order to indicate the shape of each road as an aggregation of line segments.

As shown in FIG. 6, when producing the display-related data frame, a road is considered as a multilink that is an aggregation of multiple links. That is, road 0 (see FIG. 5) will be referred to as multilink 0, and similarly roads 1 through 5 will be referred to as multilinks 1 through 5, respectively. Multilink 0 indicating road 0 includes nodes Nd0, Nd1, Nd2, Nd3, Nd4, and Nd5, and links Ld0, Ld1, Ld2, Ld3, and Ld4. In addition, when producing the display-related data frame, directionality is given to each road, i.e., each multilink. For example, with reference to multilink 0, the direction from nodes Nd0 toward nodes Nd5 is defined as the forward direction while the direction from nodes Nd5 toward nodes Nd0 is defined as the backward direction.

Figure 7:
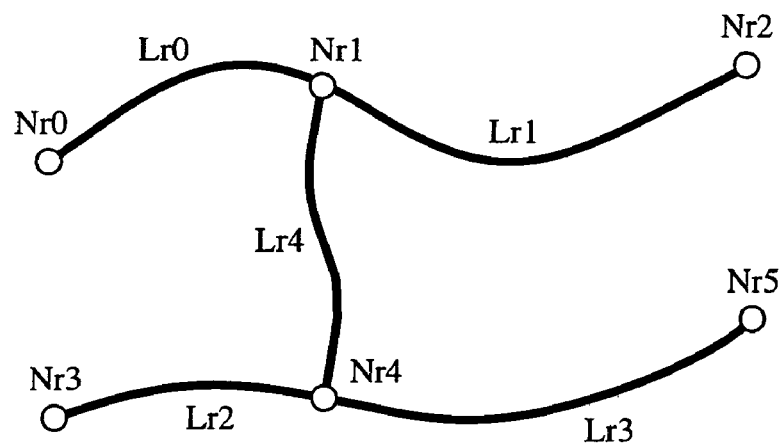
FIG. 7 is a simplified map, wherein nodes and links are imaginarily allocated to arterial roads for producing a route planning-related data frame of the map data according to the present invention.

FIG. 7 represents nodes and links that are imaginarily allocated to network of arterial roads 0, 1, and 3, which will be used for road planning, when producing a route planning-related data frame. Here, let us assume that the other roads 2, 4, and 5 will not be used for route planning. As shown in FIG. 7, nodes Nr0 through Nr5 are allocated to start points, endpoints, and intersections of road 0, 1, and 3. In addition, links Lr0 through Lr4 are allocated to road parts, each of which connects two adjacent nodes. Hereinafter, the links (such as illustrated links Lr0 through Lr4) constituting the network of roads used for route planning will be referred to as route planning-related links.

Figure 8:
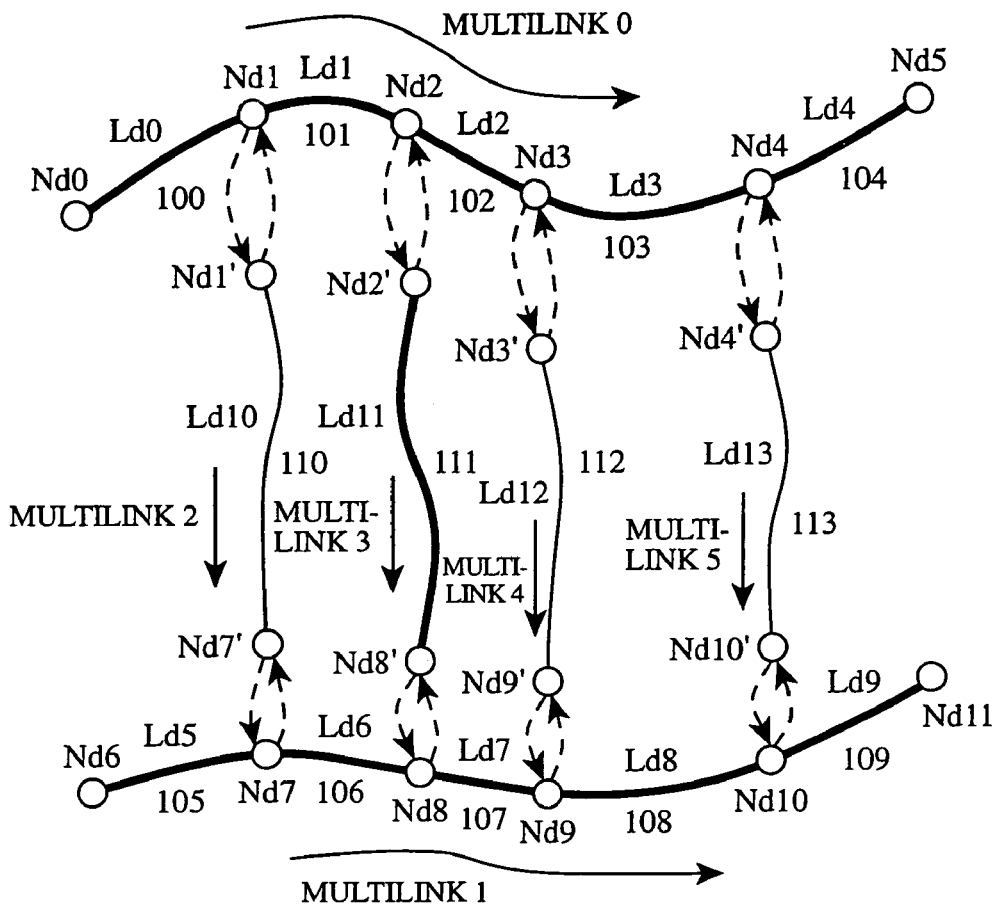
FIG. 8 is a diagram wherein the network of roads shown in FIG. 6 is disassembled into a plurality of links, and display-related link identification numbers are allocated to the links.

FIG. 8 represents multilinks 0 through 5 indicating roads 0 through 5 constituting the networks of roads in FIG. 6, and display-related link identification numbers 100 through 113 allocated to display-related links Ld0 through Ld13, respectively for identifying the display-related links. For example, the display-related link identification number of link Ld0 is 100 while that of link Ld10 is 110. In one multilink, the display-related link identification numbers are given to the constituent links sequentially in ascending order in accordance with the forward direction of the multilink.

As shown in FIG. 8, road intersections can be indicated as intersections, i.e., junctions of multilinks. For example, the intersection of roads 0 and 2 corresponds to node Nd1 on multilink 0 and to node Nd1' on multilink 2. Consequently, it can be considered that multilinks 0 and 2 are connected at nodes Nd1 and Nd1' with each other. This allows representing an intersection description describing junctions of each node to other multilinks. For example, the intersection description of node Nd1 on multilink 0 may indicate node Nd1' on multilink 2 as a junction of node Nd1 while the intersection description of node Nd1' on multilink 2 may indicate node Nd1 on multilink 0 as a junction of node Nd1'. Allocating an intersection description to each node may facilitate understanding multilink intersections, and thus the interconnections among all multilinks.

Figure 9:
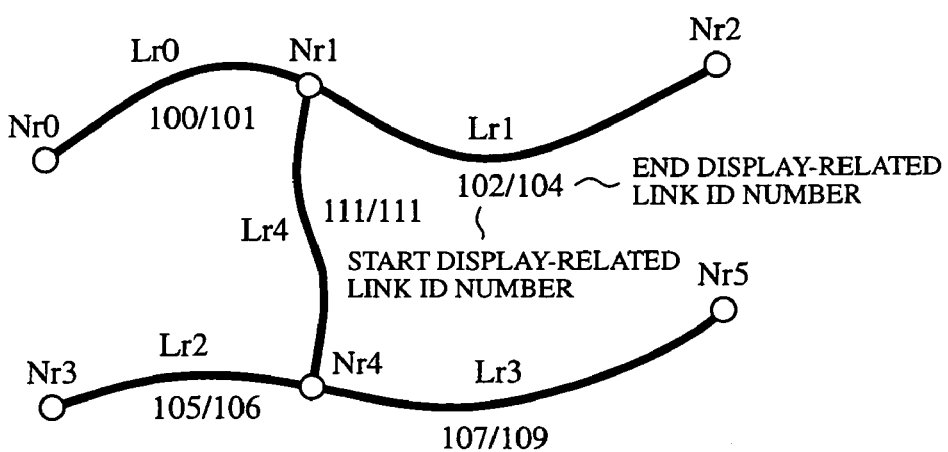
FIG. 9 is a diagram showing the relationship between the links in FIG. 7 which will be used for route planning and the display-related link identification numbers in FIG. 8.

FIG. 9 shows the relationship between route planning-related links Lr0 through Lr4 in FIG. 7 and the display-related link identification numbers in FIG. 8. As shown in FIG. 9, a start display-related link identification number and an end display-related link identification number are allocated to each of route planning-related links Lr0 through Lr4 in FIG. 7. That is to say, to a route planning-related link (for example, link Lr1) in FIG. 7, the minimum display-related link identification number (for example, 102) of the constituent display-related links (for example, links Ld2 through Ld4 shown in FIG. 8) is allocated as the start display-related link identification number while the maximum display-related link identification number (for example, 104) is allocated as the start display-related link identification number. Since the display-related link identification numbers are given to the constituent links sequentially in ascending order in accordance with the forward direction of the multilink, the correlation between each display-related link shown in FIG. 8 and each route planning-related link shown in FIG. 7 can be specified by its start display-related link identification number and end display-related link identification number. For example, it can be specified that route planning-related link Lr1 in FIG. 7 is related to display-related links Ld2, Ld3, and Ld4 in FIG. 8 by display-related link identification numbers 102 through 104.

Figure 10A:
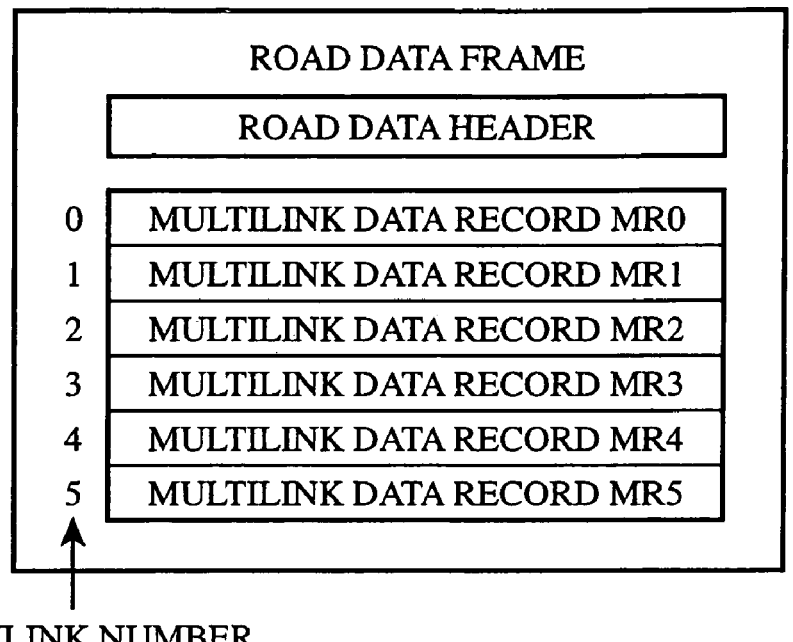
FIG. 10A is a diagram showing the format of an original road data frame in a display-related data frame in the original map data architecture in FIG. 4.

FIG. 10A shows an example of the road data frame in the display-related data frame in FIG. 4. The road data frame contains a road data header and a plurality of multilink data records. The road data frame in FIG. 10A corresponds to the network of roads in FIG. 8. Multilink data records MR0 through MR5 in FIG. 10A correspond to multilinks 0 through 5 in FIG. 8, respectively, and each multilink record contains information related to the corresponding multilink or road. The order of multilink data records will be referred to as multilink number. By the use of multilink numbers 0 through 5, multilink data records MR0 through MR5 can be identified. The road data header contains information for managing the multilink data records, such as the total number of the multilink data records.

Figure 10B:
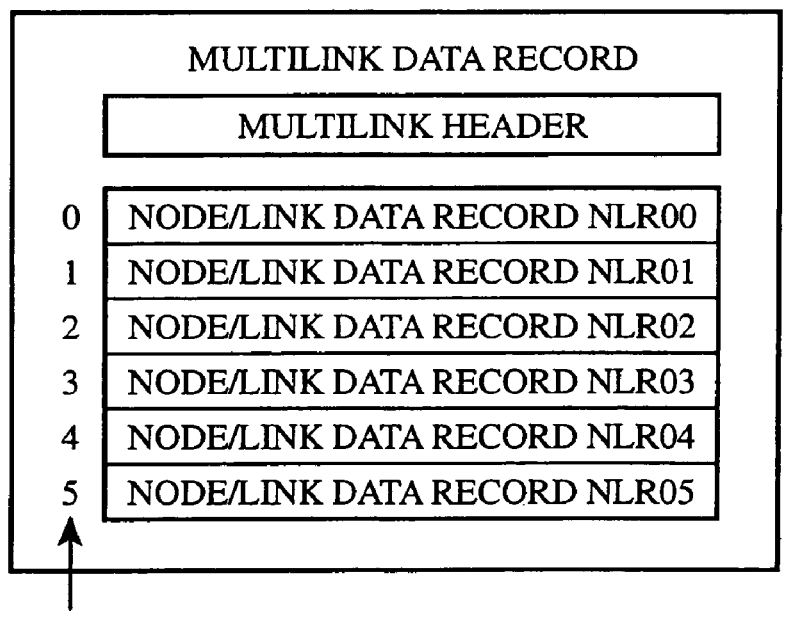
FIG. 10B is a diagram showing the data architecture of a multilink data record in the road data frame in FIG. 10A.

As an example of multilink data records MR0 through MR5 in FIG. 10A, the multilink data record MR0 corresponding to multilink 0 will be explained in detail. FIG. 10B shows the data architecture of multilink data record MR0 in FIG. 10A. Each multilink data record contains a multilink header and a plurality of node/link data records. Node/link records NLR00, NLR01, NLR02, NLR03, NLR04, and NLR05 in FIG. 10B respectively correspond to combinations of node and link (Nd0, Ld0), (Nd1, Ld1), (Nd2, Ld2), (Nd3, Ld3), (Nd4, Ld4), and (Nd5, null) that appear sequentially when moving along the multilink 0 in the forward direction. In multilink data record MR0, node/link data records NLR00 through NLR05 are aligned in accordance with the order of appearance of the combinations of node and link. The order of node/link data records will be referred to as node/link data number. By the use of node/link data numbers 0 through 5, node/link data records NLR00 through NLR05 can be identified.

Each node/link data record contains various information items related to the corresponding node and link. For example, node/link data record NLR00 contains information items related to node Nd0 and link Ld0 of which link the identification number is 100. The multilink header indicates the size of the multilink data record, the road type of the corresponding road (for example, road 0 for multilink data record MR0), and the total number of nodes in the road.

FIG. 11 shows in detail node/link data records NLR00 through NLR05 in multilink data record MR0 (corresponding to multilink 0) and node/link data records NLR50 and NLR51 in multilink data record MR5 (corresponding to multilink 5) in FIG. 10B. Each node/link data record contains a node/link data header, an intersection description, coordinates of node, display-related link identification information, auxiliary display-related link identification information, and intermediate point information.

The node/link data header indicates the total number of intermediate points on the corresponding link, and auxiliary display-related link identification presence information that indicates whether or not an auxiliary display-related link identification number is given to the corresponding link. In addition, although not illustrated, the node/link header indicates the size of the node/link data record, and link attributes of the corresponding link, such as the width of road corresponding to the link. The auxiliary display-related link identification number will be used in the road data frame updated to conform to alteration of network of roads due to new construction of a road, and so on, or to conform to replenishment of the map data for adapting to actual roads. The auxiliary display-related link identification number will be explained in more detail in conjunction with the updating process of the map data. No auxiliary display-related link identification number is given to the network of roads in FIG. 8 that is in the state before alteration, so that all of auxiliary display-related link identification presence information fields contain a value indicative of "absent" in the example shown in FIG. 11.

The intersection description contains the multilink number indicative of the multilink with which the corresponding node is connected, and node/link data number indicative of the node/link data record corresponding to the node in the multilink with which the corresponding node is connected. For example, the intersection description for node/link data record NLR04 (corresponding to node Nd4 and link Ld4 in FIG. 8) in multilink data record MR0 contains multilink number 5 and node/link data number 0, thereby indicating node Nd4' on multilink 5 to which node Nd4 is connected. As another instance, the intersection description for node/link data record NLR50 (corresponding to node Nd4' and link Ld13 in FIG. 8) in multilink data record MR5 contains multilink number 0 and node/link data number 4, thereby indicating node Nd4 on multilink 0 to which node Nd4' is connected. Thus, the intersection descriptions for node/link data records NLR04 and NLR50 indicate that node Nd1 on multilink 0 is connected with node Nd4' on multilink 5. Nodes Nd0 and Nd5 (the start point and the endpoint of road 0) are not connected with any link, so that node/link data records NLR00 and NLR05 corresponding to nodes Nd0 and Nd5 contain "−1" as their multilink numbers and node/link data numbers.

The field of coordinates of node contains the coordinates, i.e., geographical position of the corresponding node. The field of display-related link identification information contains the display-related link identification number assigned to the corresponding link. For example, node/link data record NLR00 includes coordinates of the corresponding node Nd00 in the field of the coordinates of node, and display-related link identification number 100 of the corresponding link Ld0 in the field of display-related link identification information. However, the last node/link data record (for example, NLR05 and NLR51) does not have any corresponding link, so that it contains "−1" as its display-related link identification information.

The auxiliary display-related link identification information will be used in the road data frame updated to conform to alteration of network of roads due to new construction of a road, and so on, or to conform to replenishment of the map data for adapting to actual roads. The auxiliary display-related link identification information is effective only when the corresponding link is provided with an auxiliary display-related link identification number, and the field of auxiliary display-related link identification information contains the auxiliary display-related link identification number of the corresponding link when the information is effective. No auxiliary display-related link identification number is given to the network of roads in FIG. 8 that is in the state before alteration, so that all of auxiliary display-related link identification information fields are null in the example in FIG. 11.

The intermediate point information is effective only when the corresponding link has one or more intermediate points, and the field of intermediate point information contains the coordinates, i.e., geographical position of the intermediate points on the corresponding link. For example, node/link data record NLR04 (corresponding to node Nd4 and link Ld4 in FIG. 8) in multilink data record MR0 includes the coordinates of intermediate points P4 on link Ld4 as its intermediate point information.

Similarly, FIG. 12 shows the data architectures and contains of node/link data records NLR10 through NLR15 in multilink data record MR1 (corresponding to multilink 1) and node/link data records NLR30 and NLR31 in multilink data record MR3 (corresponding to multilink 3) in FIG. 10B.

Hereinbefore, the data architecture of the display-related data frame used for map matching, road presentation, and so on has been described.

Figure 13:
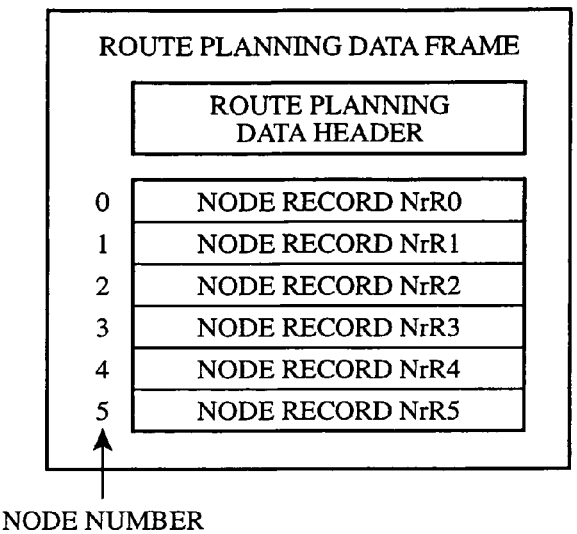
FIG. 13 is a diagram showing the format of an original route planning data frame in an original route planning-related data frame in FIG. 4.

FIG. 13 shows an example of the route planning data frame in a route planning-related data frame in FIG. 4. The route planning data frame contains a route planning data header and a plurality of node records. Let us assume that the route planning data frame shown in FIG. 13 indicates the network of roads in FIG. 7. Node records NrR0 through NrR5 in FIG. 13 correspond to nodes Nr0 through Nr5 in FIG. 7, respectively. The route planning data header contains information for managing the dependent node records, such as the total number of the node records. Each node record contains information items related to the corresponding node. The order of node records will be referred to as node number.

Figure 14:
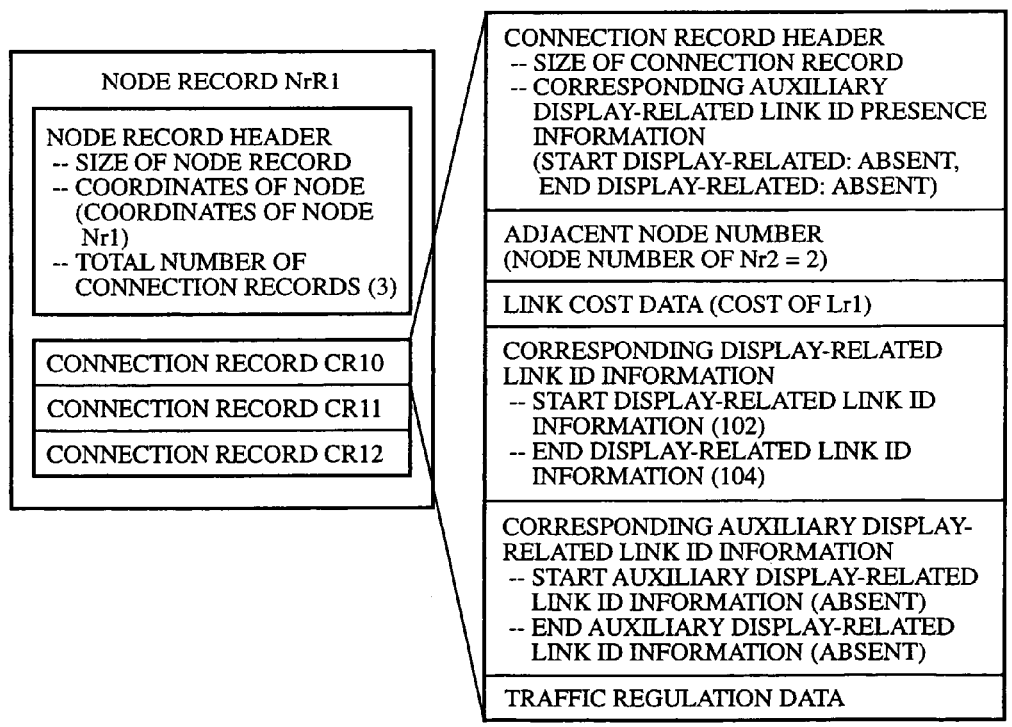
FIG. 14 is a diagram showing in detail a node record in the route planning data frame in FIG. 13.

As an example of node records in FIG. 13, the node record NrR1 corresponding to node Nr1 will be explained in detail. FIG. 14 shows the data architecture of node record NrR1 in FIG. 13. Each node record contains a node record header and one or more connection records. Connection records CR10, CR11, and CR12 in FIG. 14 respectively correspond to route planning-related links Lr1, Lr4, and Lr0, which are connected to node Nr1 corresponding to node record NrR1.

The node record header indicates the size of the node record, coordinates expressing the geographical position of node Nr1 corresponding to the node record, the total number of the connection records in the node record, and so on.

Each connection record contains a connection record header, an adjacent node number, link cost data, corresponding display-related link identification information, corresponding auxiliary display-related link identification information, and traffic regulation data.

The connection record header indicates the size of the connection record, and corresponding auxiliary display-related link identification presence information indicating whether or not the record has corresponding auxiliary display-related link identification information. The corresponding auxiliary display-related link identification information will be used in the route planning data frame updated to conform to alteration of network of roads due to new construction of a road, and so on, or to conform to replenishment of the map data for adapting to actual roads. The corresponding auxiliary display-related link identification information will be explained in more detail in conjunction with the updating process of the map data. No auxiliary display-related link identification number is given to the network of roads in FIG. 8 that is in the state before alteration, so that all of auxiliary display-related link identification presence information fields contain a value indicative of "absent" in the example shown in FIG. 14.

The adjacent node number contains the node number of an adjacent node (e.g., any of nodes Nr2, Nr4, and Nr0 for node Nr1) on a link (e.g., any of links Lr1, Lr4, and Lr0 for node Nr1) to which the node (e.g., node Nr1) corresponding to the connection record is connected. For example, connection record CR10 includes the node number 2 of node Nr2 adjacent to node Nr1 over link Lr1 in the adjacent node number field.

The link cost data field contains a cost indicator of the corresponding link (for example, link Lr1 in case of connection record CR10), such as approximate time required for running over the link, which will be used for cost estimation in route planning.

The corresponding display-related link identification information field contains the start display-related link identification number and the end display-related link identification number (see FIG. 8) of the route planning-related link corresponding to the connection record.

The corresponding auxiliary display-related link identification information field will be used in the route planning data frame updated to conform to alteration of network of roads due to new construction of a road, and so on, or to conform to replenishment of the map data for adapting to actual roads. The corresponding auxiliary display-related link identification information field contains the start auxiliary display-related link identification number and the end auxiliary display-related link identification number of the link corresponding to the connection record. However, no auxiliary display-related link identification number is given to the network of roads in FIG. 8 that is in the state before alteration, so that the corresponding auxiliary display-related link identification information is null in the example in FIG. 14. The corresponding display-related link identification information (or the corresponding display-related link identification information and corresponding auxiliary display-related link identification information if the corresponding auxiliary display-related link identification information is effective) indicates the scope of display-related link corresponding to the connection record.

The traffic regulation data field contains information on traffic regulation involved in the link corresponding to the connection record.

Hereinbefore, the data architecture of the route planning-related data frame used for route planning has been described. The map data storage 4 of each map data processing apparatus a1 stores the map data with the above-mentioned data architecture.

Figure 15:
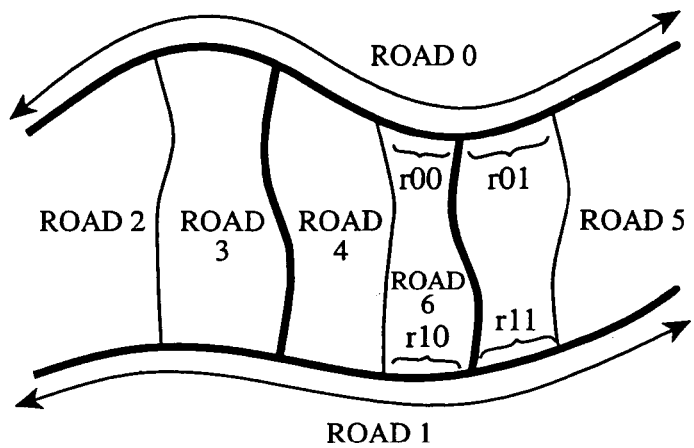
FIG. 15 is a map showing an actual network of roads after alteration.

Next, the updating process for the map data to conform to alteration of network of roads, or to conform to replenishment of the map data will be described. FIG. 15 is a map showing the actual network of roads in FIG. 5 where new road 6 is additionally constructed. In connection with FIG. 15, it is also possible to deem that existent road 6 that has been disregard in the map data becomes subject to the map data newly. Newly constructed road 6 intersects roads 0 and 1. It can be considered that road part r0 in road 0 in FIG. 5 has been divided into two road parts r00 and r01 by road 6 while road part r1 in road 1 has been divided into two road parts r10 and r11 by road 6.

Figure 16:
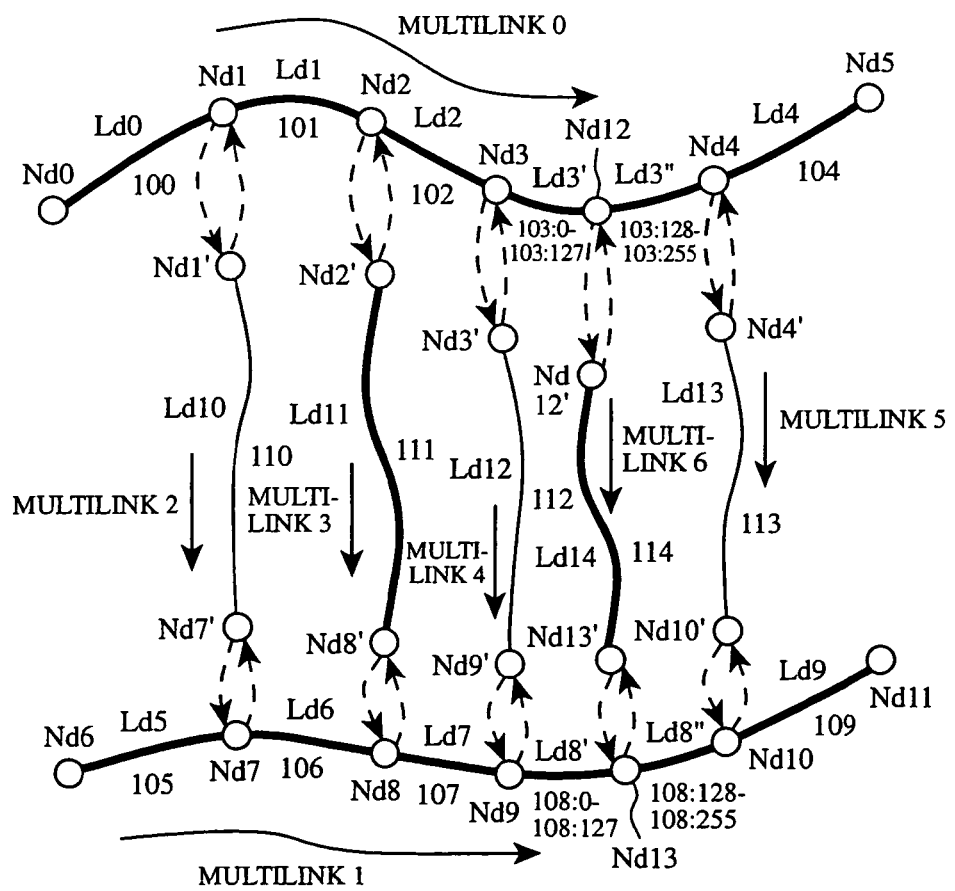
FIG. 16 is a diagram wherein the network of roads shown in FIG. 15 is disassembled into a plurality of links, and display-related link identification numbers are allocated to the links for updating the map data according the first embodiment of the present invention.

FIG. 16 is similar to FIG. 8 and represents nodes, links, multilinks, and display-related link identification numbers allocated imaginarily to the altered network of roads 0 through 6 in order to indicate interconnections among roads 0 through 6. As shown in FIG. 16, new multilink 6 corresponding to new road 6 has been introduced which includes a single display-related link Ld14. Display-related link Ld3 in FIG. 8 has been divided into two display-related links Ld3' and Ld3" corresponding to road parts r00 and r01 in FIG. 15 while display-related link Ld8 in FIG. 8 has been divided into two display-related links Ld8' and Ld8" corresponding to road parts r10 and r11 in FIG. 15. In other words, previous display-related link Ld3 has been replaced with new links Ld3' and Ld3" while previous display-related link Ld8 has been replaced by new links Ld8' and Ld8". Road 6 (multilink 6) is connected to road 0 (multilink 0) at nodes Nd12 and Nd12' as a single intersection, and is connected to road 1 (multilink 1) at nodes Nd13 and Nd13' as a single intersection. Nodes Nd12' and Nd13', and link Ld14 constitute multilink 6.

For easy description of replacement of a link with new links as described above, the previous link, such as link Ld3 or Ld8, will be referred to as an "original link" and the new links, such as links Ld3' and Ld3", or Ld8' and Ld8", will be referred to as an alternative link. The display-related link identification number of an original link (for example, display-related link identification number 103 or 108 in FIG. 8) will be referred to as original display-related link identification number.

In addition, each of alternative display-related links is provided with an auxiliary display-related link identification number that is different from the original display-related link identification number, whereby the original display-related link identification number and the auxiliary display-related link identification number can be used for identifying an alternative display-related link. The auxiliary display-related link identification number may take a predefined numerical range between zero through $SID_{MAX}$. For example, let us assume that alternative display-related links $L_0, L_1, \ldots, L_{M-1}$ of which the total number is M have been introduced instead of an original display-related link L, and arranged in the order beginning from $L_0$ and terminating at $L_{M-1}$ in the forward direction of the multilink corresponding to the original link L. In this case, alternative links $L_0, L_1, \ldots, L_{M-1}$ are provided with numerical ranges (0 through $SID_1-1$), ($SID_1$ through $SID_2-1$), ..., ($SID_{M-1}$ through $SID_{MAX}$), respectively where $0<SID_1<SID_2<\ldots<SID_{M-1} \leq SID_{MAX}$.

The auxiliary display-related link identification number is used in combination with the display-related link identification number of the original link in order to identify which original link is related to the auxiliary display-related link identification number. That is, a synthetic display-related link identification number idx:sid is given to each alternative link where idx is the display-related link identification number of the original link and sid is the auxiliary display-related link identification number. For example, when the display-related link identification number of original link L is idx, synthetic display-related link identification numbers (idx:0 through idx:$SID_1-1$), (idx:$SID_1$ through idx:$SID_2-1$), ..., (idx:$SID_{M-1}$ through idx:$SID_{MAX}$) are given to alternative links $L_0, L_1, \ldots, L_{M-1}$, respectively.

In the present embodiment, $SID_{MAX}=255$, and auxiliary display-related link identification numbers (0 to 127) and (128 through 255) are given respectively to alternative links Ld3' and Ld3" corresponding to original link Ld3 having the display-related link identification number 103. Accordingly, synthetic display-related link identification numbers (103:0 to 103:127) and (103:128 to 103:255) are given to alternative links Ld3' and Ld3", respectively as shown in FIG. 16.

It is preferable that an expediential or data-notational magnitude relation between the display-related link identification number and the synthetic display-related link identification number is defined. The significance of the data-notational magnitude relation will be understood by later descriptions. Let us assume that there are three display-related link identification numbers id1, id2, and id3 while there are two synthetic display-related link identification numbers (id2:sid2) and (id3:sid3) related to display-related link identification numbers id2 and id3. The data-notational magnitude relation between the display-related link identification number and the synthetic display-related link identification number can be defined expedientially as follows.

id1>(id2:sid2) if id1>id2.

id1=(id2:sid2) if id1=id2.

id1<(id2:sid2) if id1<id2.

Another data-notational magnitude relation among the synthetic display-related link identification numbers may be defined expedientially as follows.

(id2:sid2)>(id3:sid3) if id2>id3.

If id2=id3, (id2:sid2)>(id3:sid3) if sid2>id3, and (id2:sid2)=(id3:sid3) if sid2=id3.

A further data-notational magnitude relation among the display-related link identification numbers may be defined expedientially depending on the greatness of the synthetic display-related link identification numbers.

As will be described later, a range of display-related link identification numbers occupied with serially-connected display-related links can be expressed in accordance with the data-notational magnitude relation. The range of display-related link identification numbers will be used for updating route planning-related data frames.

Figure 17:
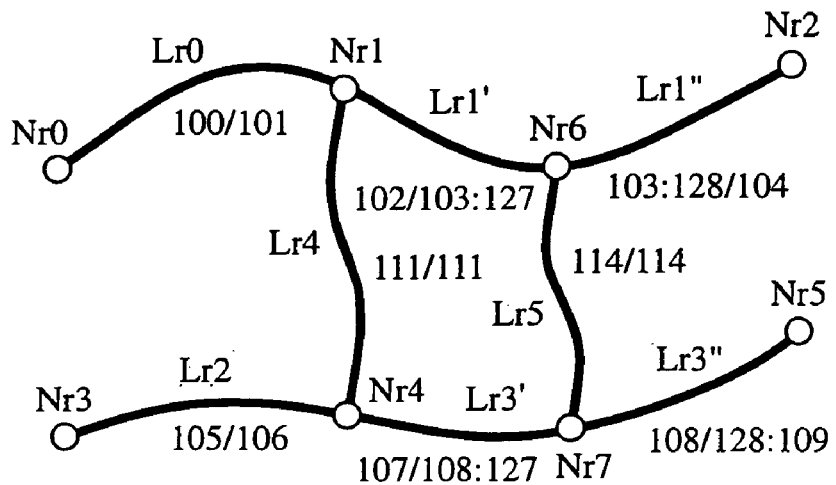
FIG. 17 is a simplified map, wherein nodes and links are imaginarily allocated to arterial roads used in route planning in order to update the route planning-related data frame of the map data according to the first through fourth embodiments of the present invention.

FIG. 17 is similar to FIG. 7 and shows nodes and links that are imaginarily allocated to the altered network of arterial roads 0, 1, 3, and 6 used in route planning in order to update the route planning-related data frame. It is assumed that newly added road 6 will be used for route planning. As shown in FIG. 17, new route planning-related link Lr5 corresponding to new road 6 is utilized. Route planning-related link Lr1 in FIG. 7 has been divided into two route planning-related links Lr1' and Lr1" while route planning-related link Lr3 has been divided into two route planning-related links Lr3' and Lr3". In other words, route planning-related link Lr1 has been replaced with links Lr1' and Lr1", and route planning-related link Lr3 has been replaced by links Lr3' and Lr3". Because of new construction of road 6, nodes Nr6 and Nr7 have been newly introduced.

Route planning-related link Lr1' corresponds to display-related links Ld2 and Ld3' in FIG. 16 while route planning-related link Lr1" corresponds to display-related links Ld3" and Ld4 in FIG. 16. While link Lr3' corresponds to links Ld7 and Ld8', link Lr3" corresponds to links Ld8" and Ld9. Route planning-related link Lr5 corresponds to display-related link Ld14.

The range of display-related link identification numbers occupied with display-related links Ld2 and Ld3' in FIG. 16 (i.e., route planning-related link Lr1') is determined as 102 to 103:127 on the basis of the original display-related link identification number 102 and the synthetic display-related link identification number (103:0 to 103:127) in accordance with the notational magnitude relation. The range is expressed as 102/103:127 as shown in FIG. 17. In addition, the range of display-related link identification numbers occupied with display-related links Ld2 and Ld3' in FIG. 16 (i.e., route planning-related link Lr1") is determined as 103:128 to 103:255 on the basis of the original display-related link identification number 104 and the synthetic display-related link identification number (103:128 to 104)

in accordance with the notational magnitude relation. The range is expressed as 103/128:104. The range of display-related link identification numbers in FIG. 17 corresponds to the combination of the start display-related link identification number and the end display-related link identification number in FIG. 9.

Range of display-related link identification numbers 102 to 103:127 includes the original display-related link identification numbers 102 and 103, and the synthetic display-related link identification numbers (102:0 to 102:255) and (103:0 to 103:127). The range of display-related link identification numbers 103:128 to 104 includes the original display-related link identification numbers 103 and 104, and synthetic display-related link identification numbers (103:128 to 103:255) and (104:0 to 104:255).

Since the combination of original display-related link identification numbers and auxiliary display-related link identification number is used for an identifier of an alternative route planning-related link as described above, it is facilitated to identify the correlation between display-related links and route planning-related links in data frames having different versions (for example, an old version of the display-related data frame and the latest version of route planning-related data frame) as will be described later.

In the same manner as to route planning-related links Lr1' and Lr1", other ranges of display-related link identification numbers are given to route planning-related links Lr3' and Lr3" as shown in FIG. 17, on the basis of the original display-related link identification numbers and the synthetic display-related link identification numbers. With reference to route planning-related links Lr0, Lr2, and Lr4 that have not been altered, the combination of the start display-related link identification number and end display-related link identification number has not been changed. With regard to new link Lr5, both of the start display-related link identification number and the end display-related link identification number are 114.

Figure 18:
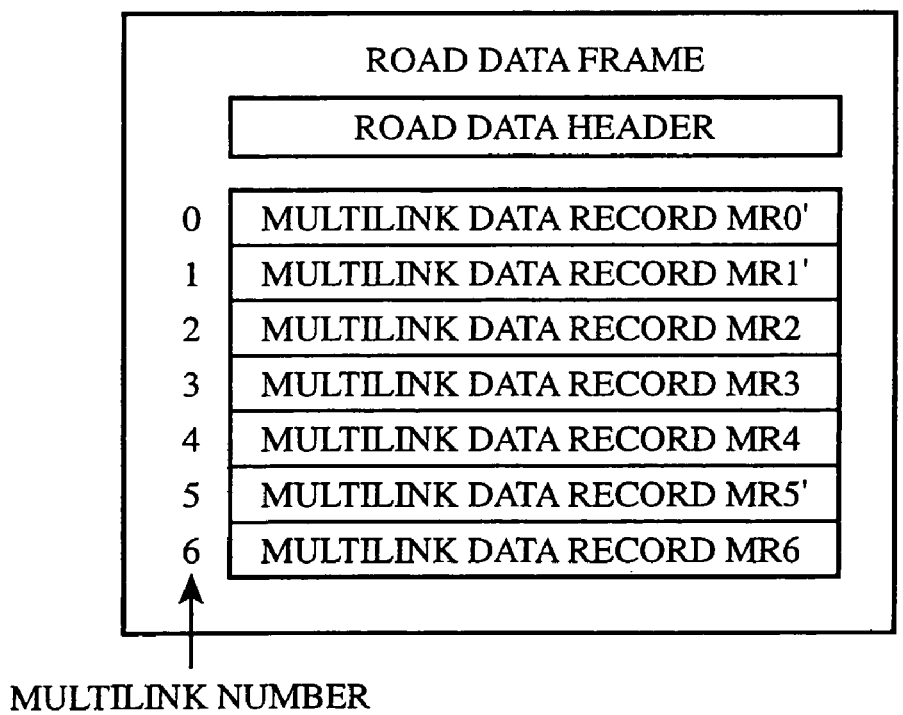
FIG. 18 is a diagram showing the format of an updated road data frame according to the first embodiment.

The road data frame shown in FIG. 18 is the updated road data frame that indicates the network of roads in FIG. 16. Multilink data records MR0', MR1', and MR5' in FIG. 18 corresponds to roads 0, 1, and 5, respectively, and are updates of multilink data records MR0, MR1, and MR5 in the road data frame in FIG. 10. New multilink data record MR6 indicative of new multilink 6 has been added. The road data header has also been updated on account of updating of the multilink data records.

FIG. 19 shows in detail node/link data records NLR00 through NLR05 in multilink data record MR0' (corresponding to multilink 0) and node/link data records NLR50 and NLR51 in multilink data record MR5' (corresponding to multilink 5) in FIG. 18. The architecture of each node/link data record in multilink data records in FIG. 19 is the same as that in the original multilink data records in FIG. 11. New multilink data record MR0' in FIG. 19 is different from original multilink data record MR0 of FIG. 11 in that new node/link data record NLR04I has been added and previous node/link data record NLR03 has been modified into new node/link data record NLR03'.

Newly added node/link data record NLR04I corresponds to new node Nd12 and link Ld3" connected to node Nd12 in the forward direction illustrated in FIG. 16. While previous node/link data record NLR03 corresponds to node Nd3 and display-related link Ld3 in FIG. 8, new node/link data record NLR03' corresponds to node Nd3 and display-related link Ld3' in FIG. 16. On account of separation of original display-related link Ld3 into new display-related links Ld3' and Ld3", in new node/link data record NLR03', the auxiliary display-related link identification presence information has been changed to indicate "present", the total number of intermediate (inter.) points and the coordinates of intermediate points have been updated, and the auxiliary display-related link identification information has become effective. In connection with added node/link data record NLR04I, the auxiliary display-related link identification presence information indicates "present" and the auxiliary display-related link identification information is effective.

The auxiliary display-related link identification information fields of node/link data records NLR03' and NLR04I contain the minimum numbers of auxiliary display-related link identification numbers given to alternative display-related links Ld3' and Ld3" (zero for link Ld3' and 128 for link Ld3" as shown in FIG. 16). The range of auxiliary display-related link identification numbers assigned to each alternative display-related link can be determined on the basis of the display-related link identification numbers and the auxiliary display-related link identification numbers of the node/link data record of interest and the next node/link data record. For example, since the display-related link identification information fields of node/link data records NLR03' and NLR04I indicates the same number (103) and auxiliary display-related link identification information of node/link data record NLR04I of which the node/link data number is 4 (see FIG. 10B) is 128, it is possible to determine that alternative display-related link Ld3' with the node/link data number being 3 is provided with the range of auxiliary display-related link identification numbers that is 0 to 127 (=128·1). Similarly, since the display-related link identification information fields of node/link data records NLR04I and NLR04 having the node/link data numbers of 4 and 5 indicates different numbers, it is possible to determine that alternative display-related link Ld3" is provided with the range of auxiliary display-related link identification numbers that is 128 through 255.

On the other hand, multilink data record MR5' (corresponding to multilink 5) is a modification of original multilink data record MR5 in FIG. 11 wherein node/link data numbers in intersection descriptions of node/link data records NLR50 and NLR51 have been changed. The reason for change is that the node/link data number of existing display-related node Nd4 (corresponding to node/link data record NLR50) has been changed from 4 to 5 by the addition of node Nd12 into multilink 0 (see FIG. 16) and the node/link data number of existing display-related node Nd10 (corresponding to node/link data record NLR51) has also been changed from 4 to 5 by the addition of node Nd13 into multilink 1.

FIG. 20 shows node/link data records of multilink data record MR1' (corresponding to multilink 1) in FIG. 18. Multilink data record MR1' can be updated as similar to multilink data record MR0'. New multilink data record MR1' in FIG. 20 is different from original multilink data record MR1 of FIG. 12 in that new node/link data record NLR14I has been added, and previous node/link data record NLR13 has been modified into new node/link data record NLR13'.

Furthermore, because of updating of multilink data records MR0', MR1', and MR5', the multilink header of each multilink data record (see FIG. 10B) is also updated.

FIG. 21 shows a route planning data frame indicating the network of roads in FIG. 17 after being updated. FIG. 22 shows the data architecture of a node record in FIG. 21. The architectures of the route planning data frame and the node record in FIGS. 21 and 22 are the same as those of original route planning data frame and the original node record in FIGS. 13 and 14. The route planning data frame in FIG. 21 is different from the original route planning data frame of FIG. 13 in that new node records NrR6 and NrR7 have been added, and previous node records NrR1, NrR2, NrR4, and NrR5 have been modified into new node records NrR1', NrR2', NrR4', and NrR5'.

Newly added node records NrR6 and NrR7 correspond to new nodes Nr6 and Nr7 in FIG. 17, respectively. Similarly to previous node records NrR1, NrR2, NrR4, and NrR5, updated node records NrR1', NrR2', NrR4', and NrR5' correspond to nodes Nr1, Nr2, Nr4, and Nr5. For the reason of updating of the node records, the route planning data header has also been updated.

As an instance of node records in FIG. 21, node record NrR1' (corresponding to node Nr1) will be described in detail. FIG. 22 shows the data architecture of node record NrR1' in FIG. 21. In comparison with node record NrR1 in FIG. 14, node record NrR1' in FIG. 22 includes an updated node record header and updated connection record CR10 as will be described below.

With reference to connection record CR10 corresponding to alternative route planning-related link Lr1' connected to node Nr1, corresponding auxiliary display-related link identification presence information (for end alternative display-related link) has been updated to indicate "present" since alternative route planning-related link Lr1' has been connected with node Nr1 instead of original route planning-related link Lr1 due to the addition of road 6 as shown in FIG. 17, whereby new node Nr6 is adjacent to node Nr1 over link Lr1' rather than node Nr2. Additionally, in connection record CR10, the adjacent node number has been changed from 2 to 6, which indicates node Nr6, a value according to links Lr1' has been introduced into the link cost data field, and the end display-related link identification number of the corresponding display-related link identification information has been replaced by 103. Indicating "present" by the corresponding auxiliary display-related link identification presence information (for end alternative display-related link) means that the original route planning-related link (e.g., Lr1) has been divided on the way in the forward direction, whereby the start link (e.g., Lr1') among the alternative route planning-related links connected to the same node includes an end display-related link having an effective auxiliary display-related link identification number. Contrarily, indicating "present" by the corresponding auxiliary display-related link identification presence information (for start alternative display-related link) means that the original route planning-related link (e.g., Lr1) has been divided on the way in the backward direction, whereby the end link among the alternative route planning-related links connected to the same node includes a start display-related link having an effective auxiliary display-related link identification number.

In addition, the corresponding auxiliary display-related link identification information, of which the end auxiliary display-related link identification number is 127, has become effective. Into the start auxiliary display-related link identification number field, the minimum number among the range of auxiliary display-related link identification numbers given to the alternative route planning-related link (e.g., Lr1') is introduced. The maximum number among the range of auxiliary display-related link identification numbers is introduced into the end auxiliary display-related link identification number. The corresponding display-related link identification information and the corresponding auxiliary display-related link identification information cooperate to indicate that alternative route planning-related link Lr1' corresponds to display-related links Ld2 and Ld3', which are connected serially and have the range of display-related link identification numbers from 102 to 103:127 as shown in FIG. 16. Thus, on the basis of the latest version of the route planning data frame, corresponding display-related links described in an old version of the road data frame can be determined and retrieved.

FIG. 23 shows principal contents of connection records in node record NrR6 as an example of added node records in the route planning data frame in FIG. 21. Connection records CR60, CR61, and CR62 in FIG. 23 correspond to links Lr1", Lr5, and Lr1', respectively that are connected to node Nr6 corresponding to node record NrR6. The adjacent node number of connection record CR60 indicates that node Nr6 is adjacent to node Nr2 over link Lr1" (see FIG. 17). The corresponding display-related link identification information and the corresponding auxiliary display-related link identification information of connection record CR60 indicate that link Lr1" corresponds to serially connected display-related links Ld3" and Ld4 of which the range of display-related link identification numbers is 103:128 to 104 as shown in FIG. 16. Connection record CR61 indicates that node Nr6 is adjacent to node Nr7 over link Lr5 by its adjacent node number. The corresponding display-related link identification information and the corresponding auxiliary display-related link identification information of connection record CR61 indicate that link Lr5 corresponds to display-related link Ld14 of which the range of display-related link identification numbers is 114 as shown in FIG. 16. Connection record CR62 indicates that node Nr6 is adjacent to node Nr1 over link Lr1' by its adjacent node number. The corresponding display-related link identification information and the corresponding auxiliary display-related link identification information of connection record CR61 indicate that link Lr1' corresponds to serially connected display-related links Ld2 and Ld3', of which the range of display-related link identification numbers is 102 to 103:127 as shown in FIG. 16.

Hereinbefore, the basic principle, on which the data architecture of updated map data is based, has been described with reference to FIGS. 15 through 23. As described above, since the combination of original display-related link identification numbers and auxiliary display-related link identification number is used for an identifier of an alternative route planning-related link, it is facilitated to identify the correlation between display-related links and route planning-related links in data frames having different versions (for example, an old version of the display-related data frame and the latest version of route planning-related data frame).

Therefore, as long as one map data processing apparatus a1 can acquire updated map data, the map data processing apparatus a1 can display maps accommodated to the latest actual roads, and can conduct map matching and route planning according to the latest actual roads. As described above, although the display-related data frame and the route planning-related data frame are of different versions, the correlation between display-related links and route planning-related links can be identified. Therefore, even if only one of the display-related data frame and the route planning-related data frame is acquired by the map data processing apparatus a1, it can display an optimal route candidate properly.

As an example of the method for obtaining updated map data by each map data processing apparatus a1, in the present embodiment, the map data providing apparatus a2 sends each map data processing apparatus a1 an update instruction data set, and the map data processing apparatus a1 modifies the original map data in accordance with the update instruction data set so as to obtain the updated map data. Consequently, individual map data processing apparatuses a1 may update the map data.

Figure 24:
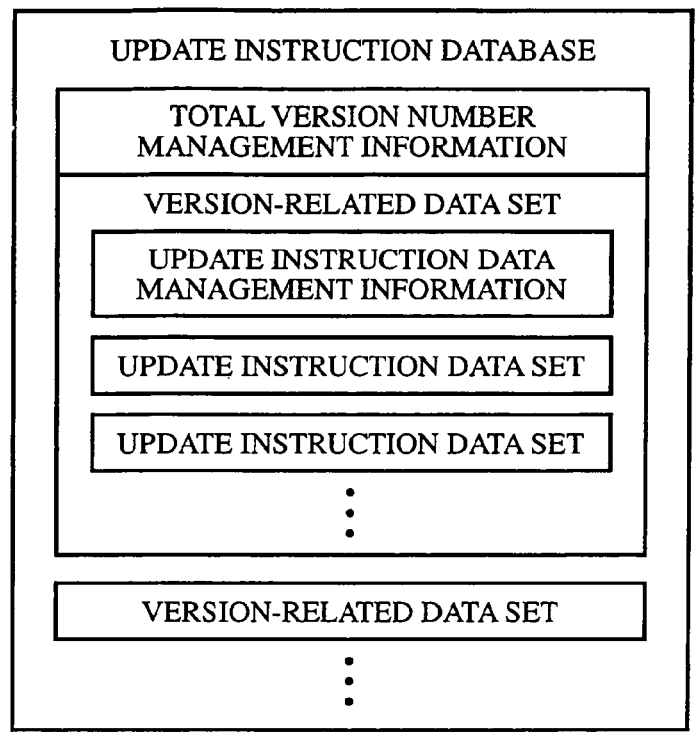
FIG. 24 is a diagram showing contents of update instruction database stored in a map data providing apparatus according to the present invention.

Next, a method for updating the map data by each map data processing apparatus a1 will be described. FIG. 24 shows contents of an update instruction database stored in the update instruction data storage 11 of the map data providing apparatus a2 (see FIG. 3). Whenever the map data supplier adds an update instruction data set, which will be described later, to the update instruction database, he introduces a change necessary due to the addition in another element (total version number management information which will be described later) in the update instruction database.

In the update instruction database, there are a total version number management information field, and fields for one or more version-related data sets. Each version-related data set includes information for modifying a version of map data to the latest version. The database may include a plurality of version-related data sets of which the total number is equal to the total number of existing versions. The total version number management information indicates the total number of the version-related data sets, the storage position and the size of each version-related data set, and so on for managing each version-related data set.

Each version-related data set contains update instruction data management information, and one or more update instruction data sets. Each update instruction data set is produced for updating the relevant version of the display-related data frame or the route planning-related data frame. More specifically, each update instruction data set is used for modifying the relevant version of the display-related data frame or the route planning-related data frame to the latest version. However, other update instruction data sets may be produced for updating the management data frame, the guidance-retrieval data frame (see FIG. 4), and other types of data frames. The update instruction data management information indicates the storage position and the size of each update instruction data, and so on for managing each update instruction data set.

Upon receiving an update instruction data request from a map data processing apparatus a1, the map data providing apparatus a2 makes reference to the total version number management information and the update instruction data management information in the update instruction database in the update instruction data storage 11, retrieves a necessary update instruction data set from the update instruction database, and send it to the map data processing apparatus a1, which has made the request.

Figure 25:
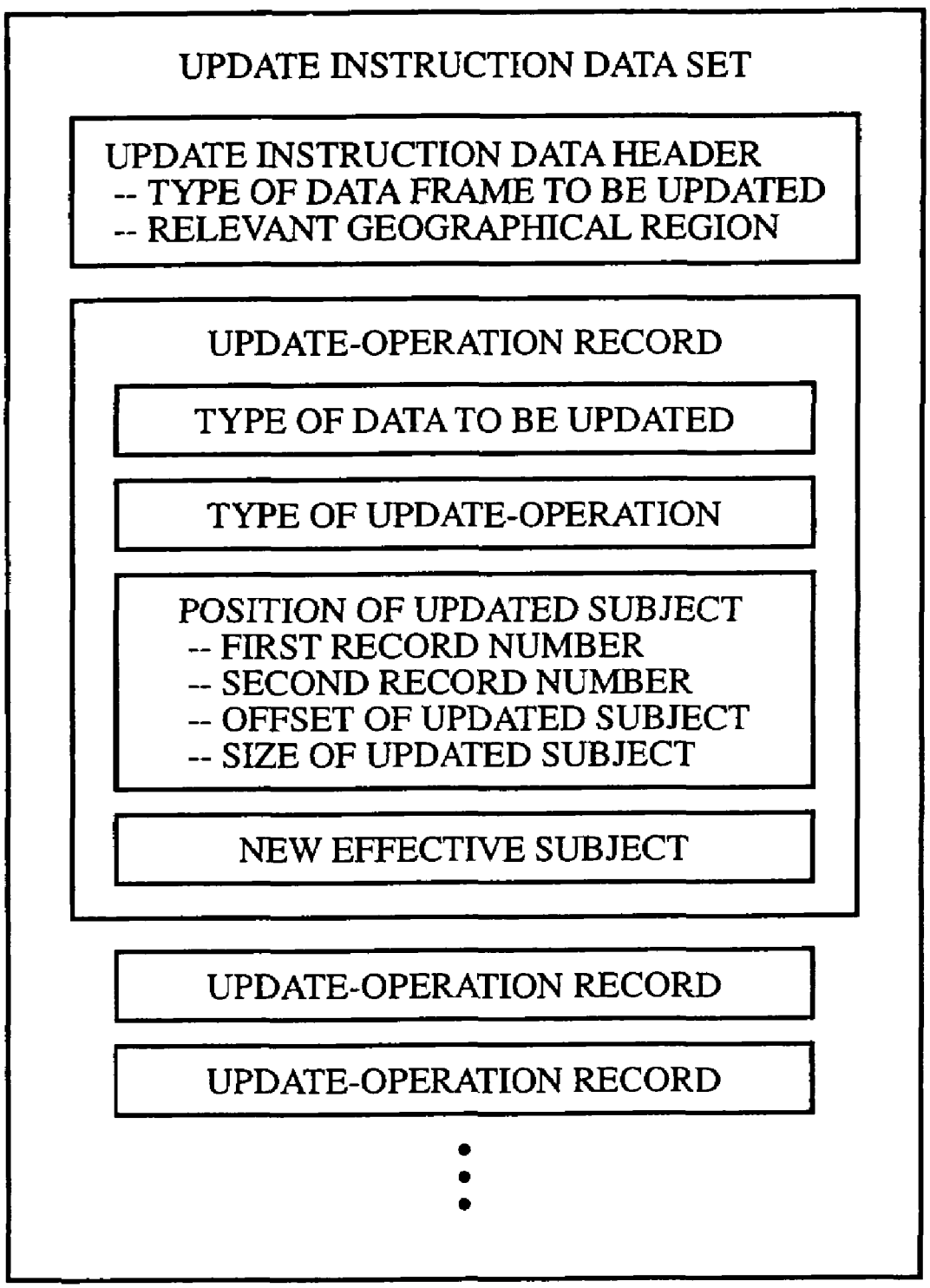
FIG. 25 is a diagram showing an example of data architecture of update instruction data set according to the first and second embodiments of the present invention.

FIG. 25 shows an example of the data architecture of the update instruction data set in FIG. 24. As shown in FIG. 25, the update instruction data set contains an update instruction data header and one or more update-operation records. The update instruction data header indicates the type of data frame (management data frame, display-related data frame, route planning-related data frame, or the like as shown in FIG. 4) to be updated, and relevant geographical region corresponding to the data frame to be updated.

The update-operation record designates the data operation required for updating the data frame designated by the update instruction data header. Each update-operation record indicates the type of data to be updated, the type of update-operation, the position of updated subject, and a new effective subject. The field of type of data to be updated designates the type of updated data item, such as the display-related data header, the road data frame, the route planning-related data header, the route planning data frame, or the like, in the data frame indicated by the update instruction data header. The field of type of update-operation indicates the type of update-operation, such as deletion, addition, insertion, or overwriting.

The field of position of updated subject designates the position of the updated subject in the data item designated by the field of type of data to be updated. The new effective subject is a specific content to be added, inserted, or overwritten. If the operation is deletion, the field of the new effective subject is void.

More specifically, the field of position of updated subject indicates a first record number, a second record number, an offset of updated subject, and a size of updated subject. The first record number is the multilink number of the multilink data record to be updated (see FIGS. 10A and 18) when the road data frame should be updated. When the route planning data frame should be updated, the first record number is the node number of the node record to be updated (see FIGS. 13 and 21). The second record number is the node/link data number of the node/link data record in the multilink data record designated by the first record number (see FIG. 10B) when the road data frame should be updated. When the route planning data frame should be updated, the second record number is the record number of the connection record in the node record designated by the first record number (see FIGS. 14 and 22). The offset of updated subject indicates the beginning position of the specific updated subject in the record (node/link data record, connection record, or the like) designated by the second record number. More specifically, the offset of updated subject is the length. i.e., the number of bytes from the beginning position of the record to the beginning position of the specific updated subject. The size of updated subject means the length of the specific updated or deleted subject.

However, headers (the road data header, multilink header, route planning data header, node record header, and so on) do not have serial numbers, such as the multilink number, node/link data number, and node number. Accordingly, when the first record number should designate the road data header, route planning data header, or the like, the first record number is set at −1. Similarly, when the second record number should designate the multilink header or the node record header, the second record number is also set at −1. Furthermore, if a header or an entire record should be updated in a lump, rather than a specific portion thereof, the offset of updated subject is set at −1 since the offset of updated subject is unnecessary to be designated.

The above-mentioned first record number, second record number, and offset of updated subject indicate the respective values that are used in the original version.

With reference to FIGS. 26A and 26B, the update instruction data set for replacing road data frame of FIG. 10A with that of FIG. 18 will be described. FIG. 26A shows an update instruction data set containing update-operation records for updating the road data frame. The update instruction data header indicates that the type of data frame to be updated is 1 for designating the display-related data frame and the relevant geographical region corresponds to the updated display-related data frame. Illustrated update-operation record group OPD1 is an aggregation of update-operation records for updating the road data header in the display-related data frame. Update-operation record group OPD2 is an aggregation of update-operation records for modifying multilink data records MR0, MR1, and MR5 in FIG. 10B to multilink data records MR0', MR1', and MR5' in FIG. 18.

Update-operation record group OPD3 is an aggregation of update-operation records for adding multilink data record MR6 of FIG. 18.

FIG. 26B shows update-operation records 0, 1, 2, and 3 for modifying multilink data record MR0 in FIG. 10A to multilink data record MR0' in FIG. 18. That is, update-operation records 0 through 3 are parts of update-operation record group OPD2 shown in FIG. 26A. In the fields of position of updated subject in FIG. 26B, the first record number fields (zero) is meant to multilink number 0 corresponding to previous multilink data record MR0. The second record number fields (−1, 3, and 4) is meant to node/link data numbers null, 3, and 4, corresponding to the previous multilink header, and previous node/link data records NLR03 and NLR04, respectively. The fields of offset of updated subject (−1) means that the header or the record should be updated as a whole.

Therefore, update-operation record 0 designates an operation for replacing the multilink header of multilink data record MR0 in FIG. 10A with that of multilink data record MR0' in FIG. 18. Update-operation record 1 designates an operation for deleting node/link data record NLR03 with node/link data number 3 in multilink data record MR0 in FIG. 11. Update-operation record 2 designates an operation for inserting node/link data record NLR03' with node/link data number 3 of multilink data record MR0' of FIG. 19 before node/link data record NLR04 with node/link data number 4 of multilink data record MR0 in FIG. 11. Update-operation record 3 designates an operation for inserting node/link data record NLR04I with node/link data number 4 of multilink data record MR0' of FIG. 19 before node/link data record NLR04 with node/link data number 4 of multilink data record MR0 in FIG. 11.

Node/link data records NLR03' and NLR04I, which will be introduced in response to the instruction by update-operation records 2 and 3, contain the display-related link identification information and the auxiliary display-related link identification information for alternative links Ld3' indicating display-related link identification number 103 for original link Ld3 and auxiliary display-related link identification numbers 0 to 127 for alternative links Ld3' (see FIG. 19). Node/link data records NLR03' and NLR04I also contain the display-related link identification information and the auxiliary display-related link identification information for alternative links Ld3" indicating display-related link identification number 103 for original link Ld3 and auxiliary display-related link identification numbers 128 through 255 for alternative links Ld3" (see FIG. 19).

Therefore, upon receiving the update instruction data set shown in FIGS. 26A and 26B, the map data processing apparatus a1 can update the data frame, i.e., display-related data frame designated by the update instruction data header by conducting the update-operation in compliance with the instruction by the update-operation records.

Next, with reference to FIGS. 27A and 27B, the update instruction data set for replacing route planning data frame of FIG. 13 with that of FIG. 21 will be described. FIG. 27A shows an update instruction data set containing update-operation records for updating route planning data frame. The update instruction data header indicates that the type of data frame to be updated is 2 for designating the route planning-related data frame and the relevant geographical region corresponds to the updated route planning-related data frame. Illustrated update-operation record group OPR1 is an aggregation of update-operation records for updating the route planning data header in the display-related data frame. Update-operation record group OPR2 is an aggregation of update-operation records for modifying node record NrR1, NrR2, NrR4, and NrR5 in FIG. 13 to node record NrR1', NrR2', NrR4', and NrR5' in FIG. 21. Update-operation record group OPR3 is an aggregation of update-operation records for adding node records NrR6 and NrR7 of FIG. 21.

FIG. 27B shows update-operation records 0, 1, and 2 for replacing node record NrR1 in FIG. 14 to node record NrR1' in FIG. 22. That is, update-operation records 0 through 2 are parts of update-operation record group OPR2 shown in FIG. 27A. In the fields of position of updated subject in FIG. 27B, the first record number fields (one) is meant to node number 1 corresponding to previous node record NrR1. The second record number fields (−1, 0, and 1) is meant to connection record numbers null, 0, and 1, corresponding to the previous node record header, and previous connection records CR10 and CR11, respectively. The fields of offset of updated subject (−1) means that the header or the record should be updated as a whole.

Therefore, update-operation record 0 designates an operation for replacing the node record header of node record NrR1 in FIG. 14 with that of node record NrR1" in FIG. 22. Update-operation record 1 designates an operation for deleting connection record CR10 with connection record number 0 in node record NrR1 in FIG. 14. Update-operation record 2 designates an operation for inserting connection record CR10 with connection record number 0 of node record NrR1' of FIG. 22 before connection record CR11 with connection record number 1 of node record NrR1 in FIG. 14.

Connection record CR10, which will be introduced in response to the instructions by update-operation record 2, contains the corresponding display-related link identification information and the corresponding auxiliary display-related link identification information for route planning-related links Lr1' indicating display-related link identification numbers 102 and 103 for original display-related links Ld2 and Ld3 and auxiliary display-related link identification numbers 0 to 127 for alternative links Ld3' (see FIG. 22).

Therefore, upon receiving the update instruction data set shown in FIGS. 27A and 27B, the map data processing apparatus a1 can update the data frame, i.e., route planning-related data frame designated by the update instruction data header by conducting the update-operation in compliance with the instructions by the update-operation records.

Figure 28:
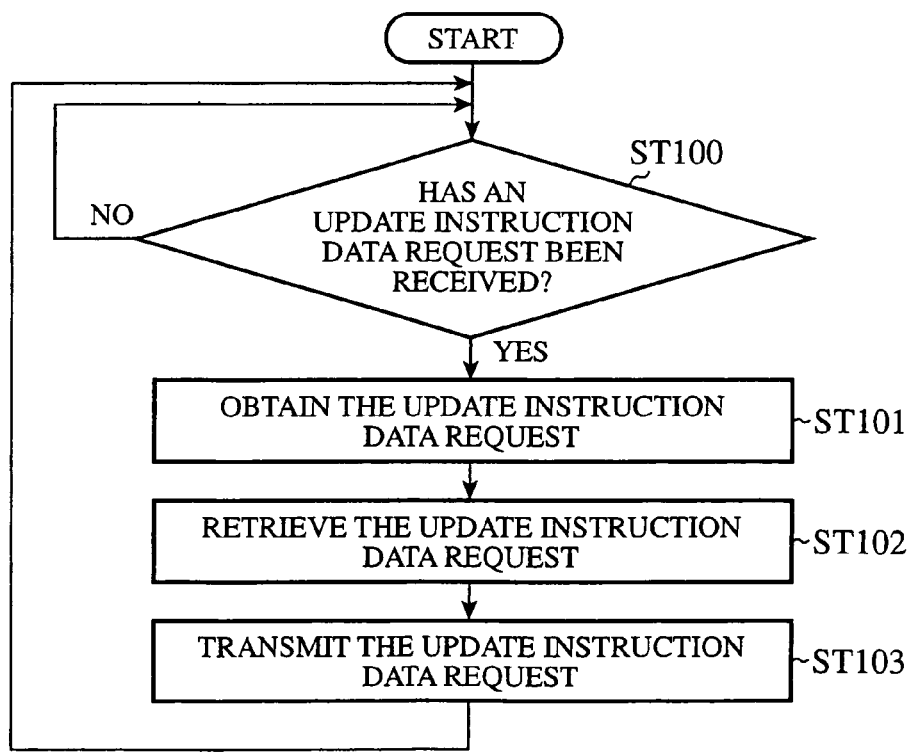
FIG. 28 is a flowchart showing an operation of the map data providing apparatus according to the first through fourth embodiments.

FIG. 28 is a flowchart showing an operation of the map data providing apparatus a2. In the present embodiment, whenever any of map data processing apparatuses a1 issues an update instruction data request, the map data providing apparatus a2 sends the requested update instruction data set to the map data processing apparatus a1. Once the map data providing apparatus is activated, the update instruction data distributor 12 waits at step ST100 until the transceiver 10 receives an update instruction data request from the transceiver 3 of any of dependent map data processing apparatus a1. Upon receiving an update instruction data request, the process proceeds to step ST101.

At step ST101, the update instruction data distributor 12 obtains the update instruction data request from the transceiver 10. The update instruction data request contains a map data processing apparatus identifier indicative of the map data processing apparatus a1 issuing the request, a data frame identifier indicative of the region and the type of data frame that are necessary for the navigation process in the map data processing apparatus a1, and a version identifier indicative of the version of the map data that the map data processing apparatus a1 possesses currently.

At step ST102, on the basis of the version identifier in the update instruction data request, the update instruction data distributor 12 searches the total version number management information (see FIG. 24) in the update instruction data storage 11 for the stored position of the version-related data set required to supersede the version of data frame, which the map data processing apparatus a1 currently has, by the latest version. Then, on the basis of the data frame identifier in the update instruction data request, the update instruction data distributor 12 searches the update instruction data management information (see FIG. 24) in the version-related data set for the storage position of the necessary update instruction data set corresponding to the data frame to be updated. Consequently, the update instruction data distributor 12 retrieves the necessary update instruction data.

For example, let us assume that the road data frame and the route planning data frame shown in FIGS. 18 and 21 belong to the latest version of map data while the map data storage 4 of the map data processing apparatus a1 issuing an update instruction data request stores the road data frame and the route planning data frame shown in FIGS. 10A and 13. In this case, when an update instruction data request for the display-related data frame and the route planning-related data frame is sent from the transceiver 3 of the map data processing apparatus a1, the update instruction data distributor 12 of the map data providing apparatus a2 retrieves two update instruction data sets; one contains the update-operation records in FIGS. 26A and 26B for superseding the road data frame of the display-related data frame in FIG. 10A by that in FIG. 18, and the second contains the update-operation records in FIGS. 27A and 27B for superseding the route planning data frame of the route planning-related data frame in FIG. 13 by that in FIG. 21.

Once one or more necessary update instruction data sets are thus retrieved from the update instruction data storage 11, the update instruction data distributor 12 transmits at step ST103 the update instruction data sets via the transceiver 10 to the map data processing apparatus a1, which has issued the request. Thereafter, the process proceeds to step ST100 where the update instruction data distributor 12 waits again until the transceiver 10 receives an update instruction data request from the transceiver 3 of any of dependent map data processing apparatus a1.

Thus, the update instruction data sets are forwarded to the map data processing apparatus a1, which has requested the update instruction data sets. Each update instruction data set designates the data part to be updated and the manner for treating the data part. For example, the update-operation records 2 and 3 in FIG. 26B contains the updated node/link data records NLR03' and NLR04I (see FIG. 19). Accordingly, each update instruction data set can make the map data processing apparatus a1 update the map data.

Figure 29:
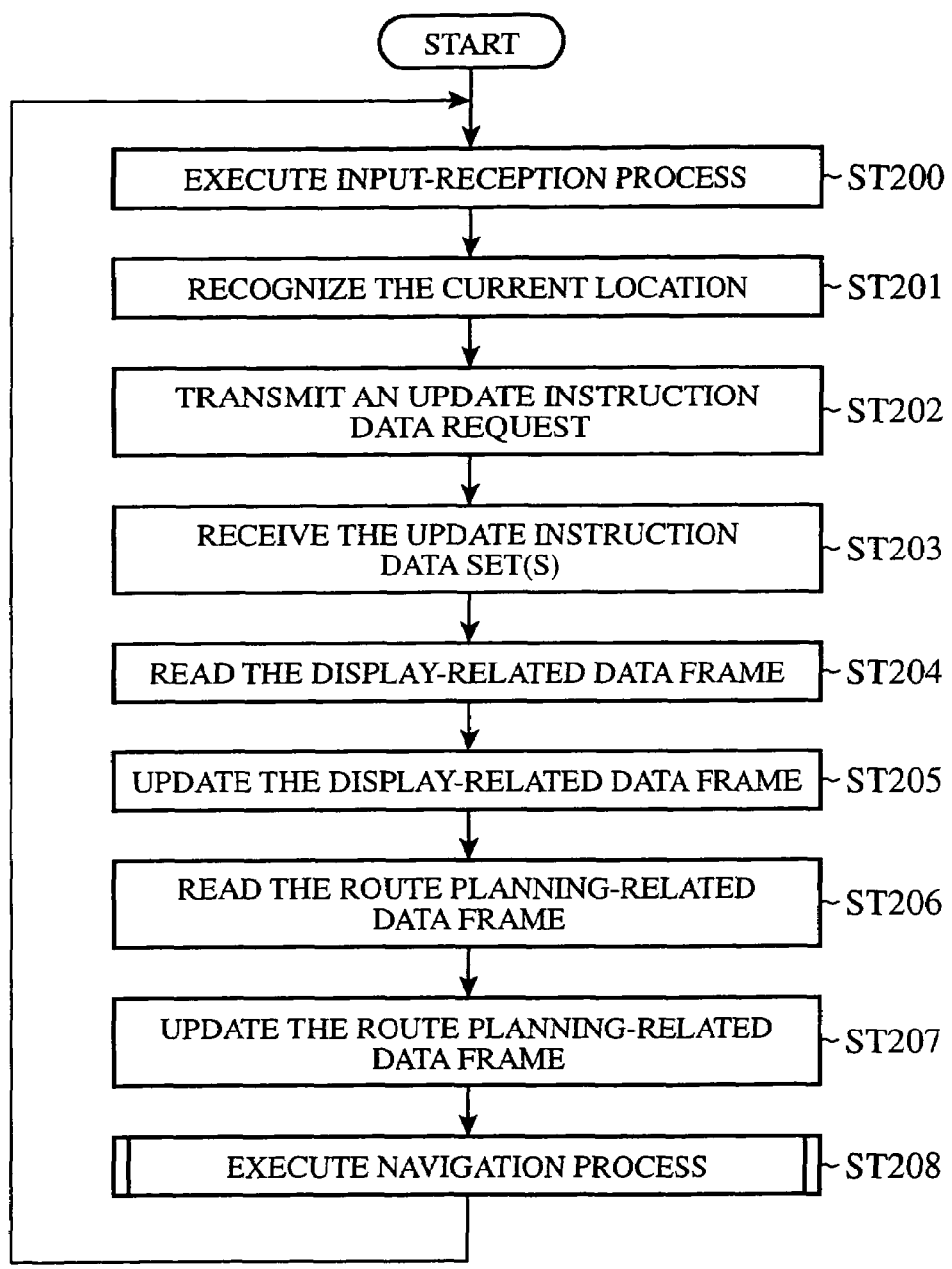
FIG. 29 is a flowchart showing an operation of each map data processing apparatus according to the first and second embodiments of the present invention.

FIG. 29 is a flowchart showing an operation of the processor 6 in each map data processing apparatus a1. Once the map data processing apparatus a1 is activated, the processor 6 executes an input-reception process at step ST200. During the input-reception process, using the input device 1, the user of a map data processing apparatus a1 gives his map data processing apparatus a1 various instructions for operating the apparatus a1, such as instructions on the contraction scale of map on the display device, for scrolling the displayed map, for selecting his destination, or for initiating the route planning process. The input device 1 gives the processor 6 various instruction signals in compliance with the user's operation or instruction, whereby the processor 6 captures these instruction signals from the input device 1 during the input-reception process. At step ST201, the processor 6 recognizes the current location of the map data processing apparatus a1, using the location detector 2.

At step ST202, the processor 6 determines the display-related data frame and the route planning-related data frame corresponding to the region or area where the user needs the navigation process, on the basis of the instruction signals, which has been obtained at step ST200, the current location, which has been recognized at step ST201, and the map data stored in the map data storage 4. Then, the processor 6 generates an update instruction data request that contains a data frame identifier indicative of the necessary data frames, a version identifier identifying the version of the map data frames, and a map data processing apparatus identifier indicating the map data processing apparatus a1 itself. The processor 6 then transmits the update instruction data request to the map data providing apparatus a2 via the transceiver 3, thereby demanding update instruction data set(s) for updating the desired display-related data frame and/or route planning-related data frame.

Next, at step ST203, using the transceiver 3, the processor 6 receives from the map data providing apparatus a2 the update instruction data set(s) responding to the update instruction data request (step ST202) for updating the desired display-related data frame and/or route planning-related data frame. The processor 6 then stores the update instruction data set(s), which has been received via the transceiver 3, into the update instruction data storage unit in the update instruction data storage 5.

For example, let us assume that the road data frame and the route planning data frame shown in FIGS. 18 and 21 belong to the latest version of map data while the map data storage 4 of the map data processing apparatus a1 issuing an update instruction data request stores the road data frame and the route planning data frame shown in FIGS. 10A and 13. In this case, the update instruction data storage 5 stores two update instruction data sets; one contains one the update-operation records in FIGS. 26A and 26B for superseding the road data frame of the display-related data frame in FIG. 10A by that in FIG. 18, and the second contains the update-operation records in FIGS. 27A and 27B for superseding the route planning data frame of the route planning-related data frame in FIG. 13 by that in FIG. 21.

Figure 30:
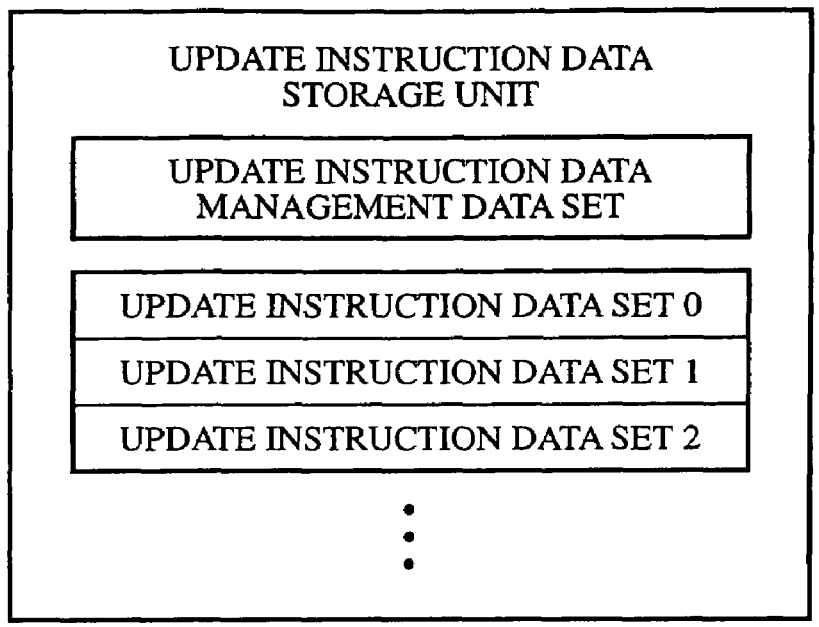
FIG. 30 is a diagram showing contents of an update instruction data storage unit of the map data processing apparatus according to the first through fourth embodiments of the present invention.

FIG. 30 shows contents of the update instruction data storage unit of the update instruction data storage 5 in the map data processing apparatus a1. The update instruction data storage unit stores an update instruction data management data set and one or more update instruction data sets 0, 1, 2, . . . The update instruction data management data set, which is used for management of update instruction data sets 0, 1, 2, . . . stored in the update instruction data storage unit, comprises one or more update instruction data management records, each indicating the storage position (address in the storage), size, acquisition status, and so on of each update instruction data.

When an update instruction data set has been successfully acquired at the receiving step, the processor 6 stores the update instruction data set in the update instruction data storage unit, and registers an update instruction data management record on the update instruction data management data set, wherein the update instruction data management record describes the storage position, the size and the acquisition status of the update instruction data set, and wherein the acquisition status designates that the acquisition has been done. On the other hand, if an update instruction data set fails to be received for problems, such as an obstruction to communication, the processor 6 produces another data set having the same contents as the update instruction data header of the requested update instruction data set. Then, the processor 6 stores this data set as the update instruction data set in the update instruction data storage unit, and registers an update instruction data management record on this data set, wherein the update instruction data management record describes the storage position and the size of this data set, and wherein the acquisition status designates that the acquisition has not been done. Therefore, whenever the map data processing apparatus a1 sends the update instruction data request, the number of update instruction data sets 0, 1, 2, . . . stored in the update instruction data storage unit will be increased.

Thus, in response to success of reception, the update instruction data storage unit stores, for example, the update instruction data set that contains the update-operation records in FIGS. 26A and 26B for superseding the road data frame of the display-related data frame in FIG. 10A by that in FIG. 18; the update instruction data set that contains the update-operation records in FIGS. 27A and 27B for superseding the route planning data frame of the route planning-related data frame in FIG. 13 by that in FIG. 21; and update instruction data management records for managing these update instruction data sets.

Next, at step ST204, the processor 6 obtains or reads from the map data storage 4 the non-updated display-related data frame, which has been decided at step ST202, e.g., the display-related data frame of the road data frame in FIG. 10A.

At step ST205, the processor 6 updates the display-related data frame, which has been obtained at step ST204. More specifically, the processor 6 first retrieves from the update instruction data storage unit of the update instruction data storage 5 the update instruction data set for the display-related data frame, which corresponds to the region or area where the user needs the navigation process, and examines the acquisition status in the update instruction data management record relevant to the update instruction data set. If the acquisition status indicates that the acquisition has been done, the processor 6 updates the display-related data frame, which has been obtained at step ST204, in accordance with the update instruction data set, and stores the updated display-related data frame to the map data storage unit in the update instruction data storage 5. On the other hand, if the acquisition status relevant to the update instruction data indicates that the acquisition has not been done, the processor 6 stores the display-related data frame to the map data storage unit in the update instruction data storage 5 without change.

Therefore, if the acquisition status indicates that the acquisition has been done, the processor 6 applies the update-operation, which is designated by the update-operation records of the update instruction data set, to the display-related data frame having the road data frame shown in FIG. 10A, and then records the updated display-related data frame in the map storage unit in the update instruction data storage 5. Thus, the road data frame of the display-related data frame stored in the map data storage unit is modified into the road data frame shown in FIG. 18. Consequently, by virtue of updating the display-related data frame by the processor 6 in accordance with the update instruction data set, the map data processing apparatus a1 can obtain the updated display-related data frame. If the acquisition status related to the update instruction data indicates that the acquisition has not been done, the display-related data frame having the non-updated road data frame shown in FIG. 10B is stored in the map data storage unit.

Figure 31:
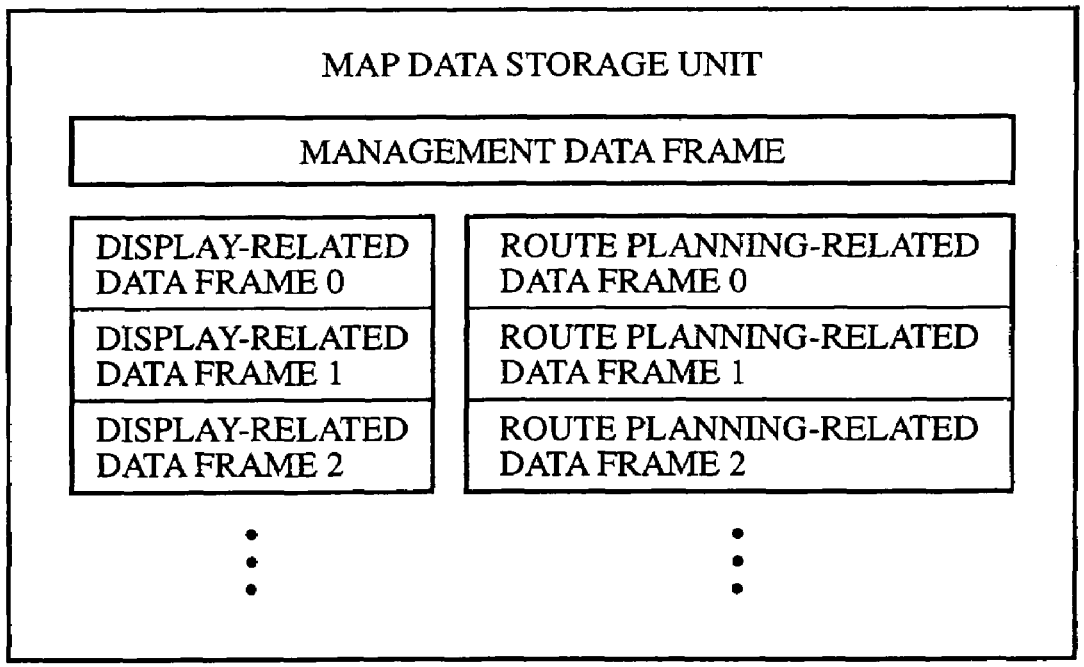
FIG. 31 is a diagram showing contents of a map data storage unit of the update instruction data storage of the map data processing apparatus according to the first through fourth embodiments of the present invention.

FIG. 31 is a diagram showing contents of a map data storage unit of the update instruction data storage 5. The map data storage unit stores a plurality of display-related data frame corresponding to a plurality of service regions (areas), respectively, and a plurality of route planning-related data frames corresponding to a plurality of regions, respectively. The map data storage unit also stores a management data frame for managing these display-related data frames and the route planning-related data frames. The management data frame includes data for identifying the storage positions (addresses in the update instruction data storage 5) for each display-related data frame and each route planning-related data frame. Essentially, the contents of the map data storage unit are the same as the map data stored in the map data storage 4 of FIG. 4.

Returning to FIG. 29, at step ST206, the processor 6 obtains or reads from the map data storage 4 the non-updated route planning-related data frame, which has been decided at step ST 202, e.g., route planning-related data frame having the route planning data frame in FIG. 13.

At step ST207, the processor 6 updates the route planning-related data frame, which has been obtained at step ST206. More specifically, the processor 6 first retrieves from the update instruction data storage unit of the update instruction data storage 5 the update instruction data set for the route planning-related data frame, which corresponds to the region or area where the user needs the navigation process, and examines the acquisition status in the update instruction data management record relevant to the update instruction data set. If the acquisition status indicates that the acquisition has been done, the processor 6 updates the route planning-related data frame, which has been obtained at step ST204, in accordance with the update instruction data set, and stores the updated route planning-related data frame to the map data storage unit in the update instruction data storage 5. On the other hand, if the acquisition status relevant to the update instruction data indicates that the acquisition has not been done, the processor 6 stores the route planning-related data frame to the map data storage unit in the update instruction data storage 5 without change.

Therefore, if the acquisition status indicates that the acquisition has been done, the processor 6 applies the update-operation, which is designated by the update-operation records of the update instruction data set, to the route planning-related data frame having the route planning data frame shown in FIG. 13, and then records the updated route planning-related data frame in the map storage unit in the update instruction data storage 5. Thus, the route planning data frame of the route planning-related data frame stored in the map data storage unit is modified into the road data frame shown in FIG. 21. Consequently, by virtue of updating the route planning-related data frame by the processor 6 in accordance with the update instruction data set, the map data processing apparatus a1 can obtain the updated route planning-related data frame. If the acquisition status related to the update instruction data indicates that the acquisition has not been done, the route planning-related data frame having the non-updated route planning data frame shown in FIG. 13 is stored in the map data storage unit.

At step ST208, a navigation process subroutine is invoked and executed. After completion of the navigation process, the process is returned to step ST200 and repeated. The navigation process uses the display-related data frame and the route planning-related data frame, which have been stored at steps ST205 and ST207 in the map data storage unit of the update instruction data storage 5, and complies with the instruction signals, which have been input at step ST200.

Figure 32:
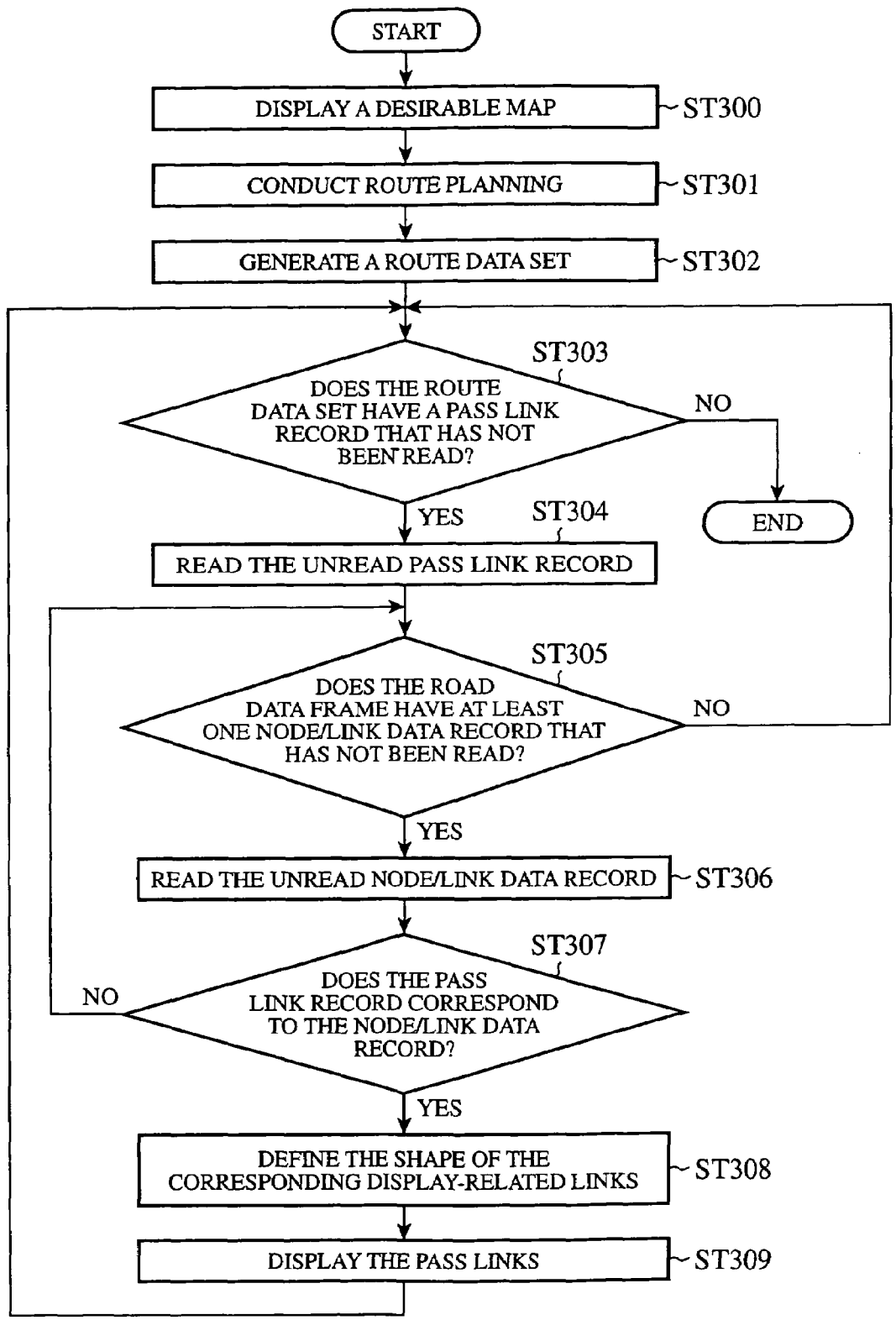
FIG. 32 is a flowchart showing a navigation process executed at the map data processing apparatus according to the first embodiment of the present invention.

FIG. 32 is a flowchart showing an example of the navigation process executed at step ST 208, wherein conducted is map presentation, route planning, and route presentation.

Figure 33A:
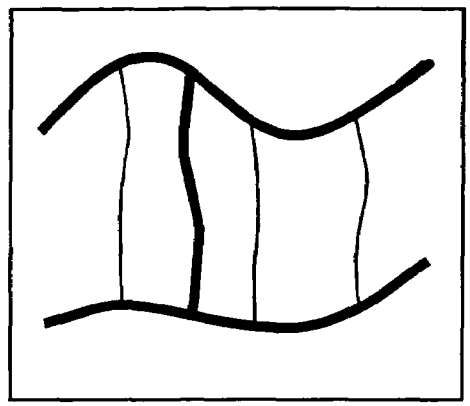
FIG. 33A is a diagram showing a display-screen image based on an old version of the display-related data frame.
Figure 33B:
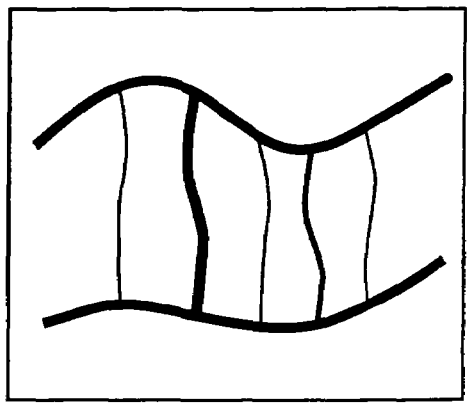
FIG. 33B is a diagram showing a display-screen image based on a new version of the display-related data frame.

First, at step ST300, using the display-related data frame stored in the map data storage unit of the update instruction data storage 5 in connection with the necessary region, the processor 6 displays a desirable map on the display device of the output device 7. If the display-related data frame is up-to-date, so as to have the road data frame in FIG. 18, the roads of network shown in FIG. 14 will be displayed on the display device as shown in FIG. 33B. However, if the display-related data frame is not up-to-date, so as to have the road data frame in FIG. 10A, the roads of network shown in FIG. 5 will be displayed on the display device as shown in FIG. 33A.

At step ST301, using the route planning-related data frame stored in the map data storage unit of the update instruction data storage 5 in connection with the necessary region, the processor 6 conduct route planning by means of Dijkstra's algorithm or other suitable algorithms. In route planning, an optimal route from a place of departure to a destination in which the required cost such as the approximate time is minimum is sought. Then, the processor 6 generates pass node information on the basis of the optimal route, such that node numbers of the nodes through which the user should pass from the place of departure to the destination are arranged in the order of passing. Such nodes are referred to as pass nodes.

At step ST302, on the basis of the pass node information, which has been produced at step ST301, data on the links constituting the optimal route are extracted from the route planning data frame of the route planning-related data frame related to the necessary region. Then, a route data set is produced on the basis of the information.

Figure 34:
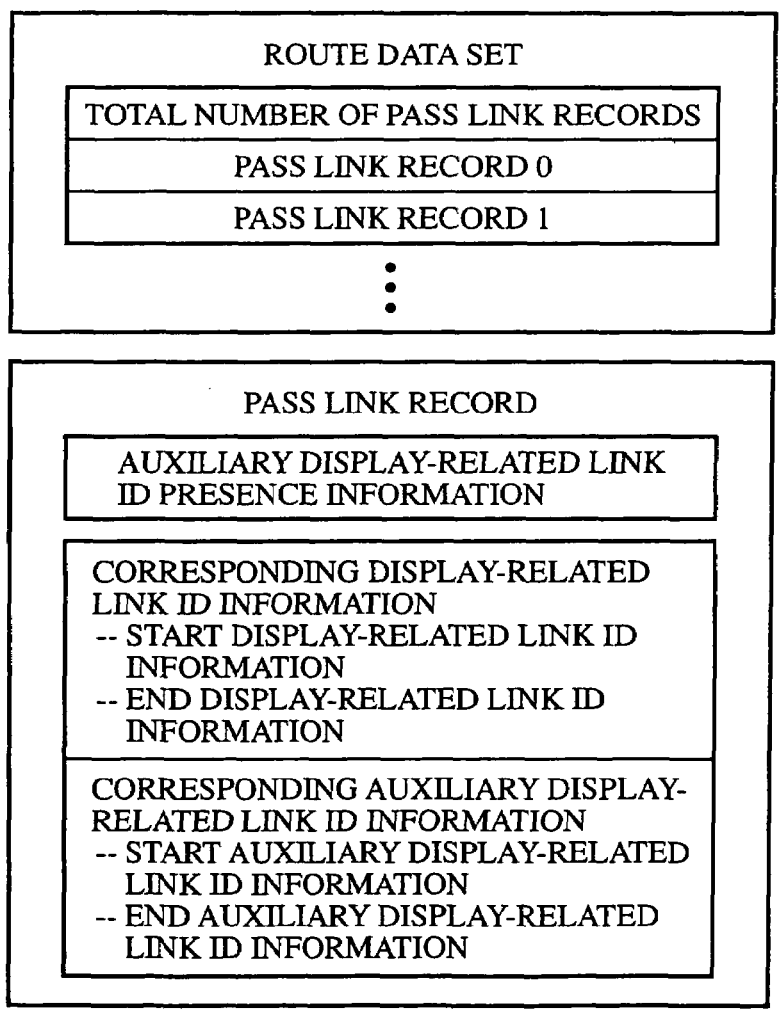
FIG. 34 is a diagram showing the architecture of a route data set produced by the map data processing apparatus in the navigation process.

FIG. 34 shows the architecture of a route data set produced by the map data processing apparatus a1 in the navigation process. The route data set contains pass link records and a field of the total number of pass link records. The pass link record designates the display-related link identification numbers of display-related links, respectively, wherein the display-related links corresponds to the route planning-related links connecting the pass nodes. Each pass link record contains the auxiliary display-related link identification presence information, the corresponding display-related link identification information, and the corresponding auxiliary display-related link identification information, which are extracted from one of connection records shown in FIGS. 14 and 22.

The corresponding display-related link identification information includes a start display-related link identification number and an end display-related link identification number that mean a range of display-related link identification numbers of the display-related links corresponding to the route planning-related link. The corresponding auxiliary display-related link identification information includes a start auxiliary display-related link identification number and an end auxiliary display-related link identification number that mean a range of auxiliary display-related link identification numbers of the alternative links corresponding to the route planning-related link. The corresponding auxiliary display-related link identification presence information indicates whether or not the record indicates each of the corresponding start auxiliary display-related link identification number and the corresponding end auxiliary display-related link identification number in the corresponding auxiliary display-related link identification information.

The route data set can be produced in a manner described as follows:

First, a node record (see FIG. 23) corresponding to each pass node is searched to find a connection record of which the adjacent node number indicates the next pass node. Then, the combination of the corresponding display-related link identification information and the corresponding auxiliary display-related link identification information is extracted from the connection record. A pass link record is assembled in such a manner that the extracted information is used as the corresponding display-related link identification information and the corresponding auxiliary display-related link identification information of the pass link record.

FIGS. 35 and 36 shows exemplified contents of a route data set. FIG. 35 shows contents of a route data set based on the updated route planning data frame. This route data set designates that the optimal route resulting from the route planning passes through nodes Nr3, Nr4, Nr1, Nr6, and Nr2 in FIG. 17. The corresponding display-related link identification information and the corresponding auxiliary display-related link identification information in FIG. 35 indicate the display-related link identification numbers of the display-related links shown in FIG. 16 corresponding to route planning-related links Lr2, Lr4, Lr1', and Lr1" in FIG. 17. As a result, by virtue of the route data set in FIG. 35, it is possible to recognize that the optimal route is constituted of display-related links Ld5, Ld6, Ld11, Ld2, Ld3', Ld3", and Ld4 shown in FIG. 16.

FIG. 36 is a diagram showing exemplified contents of another route data set based on the non-updated route planning data frame. This route data set designates that the optimal route resulting from the route planning passes through nodes Nr3, Nr4, Nr1, and Nr2 in FIG. 9. The corresponding display-related link identification information and the corresponding auxiliary display-related link identification information in FIG. 36 indicate the display-related link identification numbers of the display-related links shown in FIG. 8 corresponding to route planning-related links Lr2, Lr4, and Lr1 shown in FIG. 9. As a result, by virtue of the route data set in FIG. 36, it is possible to recognize that the optimal route is constituted of links Ld5, Ld6, Ld11, Ld2, Ld3, and Ld4 shown in FIG. 8.

Returning to FIG. 32, at step ST303, the processor 6 determines whether or not the route data set has at least one pass link record that has not been read out. If all of the pass link records have been read for step ST 304 that will be described next, the determination at step ST303 is negative, so that the process ends. That is, the navigation process at step ST208 illustrated in FIG. 29 ends. On the other hand, if there is such a pass link record, which has not been read out from the route data set, the process proceeds to step ST304.

At step ST304, the processor 6 reads one of the unread pass link records. Reading at step ST304 enables the processor 6 to define the shape of the optimal route constituted of the display-related links on the basis of the read pass link records, and to display it on the display device.

At step ST305, the processor 6 determines whether or not the road data frame of the display-related data frame, which is stored in the map data storage unit of the update instruction data storage 5 and is related to the necessary region, has at least one node/link data record that has not been read out. If all of the node/link data records have been read for step ST 306 that will be described next, the determination at step ST305 is negative, so that the process returns to step ST303. On the other hand, if there is such a node/link data record, which has not been read out from the road data frame of the display-related data frame for the necessary region, the process proceeds to step ST306.

At step ST306, the processor 6 reads one of the unread road data frame of the display-related data frame for the necessary region from the map data storage unit of the update instruction data storage 5.

At step ST307, it is determined whether or not the pass link record, which has been retrieved at step ST304, corresponds to the node/link data record, which has been retrieved at step ST306. More specifically, on the basis of the above-described data-notational magnitude relation of display-related link identification number and synthetic display-related link identification number, it is determined whether or not the range of display-related link identification numbers (which will be referred to as range "A" hereinafter) identified by the display-related link identification information and the auxiliary display-related link identification information of the node/link record, which has been read at step ST306, is included in the range of display-related link identification numbers (which will be referred to as range "B" hereinafter) identified by the corresponding display-related link identification information and the corresponding auxiliary display-related link identification information of the pass link record, which has been read at step ST304. If the range "A" is included in the range "B", the process proceeds to step ST308. Otherwise, the process returns to step ST305.

By executing the job of step ST307, the link provided with range "B" of display-related link identification numbers designated by each pass link record in the route data set is associated with the link provided with range "A" of display-related link identification numbers designated by each node/link data record in the display-related data frame. Next, at step ST308, the processor 6 acquires coordinates of nodes intermediate points defined in the associated node/link data record. Thus, the processor 6 defines the shape of the display-related links, which correspond to the pass link record, which has been read from the route data set at step ST304.

At step ST309, using the coordinates of nodes and intermediate points, which has been sought at step ST308, the shape of the pass link is displayed on the display device of the output device 7 in such a manner that the pass link is superimposed on the road map, which has been displayed at step ST300. As shown in FIG. 37A or 37B, the optimal route links are shown by bolder lines superimposed on the thinner lines that represent the network of roads.

After step ST309, the process returns to step ST303, so as to repeat the jobs at steps ST303 through ST309, thereby extending the displayed route of the pass links on the basis of the next pass link records. Finally, the entire route shown in FIG. 37A or 37B is displayed on the road map screen.

In the present embodiment, by means of the reception status, i.e., the acquisition status of each update instruction data set corresponding to the necessary region, the update status of each of the route planning data frame and the display-related data frame for the necessary region in the map data processing apparatus a1 can be distinguished. There may be four statuses as follows:

In the first status, both of the route planning data frame and the display-related data frame for the necessary region have been updated in the map data processing apparatus a1. In accordance with the update instruction data set, the map data processing apparatus a1 has generated a route planning data frame, e.g., shown in FIG. 21 and a road data frame, e.g., shown in FIG. 18, and has stored them in the map data storage unit of the update instruction data storage 5. In this case, ranges "A" and "B" of display-related link identification numbers, which are used at step ST307, indicate the display-related link identification numbers of the updated frames.

In the second status, while the route planning data frame for the necessary region has been updated, the display-related data frame has not been updated. For example, an updated route planning data frame in FIG. 21 and an old version road data frame in FIG. 10 have been stored in the map data storage unit of the update instruction data storage 5. In this case, range "A" of display-related link identification numbers has also been updated while range "B" has not been updated (relates to the old version).

In the third status, while the route planning data frame for the necessary region has not been updated, the display-related data frame has been updated. For example, an old version of planning data frame in FIG. 13 and an updated road data frame in FIG. 18 have been stored in the map data storage unit of the update instruction data storage 5. In this case, range "A" of display-related link identification numbers has not been updated while range "B" has been updated.

In the fourth status, neither the route planning data frame nor the display-related data frame for the necessary region has been updated. For example, an old version of route planning data frame in FIG. 13 and an old version road data frame in FIG. 10 have been stored in the map data storage unit of the update instruction data storage 5. In this case, ranges "A" or "B" of display-related link identification numbers have not been updated.

More specifically, the above-described determination at step ST307 for associating the pass link record and the node/link data record is conducted as follows:

Let us assume that the route data set shown in FIG. 35 is now generated on the basis of the updated route planning data frame in the first status. As to pass link record 0, the range of display-related link identification numbers 105 to 106 corresponds to node/link data records NRL10 and NLR11 (corresponding to links Ld5 and Ld6 in FIG. 16) of multilink data record MR1' in FIG. 20. As to pass link record 1, the range of display-related link identification numbers 111 to 111 corresponds to node/link data record NRL30 (corresponding to Ld11 in FIG. 16) of multilink data record MR3 in FIG. 12. As to pass link record 2, the range of display-related link identification numbers 102 to 103:127 corresponds to node/link data records NRL02 and NLR03' (corresponding to links Ld2 and Ld3' in FIG. 16) of multilink data record MR0' in FIG. 19. As to pass link record 3, the range of display-related link identification numbers 103:128 to 104 corresponds to node/link data record NRL04I and NLR04 (corresponding to links Ld3" and Ld4 in FIG. 16) of multilink data record MR0' in FIG. 19.

Therefore, optimal route links, in particular links Ld5, Ld6, Ld11, Ld2, Ld3', Ld3", and Ld4 in FIG. 16, may be presented on the display-screen image. The resulting optimal route is shown in FIG. 37B, in a manner that the optimal route links are superimposed on the altered network of roads.

Let us assume that the route data set shown in FIG. 35 is now generated on the basis of the updated route planning data frame in the second status. As to pass link record 0, the range of display-related link identification numbers 105 to 106 corresponds to node/link data records NRL10 and NLR11 (corresponding to links Ld5 and Ld6 in FIG. 16) of multilink data record MR1 in FIG. 12. As to pass link record 1, the range of display-related link identification numbers 111 to 111 corresponds to node/link data record NRL30 (corresponding to Ld11 in FIG. 8) of multilink data record MR3 in FIG. 12. As to pass link record 2, the range of display-related link identification numbers 102 to 103:127 corresponds to node/link data records NRL02 and NLR03 (corresponding to links Ld2 and Ld3 in FIG. 9) of multilink data record MR0 in FIG. 11. As to pass link record 3, the range of display-related link identification numbers 103:128 to 104 corresponds to node/link data records NRL03 and NLR04 (corresponding to links Ld3 and Ld4 in FIG. 8) of multilink data record MR0' in FIG. 19.

Therefore, optimal route links, in particular links Ld5, Ld6, Ld11, Ld2, Ld3, and Ld4 in FIG. 8, may be presented on the display-screen image. The resulting optimal route is shown in FIG. 37A, in a manner that the optimal route links are superimposed on the original network of roads.

Let us assume that the route data set shown in FIG. 36 is now generated on the basis of the non-updated route planning data frame in the third status. As to pass link record 0, the range of display-related link identification numbers 105 to 106 corresponds to node/link data records NRL10 and NLR11 (corresponding to links Ld5 and Ld6 in FIG. 16) of multilink data record MR1' in FIG. 20. As to pass link record 1, the range of display-related link identification numbers 111 to 111 corresponds to node/link data record NRL30 (corresponding to Ld11 in FIG. 16) of multilink data record MR3 in FIG. 12. As to pass link record 2, the range of display-related link identification numbers 102 to 104 corresponds to node/link data records NRL02, NLR03', NLR04I, and NLR04 (corresponding to links Ld2, Ld3', Ld3'', and Ld4 in FIG. 16) of multilink data record MR0' in FIG. 19.

Therefore, optimal route links, in particular links Ld5, Ld6, Ld11, Ld2, Ld3', Ld3'', and Ld4 in FIG. 16, may be presented on the display-screen image. The resulting optimal route is shown in FIG. 37B, in a manner that the optimal route links are superimposed on the altered network of roads.

Let us assume that the route data set shown in FIG. 36 is now generated on the basis of the non-updated route planning data frame in the fourth status. As to pass link record 0, the range of display-related link identification numbers 105 to 106 corresponds to node/link data records NRL10 and NLR11 (corresponding to links Ld5 and Ld6 in FIG. 8) of multilink data record MR1 in FIG. 12. As to pass link record 1, the range of display-related link identification numbers 111 to 111 corresponds to node/link data record NRL30 (corresponding to Ld11 in FIG. 8) of multilink data record MR3 in FIG. 12. As to pass link record 2, the range of display-related link identification numbers 102 to 104 corresponds to node/link data records NRL02, NLR03, and NLR04 (corresponding to links Ld2, Ld3, and Ld4 in FIG. 8) of multilink data record MR0 in FIG. 12.

Therefore, optimal route links, in particular links Ld5, Ld6, Ld11, Ld2, Ld3, and Ld4 in FIG. 8, may be presented on the display-screen image. The resulting optimal route is shown in FIG. 37A, in a manner that the optimal route links are superimposed on the original network of roads.

In the second and third statuses, although the map data processing apparatus a1 stores the display-related data frame and the route planning-related data frame being of different versions, the link-association between the display-related data frame and the route planning-related data frame can be recognized in accordance with the present embodiment as described above. Accordingly, the map data processing apparatus a1 can display an optimal route properly although it can obtain only one of those data frames.

As will be understood from the above description, in accordance with the first embodiment, the data architecture of map data comprises a road data part (road data frame) for map presentation that includes display-related link identification information indicative of original links and auxiliary display-related link identification information used for indicating alternative links, wherein the display-related link identification information for each original link and the auxiliary display-related link identification information for its alternative links are associated with each other. Accordingly, a map data processing apparatus, such as a computer, logical circuit, or a combination thereof can recognize the relationship between the original link and the alternative links (see FIGS. 11, 12, 19, and 20).

The data architecture of map data also comprises a route planning data part (route planning data frame) for route planning that includes the display-related link identification information (corresponding display-related link identification information) indicative of the original links and the auxiliary display-related link identification information (corresponding auxiliary display-related link identification information) used for indicating alternative links, wherein the display-related link identification information for each original link and the auxiliary display-related link identification information for its alternative links are associated with each other, whereby the map data processing apparatus can recognize the relationship between the original link and the alternative links (see FIGS. 14, 22, and 23). Therefore, although the version of the road data frame differs from that of the route planning data frame, the relationship between the newly introduced alternative links and their original link can be recognized. Accordingly, the map data processing apparatus a1 can display an optimal route properly although only one of those data frames has been updated.

Furthermore, the data architecture of the update instruction data set comprises one or more update-operation records for adding to the map data the data items in connection with the alternative links, and each update-operation record contains the display-related link identification information indicative of the original link and auxiliary display-related link identification information indicative of its alternative links (see FIGS. 26B and 27B). Accordingly, the data architecture of the update instruction data set is suitable for updating both of the road data frame and the route planning data frame of the map data architecture. Upon receiving the update instruction data set, the map data processing apparatus a1 can update the corresponding records in the road data frame or the route planning data frame automatically in compliance with the designations in the update-operation records.

In the present embodiment, each update-operation record in the data architecture of update instruction data set informs a map data processing apparatus (computer, logical circuit, or a combination thereof) of the type of data to be updated and the position of updated subject. Therefore, in order that the map data processing apparatus a1 achieve updating, the apparatus requires only one or more new effective subjects, such as the multilink header, node/link data record, node record, and/or connection record, which should be introduced into the map data, in addition to the above information. Accordingly, the size of the update instruction data set may be minimized.

Second Embodiment

Next, a second embodiment of the present invention will be described. The map data processing apparatuses a1 and the map data providing apparatus a2 shown in FIGS. 1 through 3 are also used in the second embodiment. The function of each structural element of the map data processing apparatuses a1 and map data providing apparatus a2 in the second embodiment is essentially equivalent to that in the first embodiment. In addition, the map data architecture used in the map data processing apparatus a1 is essentially equivalent to that in the first embodiment (FIG. 4), so as to include a display-related data frame and a route planning-related data frame that are similar to those described with reference to FIGS. 10 through 14.

However, the format of each multilink data record of the road data frame in the display-related data frame is different from that shown in FIG. 11. FIG. 38 shows the format of multilink data records according to the second embodiment. With respect to the multilink data records in FIG. 38, each node/link data header not only indicates the total number of intermediate points on the corresponding link and auxiliary display-related link identification presence information, but also indicates link validity information indicating whether the corresponding link is invalid or valid. In the first version of map data, all of the link validity information fields contain a value indicative of "valid."

The embodiment will be described in conjunction with the maps represented in FIGS. 5 through 9 as similar to the first embodiment. Consequently, the multilink data records shown in FIG. 38 is also produced in light of the maps shown in FIGS. 5, 6, and 8, whereby the architecture and contents of the multilink data records are the same as those of the multilink data records shown in FIG. 11, except for the link validity information.

Figure 39:
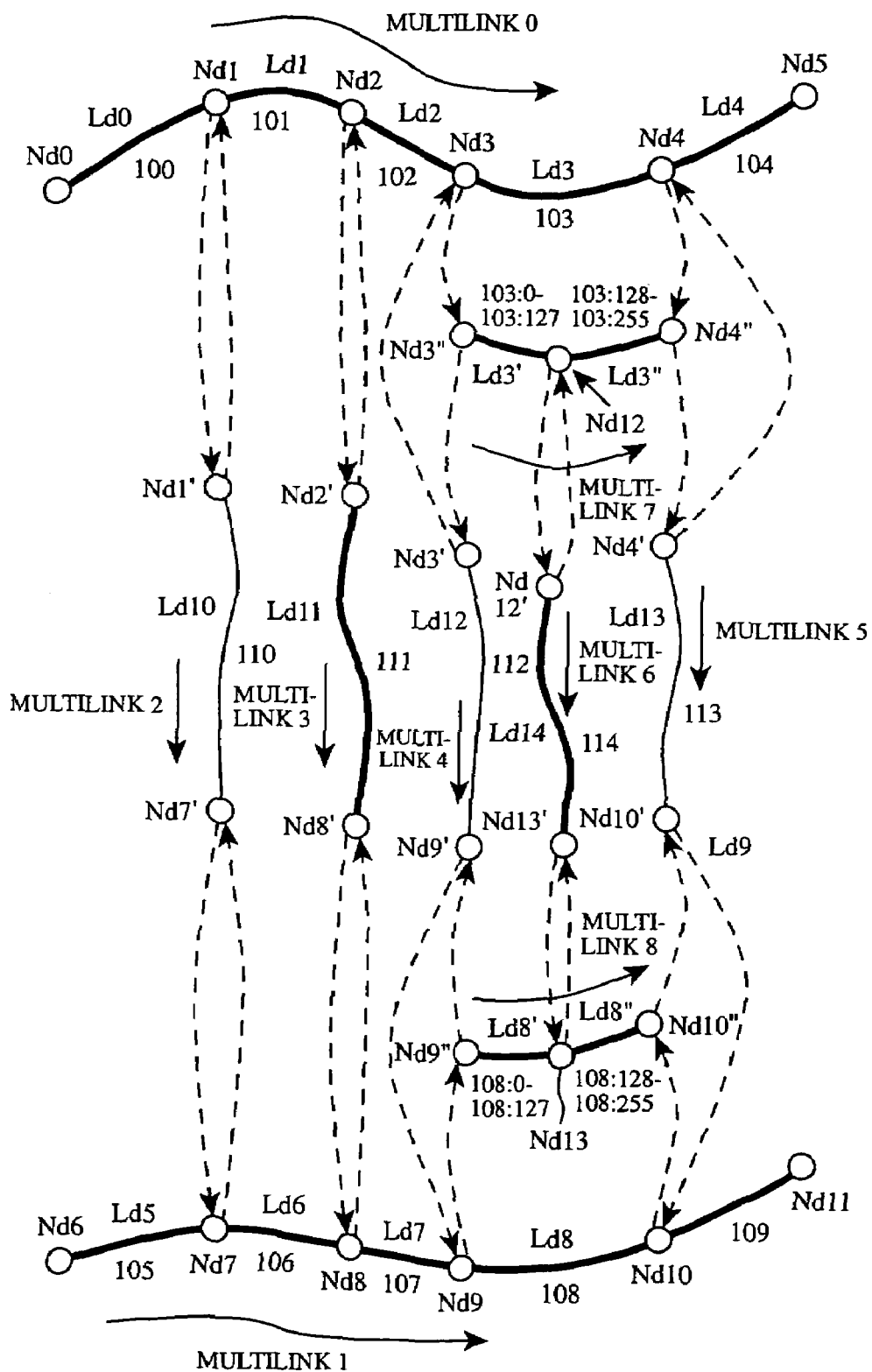
FIG. 39 is a diagram wherein the network of roads after alteration is disassembled into a plurality of links, and display-related link identification numbers are allocated to the links for updating the map data according the second embodiment of the present invention.

Next, the updating process for the map data to conform to alteration of network of roads, or to conform to replenishment of the map data will be described. In the same way as the description on the first embodiment, let us assume that a road 6 shown in FIG. 15 should be described in the map data newly. FIG. 39 is a diagram similar to FIG. 16, showing nodes, links, multilinks, and display-related link identification numbers that are allocated to the altered network of roads in FIG. 15 in order to indicate the interconnections among road 0 through 6 for updating the display-related data frame.

As shown in FIG. 39, there are multilink 6 corresponding to road 6 that was newly constructed or should be described in the map data newly, and new multilinks 7 and 8 connected with multilink 6. Multilink 7 corresponds to road part r0 (see FIG. 5) equivalent to original link Ld3 in FIG. 8, and includes alternative links Ld3' and Ld3" corresponding to road parts r00 and r01 (see FIG. 15). Multilink 8 corresponds to road part r1 (see FIG. 5) equivalent to original link Ld8 in FIG. 8, and includes alternative links Ld8' and Ld8" corresponding to road parts r10 and r11 (see FIG. 15).

Nodes Nd3" and Nd4" at both terminals of multilink 7 are connected with nodes Nd3 and Nd4 at both terminals of link Ld3 corresponding to road part r0 of road 0 in the original network of roads. Similarly, nodes Nd9" and Nd10" at both terminals of multilink 8 are connected with nodes Nd9 and Nd10 at both terminals of link Ld8 corresponding to road part r1 of original road 1. Node Nd12 on multilink 7 is connected with start node Nd12' on multilink 6 while node Nd13 on multilink 8 is connected with end node Nd13'. As will be described later, original links Ld3 and Ld8 will be considered as "invalid" links, i.e., absent links. The same display-related link identification numbers for links Ld3', Ld3", Ld8', and Ld8" in FIG. 16 are also used for identifying links Ld3', Ld3", Ld8', and Ld8" in FIG. 39.

FIG. 40 shows the format of an updated road data frame indicative of the network of roads in FIG. 39. The road data frame contains a road data header, which is the same as that in FIG. 10A, and a plurality of multilink data records MR0S through MR8S. Multilink data records MR0S through MR8S correspond to multilinks 0 through 8 in FIG. 39, respectively, and each multilink record contains information related to the corresponding multilink or road.

FIG. 41 shows contents of multilink data record MR0S in FIG. 40. The architecture of each node/link data record of the multilink data record in FIG. 41 is the same as that of FIG. 38. Multilink data record MR0S is an update of multilink data record MR0 in FIG. 38.

In FIG. 41, node/link data record NLR03S (corresponding to node Nd3 and original link Ld3) is a modification of previous node/link data record NLR03, wherein the link validity information has been changed to indicate "invalid", and the intersection description has been changed to indicate that the junction node of node Nd3 is node Nd3" on multilink 7. In addition, node/link data record NLR04S (corresponding to node Nd4 and original link Ld4) is a modification of previous node/link data record NLR04, wherein the intersection description has been changed to indicate that the junction node of node Nd4 between links Ld3 and Ld4 is node Nd4" on multilink 7.

FIG. 42 shows contents of multilink data record MR7S (corresponding to new multilink 7) in FIG. 40. Node/link data records NLR70S, NLR71S, and NLR72S in multilink data record MR7S respectively correspond to combinations of node and link (Nd3", Ld3'), (Nd12, Ld3"), and (Nd4", null) that appear sequentially when moving along the multilink 7 in the forward direction. In multilink data record MR7S, all link validity information fields of node/link data records indicate "valid", so as to mean that links Ld3' and Ld3" are valid. The intersection descriptions of node/link data records NLR70S, NLR71S, and NLR72S corresponding to nodes Nd3", Nd12, and Nd4" on multilink 7 are set to indicate that the junction nodes are node Nd3' on multilink 4, node Nd12' on multilink 6, and node Nd4' on multilink 5, respectively. The display-related link identification information fields for links Ld3' and Ld3" in node/link data record NLR70S and NLR71S are set to contain the display-related link identification number 103 that means link Ld3. In addition, the auxiliary display-related link identification information fields for links Ld3' and Ld3" in node/link data records NLR70S and NLR71S are set to contain values 0 and 128, respectively.

On the basis of multilink number 7 of the intersection description and node/link data number 0 in node/link data record NLR03S shown in FIG. 41, node/link data record NLR70S in FIG. 42 can be derived. Inversely, node/link data record NLR03S can be derived from multilink number 0 and node/link data number 3 in node/link data record NLR70S. Similarly, on the basis of multilink number 7 of the intersection description and node/link data number 2 in node/link data record NLR04S shown in FIG. 41, node/link data record NLR72S in FIG. 42 can be derived. Inversely, node/link data record NLR04S can be derived from multilink number 0 and node/link data number 4 in node/link data record NLR72S. Therefore, it is possible to recognize that original link Ld3 intersects alternative links Ld3' and Link Ld3" at nodes Nd3 (Nd3") and Nd4 (Nd4").

FIG. 43 shows contents of multilink data record MR6S (corresponding to new multilink 6) in FIG. 40. Node/link data records NLR60S and NLR61S in multilink data record MR6S respectively correspond to combinations of node and link (Nd12", Ld14) and (Nd13", null) that appear sequentially when moving along the multilink 6 in the forward direction. In multilink data record MR6S, all link validity information fields of node/link data records indicate "valid", so as to mean that link Ld14 is valid. The intersection descriptions of node/link data records NLR60S and NLR61S corresponding to nodes Nd12' and Nd13' on multilink 7 are set to indicate that the junction nodes are node Nd12 on multilink 7 and node Nd13 on multilink 8, respectively. The display-related link identification information filed for link Ld14 in node/link data record NLR60S is set to contain the display-related link identification number 114.

Although not illustrated, other updated or new multilink data records, i.e., multilink data records MR1S and MR8S (corresponding to multilink 1 and new multilink 8) are also generated to indicate the new network of roads in FIG. 39 in accordance with the same principle.

Hereinbefore, the basic principle, on which the data architecture of the display-related data frame of the updated map data is based, has been described with reference to FIGS. 39 through 43. The entire route planning-related data frame including this route planning data frame has the same architecture as that of the first embodiment, and the architecture of the updated route planning-related data frame is the same as the first embodiment (see FIGS. 17 and 21 through 23).

As described above, when an original link (e.g., Ld3) has been replaced with serially connected alternative links (e.g., Ld3' and Ld3"), the node/link data record (e.g., NLR03) for the original link has not been deleted from and node/link data records for the alternative links have not been inserted into the existing multilink data record in the road data. Therefore, the node/link data numbers for identifying the node/link data records (e.g., NLR04S and NLR05S) in multilink data records MR0S and MR1S shown in FIG. 40, which correspond to nodes Nd4 and Nd5 in modified multilink 0 and nodes Nd10 and Nd11 in modified multilink 1 shown in FIG. 39, have not been changed from the original node/link data number for identifying the node/link data records (e.g., NLR04 and NLR05) in previous multilink data records MR0 and MR1. Therefore, with respect to multilink data record MR2S through MR5S, the node/link data number in each intersection description is not necessary to be revised and is maintained continuously.

Consequently, the updates in multilinks 0 and 1 in FIG. 39 do not affect multilink data records MR2 through MR5 corresponding to multilinks 2 through 5 of which corresponding roads have not been altered, or involve updating the multilink data records MR2 through MR5. However, the reliability of each intersection description is maintained. For example, node/link data record NLR04S in FIG. 41 can be derived from multilink number 0 and node/link data number 4 of node/link data record NLR50 in FIG. 38, and node/link data record NLR72S in FIG. 42 can be derived from multilink number 7 and node/link data number 2 of node/link data record NLR04S in FIG. 41.

In accordance with a conventional data architecture of map data, when it is necessary to update the map data on account of new construction of a road, and so on, a great amount of data should be updated, whereby the time required for the updating process in each user's map data processing apparatus may be increased. For example, when a road is newly constructed or an existing road should be described in the map data newly, an original link intersecting the new link should be divided into alternative links. According to the conventional technique, it is contemplated that node/link data numbers should be reallocated to node/link records on nodes and links that appear after the original link when moving along the multilink in the forward direction. It is also contemplated that the reallocation of a node/link data number to one node/link data record involves revising the node/link data number in each intersection description of node/link records about other links although the links have not been altered. This means that it is necessary to revise a great amount of data related to the new road indirectly in addition to data related to it directly.

On the other hand, in accordance with the second embodiment, it is not necessary to update any multilink data records for multilinks of which corresponding roads have not been altered. Therefore, the amount of data to be processed is small, so that the updating process in each map data processing apparatus is not complicated. In the above-described exemplified road data frame in the display-related data frame, only multilink data records MR0S, MR1S, MR6S, MR7S, and MR8S corresponding to roads 0, 1, 6, 7, and 8 should be revised or added.

As long as a map data processing apparatus a1 can acquire updated map data, the map data processing apparatus a1 can display maps accommodated to the latest actual roads, and can conduct map matching and route planning according to the latest actual roads. As an example of the method for obtaining updated map data by each map data processing apparatus a1, as similar to the first embodiment, the map data providing apparatus a2 sends each map data processing apparatus a1 an update instruction data set, and the map data processing apparatus a1 modifies the original map data in accordance with the update instruction data set so as to obtain the updated map data. Consequently, individual map data processing apparatuses a1 may update the map data.

Next, a method for updating the map data by each map data processing apparatus a1 will be described. In the same way as the first embodiment, the update instruction data storage 11 (see FIG. 3) of the map data providing apparatus a2 stores the update instruction database of which the contents are shown in FIG. 24. Whenever the map data supplier adds an update instruction data set to the update instruction database, he introduces a change necessary due to the addition in the total version number management information.

In the same way as the first embodiment, each version-related data set in the update instruction database includes update instruction data sets, each of which is produced for updating the display-related data frame or the route planning-related data frame. The update instruction data set for the display-related data frame causes the processor 6 of the map data processing apparatus a1 to revise the old version of the road data frame in FIG. 10 to the latest version in FIG. 40. The update instruction data set for the display-related data frame is shown FIG. 44. On the other hand, the update instruction data for the route planning-related data frame causes the processor 6 of the map data processing apparatus a1 to revise the old version of the route planning data frame in FIG. 13 to the latest version in FIG. 21. The update instruction data set for the route planning-related data frame has the architecture shown in FIGS. 27A and 27B.

With reference to FIG. 44, the update instruction data set for revising the old version of the road data frame in FIG. 10 to the latest version will be described. The update instruction data set has the same data architecture as that of the update instruction data set in FIG. 25 used in the first embodiment. Illustrated update-operation record group OPDS1 is an aggregation of update-operation records for updating the road data header in the display-related data frame. Update-operation record group OPDS2 is an aggregation of update-operation records for modifying multilink data record MR0 in FIG. 10A to multilink data record MR0S in FIG. 40. Update-operation record group OPDS3 is an aggregation of update-operation records for modifying multilink data record MR1 in FIG. 10A to multilink data record MR1S in FIG. 40. Update-operation record group OPDS4 is an aggregation of update-operation records for adding multilink data records MR6S, MR7S, and MR8S of FIG. 40.

Update-operation record group OPDS2, which is used for modifying multilink data record MR0 to multilink data record MR0S, designates an operation for rewriting the link validity information in node/link data record NLR03 in multilink data record MR0, which corresponds to original link Ld3, so that the link validity information indicates "invalid." The update-operation record group OPDS2 also designates an operation for rewriting the intersection descriptions in node/link data records NL03 and NL04, which correspond to nodes at both terminals of original link Ld3, so that the intersection descriptions indicate that the nodes at both terminals of original link Ld3 are connected with nodes at both terminals of new multilink 7. Consequently, update-operation record group OPDS2 includes two multilink data records for replacing node/link data records NL03 and NL04 in multilink data record MR0 by node/link data records NL03S and NL04S, and a multilink data record for replacing the previous multilink header by the new multilink header. The formats of these multilink data records will be understood by a person skilled in the art if he reads the description in conjunction with FIG. 26 of the first embodiment.

Update-operation record group OPDS3, which is used for modifying multilink data record MR1 to multilink data record MR1S, designates an operation for rewriting the link validity information in the node/link data record in multilink data record MR1, which corresponds to original link Ld8, so that the link validity information indicates "invalid." The update-operation record group OPDS3 also designates an operation for rewriting the intersection descriptions in node/link data records, which correspond to nodes at both terminals of original link Ld8, so that the intersection descriptions indicate that the nodes at both terminals of original link Ld8 are connected with nodes at both terminals of new multilink 8.

Update-operation record group OPDS4, which is used for adding multilink data records MR6S, MR7S, and MR8S, includes update-operation records used for adding new multilink data records MR6S, MR7S, and MR8S, and update-operation records used for adding the contents of the new multilink data records. For example, update-operation record group OPDS4 comprises update-operation records, which include instructions for adding node/link data records NLR70S through NLR72S indicative of alternative links Ld3' and Ld3". These update-operation records contain instructions for causing node/link data records NLR70S through NLR72S to have link validity information fields indicating that alternative links Ld3' and Ld3" are valid for map presentation, and to have intersection descriptions indicating that alternative links Ld3' and Ld3" intersect original link Ld3.

As described above, when an original link has been replaced with serially connected alternative links, it is necessary to update or add only multilink data records (e.g., MR0S, MR1S, MR6S, MR7S, and MR8S) corresponding to roads (e.g., 0, 1, 6, 7, and 8) while it is unnecessary to update multilink data records (e.g., MR2 through MR5) corresponding to multilinks (e.g., 2 through 5) of which corresponding roads have not been altered. Therefore, the update instruction data does not include update-operation records for updating the multilink data records MR2 through MR5.

On the other hand, the route planning data frame of the route planning-related data frame can be updated in the map data processing apparatus a1 in the same manner as the first embodiment. Update instruction data sets for the route planning-related data frame may be the same as those described in conjunction with the first embodiment (see FIGS. 27A and 27B).

As similar to the first embodiment, in response to an update instruction data request from any of map data processing apparatuses a1, the map data providing apparatus a2 sends the map data processing apparatus a1 the requested update instruction data set for the display-related data frame or the route planning-related data frame separately, as shown in FIG. 28, in the present embodiment. Thus, when an original link has been replaced with serially connected alternative links, a map data processing apparatus a1 is provided with an update instruction data set that includes link validity information indicating that the original link is invalid, multilink data records (e.g., MR7S and MR8S) for adding multilinks having the alternative links, and intersection descriptions indicating the interconnection between the multilinks and the original link. Since the update instruction data set excludes data on multilinks of which corresponding roads have not been altered, the size of the update instruction data set may be small requiring shorter time for forwarding the update instruction data set.

The processor 6 of the map data processing apparatus a1 in the second embodiment operates in a manner that is substantially the same as that in first embodiment described in conjunction with FIG. 29, except for the navigation process at step ST208, which will be described later. Therefore, in accordance with the update instruction data set for display-related data frame received at step ST203, the processor 6 updates the old version of the road data frame in FIG. 10A. The processor 6 then stores the new display-related data frame, which includes the resulting up-to-date version of the road data frame (FIG. 40) in the map data storage unit of the update instruction data storage 5 at step ST205. In addition, in accordance with the update instruction data set for the route planning-related data frame received at step ST203, the processor 6 updates the route planning-related data frame having the old version of route planning data frame in FIG. 13. The processor 6 then stores the new route planning-related data frame, which includes the resulting up-to-date version of the rout planning data frame (FIG. 21) in the map data storage unit of the update instruction data storage 5 at step ST206.

Since each update instruction data set designates the data part to be updated and the manner for treating the data part, the map data processing apparatus a1 can conduct the update-operation based on the update-operation record, thereby updating the map data. Since the update instruction data excludes data on multilinks of which corresponding roads have not been altered, it is possible for the map data processing apparatus a1 to shorten the time required for receiving the update instruction data set, to lessen the amount of data to be processed, and to shorten the time for the updating process.

Figure 45:
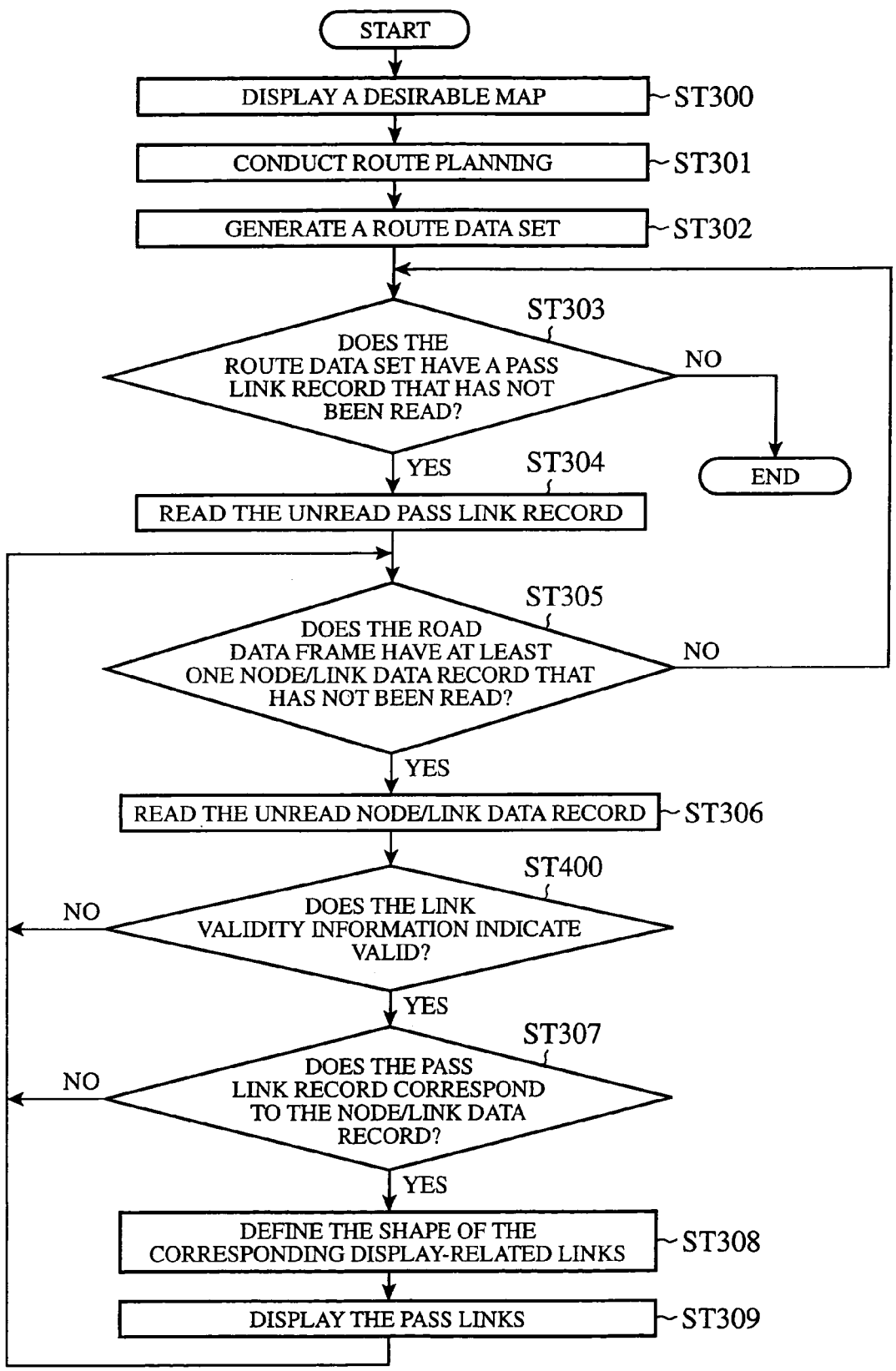
FIG. 45 is a flowchart showing an operation of the map data providing apparatus according to the second embodiment of the present invention.

Next, with reference to FIG. 45, the navigation process (step ST208 in FIG. 29) according to the second embodiment will be described. The flowchart of FIG. 45 is different from that of FIG. 32 in that step ST400 is inserted between steps ST306 and ST307. However, the other steps are the same as those in the first embodiment.

At step ST400, the processor 6 examines the link validity information of the node/link data record, which has been retrieved at step ST306. If the link validity information indicates "invalid," the process is returned to step ST305 since the corresponding display-related link is useless for route presentation. On the other hand, if the link validity information indicates "valid," the process proceeds to step ST307 where it is determined whether or not the pass link record, which has been retrieved at step ST304, corresponds to the node/link data record, which has been retrieved at step ST306. Therefore, the route corresponding to alternative links may be displayed instead of the original link.

As similar to the first embodiment, by means of the reception status, i.e., the acquisition status of each update instruction data set corresponding to the necessary region, the update status of each of the route planning data frame and the display-related data frame for the necessary region in the map data processing apparatus a1 can be distinguished. There may be four statuses as follows:

In the first status, both of the route planning data frame and the display-related data frame for the necessary region have been updated in the map data processing apparatus a1. In accordance with the update instruction data set, the map data processing apparatus a1 has generated a route planning data frame, e.g., shown in FIG. 21 and a road data frame, e.g., shown in FIG. 40, and has stored them in the map data storage unit of the update instruction data storage 5. In this case, ranges "A" and "B" of display-related link identification numbers, which are used at step ST307, indicate the display-related link identification numbers of the updated frames. Therefore, on the basis of the updated route planning data frame and display-related data frame, an optimal route may be displayed properly. The resulting optimal route is shown in FIG. 37B, in a manner that the optimal route links are superimposed on the altered network of roads In the second status, while the route planning data frame for the necessary region has been updated, the display-related data frame has not been updated. For example, an updated route planning data frame in FIG. 21 and an old version road data frame in FIG. 10 have been stored in the map data storage unit of the update instruction data storage 5. In this case, range "A" of display-related link identification numbers has been also updated while range "B" has not been updated (relates to the old version). However, since it is possible to recognize the relationship between the previous range of display-related link identification numbers and the updated range of display-related link identification numbers, an optimal route can be presented properly on the basis of the updated route planning data frame and the previous display-related data frame. The resulting optimal route is shown in FIG. 37A, in a manner that the optimal route links are superimposed on the original network of roads.

In the third status, while the route planning data frame for the necessary region has not been updated, the display-related data frame has been updated. For example, an old version of planning data frame in FIG. 13 and an updated road data frame in FIG. 40 have been stored in the map data storage unit of the update instruction data storage 5. In this case, range "A" of display-related link identification numbers has not been updated while range "B" has been updated. However, since it is possible to recognize the relationship between the previous range of display-related link identification numbers and the updated range of display-related link identification numbers, an optimal route can be presented properly on the basis of the previous route planning data frame and the updated display-related data frame. The resulting optimal route is shown in FIG. 37B, in a manner that the optimal route links are superimposed on the altered network of roads.

In the fourth status, neither the route planning data frame nor the display-related data frame for the necessary region has been updated. For example, an old version of route planning data frame in FIG. 13 and an old version road data frame in FIG. 10 have been stored in the map data storage unit of the update instruction data storage 5. In this case, ranges "A" or "B" of display-related link identification numbers have not been updated. Therefore, an optimal route can be presented properly on the basis of the previous route planning data frame and the previous display-related data frame. The resulting optimal route is shown in FIG. 37A, in a manner that the optimal route links are superimposed on the original network of roads.

As will be understood from the above description, in accordance with the second embodiment, the data architecture of map data comprises a road data part (road data frame) for map presentation that includes node/link data records, wherein each node/link data record contains the display-related link identification information indicative of links corresponding to actual road parts, the link validity information indicating that original links are invalid for map presentation when the original links have been replaced with alternative links, and interconnection information (intersection descriptions) indicating the interconnection between the original link and the multilinks of alternative links. Accordingly, a map data processing apparatus, such as a computer, logical circuit, or a combination thereof can recognize the relationship between the original link and the alternative links (see FIGS. 38, 41, and 42).

The data architecture of map data also comprises a route planning data part (route planning data frame) for route planning that includes the display-related link identification information (corresponding display-related link identification information) indicative of the original links and the auxiliary display-related link identification information (corresponding auxiliary display-related link identification information) used for indicating alternative links, wherein the display-related link identification information for each original link and the auxiliary display-related link identification information for its alternative links are associated with each other, whereby the map data processing apparatus can recognize the relationship between the original link and the alternative links (see FIGS. 14, 22, and 23).

Therefore, although a map data processing apparatus a1 possesses an old version of road data frame and the latest version of route planning data frame, the map data processing apparatus a1 can display an optimal route obtained from the latest version of route planning data frame, using the display-related link identification information in the old version of road data frame, so that the optimal route links are superimposed on the original network of roads. Conversely, if a map data processing apparatus a1 possesses the latest version of road data frame and an old version of route planning data frame, the map data processing apparatus a1 can display an optimal route obtained from the old version of route planning data frame. In this route presentation, the map data processing apparatus a1 ignores node/link data records in the latest version of road data frame corresponding to the invalid original links, and uses intersection descriptions in node/link data records corresponding to valid links. In this case, the optimal route links are superimposed on the altered network of roads. Accordingly, the map data processing apparatus a1 can display an optimal route properly although only one of those data frames has been updated.

In accordance with the data architecture of map data according to the present embodiment, when an original link indicative of an existing road part has been divided into a plurality of alternative links, the node/link data record for the original link is modified to indicate "invalid" while a multilink data record indicated of the multilink of the alternative links is added. Therefore, the division of the original link does not involve adding a new node/link data record into the existing multilink data record corresponding to the original link, or reallocating the node/link data numbers to all node/link data records in the existing multilink data record. Thus, node/link data numbers, which are indicated by intersection descriptions in other multilink data records corresponding to unchanged links, are not changed. Therefore, it is possible for the map data processing apparatus a1 to lessen the amount of data to be processed, and to shorten the time for the updating process.

Furthermore, in the data architecture of the update instruction data set for updating the road data frame, update-operation record OPDS2, which instructs the map data processing apparatus (computer, logical circuit, or a combination thereof) to update node/link data record NLR03 (FIGS. 38 and 41) indicating original link Ld3, includes an instruction for rewriting the link validity information so as to indicate that original link Ld3 is invalid for map presentation, and another instruction for rewriting the intersection description so as to indicate that original link Ld3 intersects alternative links Ld3' and Ld3". Update-operation record OPDS4, which instructs the apparatus to add node/link data records NLR70S through NLR72S indicative of alternative links Ld3' and Ld3", includes instructions for causing node/link data records NLR70S through NLR72S to have link validity information indicating that alternative links Ld3' and Ld3" are valid for map presentation, and the intersection descriptions indicating that the alternative links Ld3' and Ld3" intersect original link Ld3. Therefore, upon receiving the update instruction data set, the map data processing apparatus a1 can update the corresponding records in the road data frame automatically in compliance with the designations in the update-operation records.

In the data architecture of update instruction data set according to the present embodiment, each update-operation record informs the map data processing apparatus (computer, logical circuit, or a combination thereof) of the type of data to be updated and the position of updated subject. Therefore, in order that the map data processing apparatus a1 achieve updating, the apparatus requires only one or more new effective subjects, such as the multilink header, node/link data record, node record, and/or connection record, which should be introduced into the map data, in addition to the above information. Accordingly, the size of the update instruction data set may be minimized.

Although not illustrated, if another process, such as the above-mentioned map matching process with the road data frame, is executed as the navigation process, it is preferable that the map data processing apparatus ignores node/link data records of which link validity information fields indicate "invalid", and uses only node/link data records corresponding to valid links. The map data processing apparatus a1 may conduct the process properly.

Third Embodiment

Next, a third embodiment of the present invention will be described. The third embodiment relates to an update instruction data set to be transmitted to the requesting map data processing apparatus a1 from the map data providing apparatus a2 for executing an updating process in the map data processing apparatus a1. This embodiment uses the data architecture of map data according to any of the first and second embodiments. Therefore, the map data processing apparatuses a1 and the map data providing apparatus a2 shown in FIGS. 1 through 3 are also used in the third embodiment. The function of each structural element of the map data processing apparatuses a1 and map data providing apparatus a2 in the third embodiment is essentially equivalent to that in the first or second embodiment. In addition, the map data architecture used in the map data processing apparatus a1 is essentially equivalent to that in the first or second embodiment (FIG. 4).

The embodiment will be described in conjunction with the maps represented in FIGS. 5 through 9 as similar to the first embodiment. Consequently, the map data storage 4 of the map data processing apparatus a1 stores old versions of the display-related data frame and the route planning-related data frame of map data that include the road data frame in FIG. 10 and the route planning data frame in FIG. 13, respectively. Let us assume that the latest version of road data frame may be any of the frames illustrated in FIG. 18 (as similar to the first embodiment) or FIG. 40 (as similar to the second embodiment), and the latest version of route planning data frame is shown in FIG. 21.

Next, a method for updating the map data by each map data processing apparatus a1 will be described. In the same manner as the first or second embodiment, the update instruction data storage 11 of the map data providing apparatus a2 (see FIG. 3) stores the update instruction database of which the contents are shown in FIG. 24. Whenever the map data supplier adds an update instruction data set to the update instruction database, he introduces a change necessary due to the addition in the total version number management information.

As similar to the first or second embodiment, each version-related data set in the update instruction database includes update instruction data sets, each of which is produced for updating the display-related data frame or the route planning-related data frame. The update instruction data set for the display-related data frame causes the processor 6 of the map data processing apparatus a1 to revise the old version of the road data frame in FIG. 10 to the latest version in FIG. 18 or 40. On the other hand, the update instruction data for the route planning-related data frame causes the processor 6 of the map data processing apparatus a1 to revise the old version of the route planning data frame in FIG. 13 to the latest version in FIG. 21.

Figure 46:
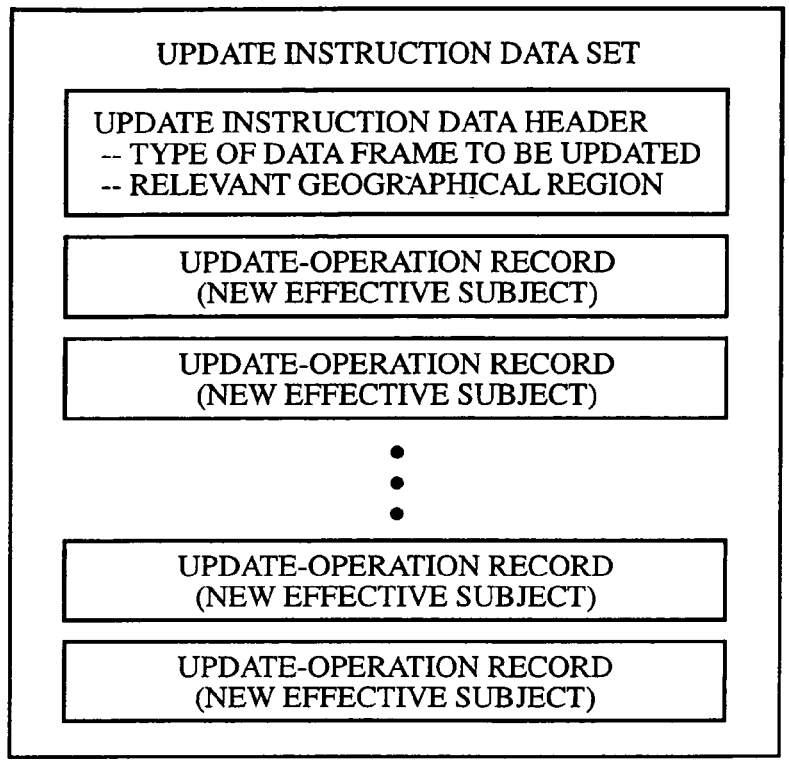
FIG. 46 is a diagram showing an example of data architecture of update instruction data set according to the third embodiment of the present invention.

FIG. 46 shows an example of data architecture of update instruction data set stored in the update instruction data storage 11 according to the third embodiment. Differently from the update instruction data set shown in FIG. 25, the update instruction data set shown in FIG. 46 contains as update-operation records, new effective subjects, which constitute the latest version of a data frame. The new effective subjects will be substituted for an old version of, but the same type of data frame in the map data processing apparatus a1. The type and the version of the update-operation records are designated at the update instruction data header.

As similar to the first embodiment, the update instruction data header indicates the type of data frame (management data frame, display-related data frame, route planning-related data frame, or the like as shown in FIG. 4) to be updated, the version of data frame to be updated, and relevant geographical region or area corresponding to the data frame to be updated. It is possible that the update instruction data set includes a single update-operation record that contains an entire up-to-date data frame. Alternatively, it is possible that the update instruction data set includes a plurality of update-operation records, each containing new effective subjects resulting from a segmentation of an up-todate data frame. The payload, i.e., up-to-date data frame or the segments thereof may have been compressed.

Upon receiving the update instruction data set, the processor 6 of the map data processing apparatus a1 analyzes the type and version indicated at the update instruction data header, and then replaces the data frame, of which the type and version coincides with the indications at the update instruction data header, by the up-to-date data frame contained in the update instruction data set. If the up-to-date data frame transported has been segmentized or compressed, the map data processing apparatus a1 may restore the contents of the update-operation record(s) to the complete up-to-date data frame, and then replaces the data frame, of which the type and version coincides with the indications at the update instruction data header, by the restored up-to-date data frame.

As similar to the first or second embodiment, in response to an update instruction data request from any of map data processing apparatuses a1, the map data providing apparatus a2 sends the map data processing apparatus a1 the requested update instruction data set for the display-related data frame or the route planning-related data frame separately, as shown in FIG. 28, in the third embodiment.

However, at step ST102 in FIG. 28, the map data providing apparatus a2 retrieves an update instruction data set from the version-related data set stored in update instruction database of the update instruction data storage 11, and transmits at step ST103 the update instruction data set to the map data processing apparatus a1, which has issued the request. For example, when a map data processing apparatus a1, which stores the road data frame in FIG. 10A and the route planning data frame in FIG. 13 in the map data storage 4, has make a request for update instruction data for the display-related data frame and the route planning-related data frame, the map data providing apparatus a2 sends update instruction data sets that includes the display-related data frame having the road data frame in FIG. 18 or 40 and the route planning-related data frame having the route planning data frame in FIG. 21, respectively.

Figure 47:
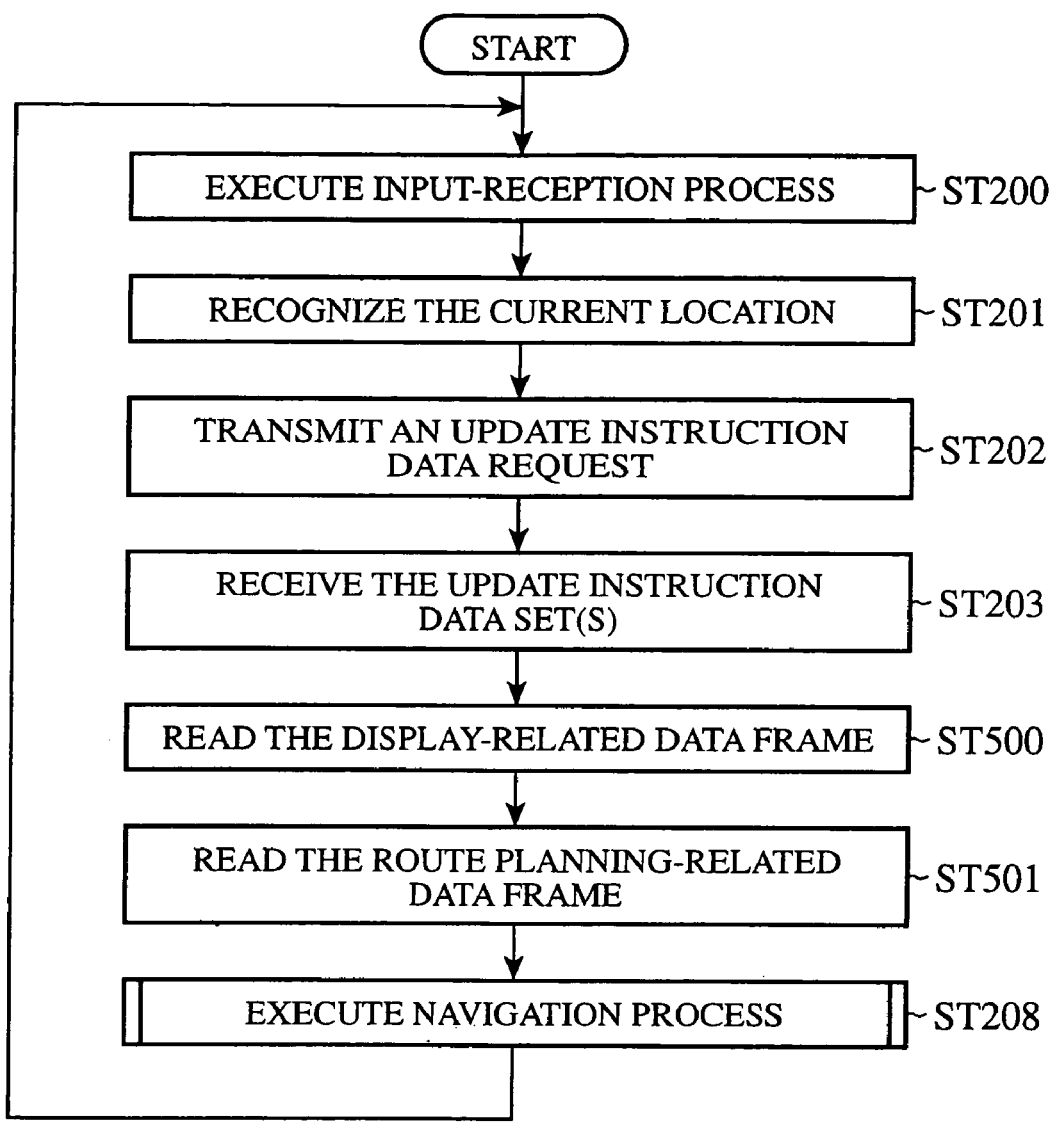
FIG. 47 is a flowchart showing an operation of the map data processing apparatus according to the third embodiment of the present invention.

FIG. 47 is a flowchart showing an operation of the processor 6 the map data processing apparatus a1 according to the third embodiment of the present invention. The flowchart of FIG. 47 is different from the flowchart of FIG. 29 in that steps ST204 through 207 are replaced by steps ST500 and ST501. However, the other steps are the same as those in the first embodiment.

An operation of the map data processing apparatus will be described. As similar to the first embodiment, let us assume that the road data frame and the route planning data frame shown in FIGS. 18 and 21 belong to the latest version of the map data stored in the map data providing apparatus a2 while the map data processing apparatus a1 issuing an update instruction data request stores the road data frame and the route planning data frame shown in FIGS. 10A and 13.

At step ST203, using the transceiver 3, the processor 6 receives update instruction data sets, which contains the display-related data frame having the road data frame in FIG. 18 and the route planning-related data frame having the route planning data frame in FIG. 21, respectively. The processor 6 then stores the update instruction data sets, which have been received via the transceiver 3, into the update instruction data storage unit in the update instruction data storage 5. Therefore, when alternative links have been defined in the map data updated in the map data providing apparatus a2, the map data processing apparatus a1 can obtain data frame including node/link data records for alternative links, which include display-related link identification information related to the original link and auxiliary display-related link identification information related to alternative links, such as node/link data records NLR03' and NLR04I of multilink data record MR0' in FIG. 19.

When an update instruction data set has been successfully acquired at the receiving step, the processor 6 stores the update instruction data set in the update instruction data storage unit of the update instruction data storage 5 (FIG. 30), and registers an update instruction data management record on the update instruction data management data set, wherein the update instruction data management record describes the storage position, the size and the acquisition status of the update instruction data set, and wherein the acquisition status designates that the acquisition has been done. On the other hand, if an update instruction data set fails to be received for problems, such as an obstruction to communication, the processor 6 produces another data set having the same contents as the update instruction data header of the requested update instruction data set. Then, the processor 6 stores this data set as the update instruction data set in the update instruction data storage unit of the update instruction data storage 5, and registers an update instruction data management record on this data set, wherein the update instruction data management record describes the storage position and the size of this data set, and wherein the acquisition status designates that the acquisition has not been done.

At step ST500, the processor 6 obtains or reads from the update instruction data storage 5 or the map data storage 4 the updated or non-updated display-related data frame. More specifically, the processor 6 first retrieves from the update instruction data storage unit of the update instruction data storage 5 the update instruction data management record relevant to the update instruction data set for the display-related data frame, which corresponds to the region or area where the user needs the navigation process. The processor 6 examines this acquisition status in the update instruction data management record relevant to the update instruction data set for the display-related data frame related to the region, which has been decided at step ST202.

If the acquisition status indicates that the acquisition has been done, the processor 6 retrieves from the update instruction data storage unit of the update instruction data storage 5 the updated display-related data frame contained in the update instruction data set, and then stores the updated display-related data frame to the map data storage unit in the update instruction data storage 5 (FIG. 31). On the other hand, if the acquisition status relevant to the update instruction data indicates that the acquisition has not been done, the processor 6 retrieves the old version of the display-related data frame related to the region from the map data storage 4, and stores it to the map data storage unit in the update instruction data storage 5. Therefore, only the map data processing apparatus a1, which has successfully received the update instruction data set for display-related data frame, can update the display-related data frame in accordance with the update instruction data set.

At step ST501, the processor 6 obtains or reads from the update instruction data storage 5 or the map data storage 4 the updated or non-updated route planning-related data frame. More specifically, the processor 6 first retrieves from the update instruction data storage unit of the update instruction data storage 5 the update instruction data management record relevant to the update instruction data set for the route planning-related data frame, which corresponds to the region or area where the user needs the navigation process.

The processor 6 examines this acquisition status in the update instruction data management record relevant to the update instruction data set for the route planning-related data frame related to the region, which has been decided at step ST202.

If the acquisition status indicates that the acquisition has been done, the processor 6 retrieves from the update instruction data storage unit of the update instruction data storage 5 the updated route planning-related data frame contained in the update instruction data set, and then stores the updated route planning-related data frame to the map data storage unit in the update instruction data storage 5 (FIG. 31). On the other hand, if the acquisition status relevant to the update instruction data indicates that the acquisition has not been done, the processor 6 retrieves the old version of the route planning-related data frame related to the region from the map data storage 4, and stores it to the map data storage unit in the update instruction data storage 5. Therefore, only the map data processing apparatus a1, which has successfully received the update instruction data set for route planning-related data frame, can update the route planning-related data frame in accordance with the update instruction data set.

In accordance with the above-described operation of the third embodiment, the map data processing apparatus a1 can update the map data automatically and readily without updating elements point by point. In addition, by virtue of the data architecture of map data according to the first or second embodiment, although the display-related data frame and the route planning-related data frame are of different versions, the map data processing apparatus a1 can display an optimal route including alternative links properly.

Fourth Embodiment

Next, a fourth embodiment of the present invention will be described. According to the fourth embodiment, a map data processing apparatus a1 detects a newly constructed road and produces an update instruction data set for causing the map data processing apparatus a1 itself to update the map data. This embodiment uses the data architecture of map data according to any of the first and second embodiments. The map data processing apparatuses a1 and the map data providing apparatus a2 shown in FIGS. 1 through 3 are also used in the fourth embodiment. The function of each structural element of the map data processing apparatuses a1 and map data providing apparatus a2 in the fourth embodiment is essentially equivalent to that in the first or second embodiment. In addition, the map data architecture used in the map data processing apparatus a1 is essentially equivalent to that in the first or second embodiment (FIG. 4). As similar to the first or second embodiment, in response to an update instruction data request from any of map data processing apparatuses a1, the map data providing apparatus a2 sends the map data processing apparatus a1 the requested update instruction data set for the display-related data frame or the route planning-related data frame separately, as shown in FIG. 28.

However, according to the fourth embodiment, the update instruction data storage 5 of the map data processing apparatus a1 includes a track storage unit and an update instruction data temporary storage unit. The track storage unit stores track information that indicates the transit of the position of the automobile, i.e., the map data processing apparatus a1. In addition, to the track storage unit and the update instruction data temporary storage unit, update instruction data storage 5 includes the above-described update instruction data storage unit and the map data storage unit.

Figure 48:
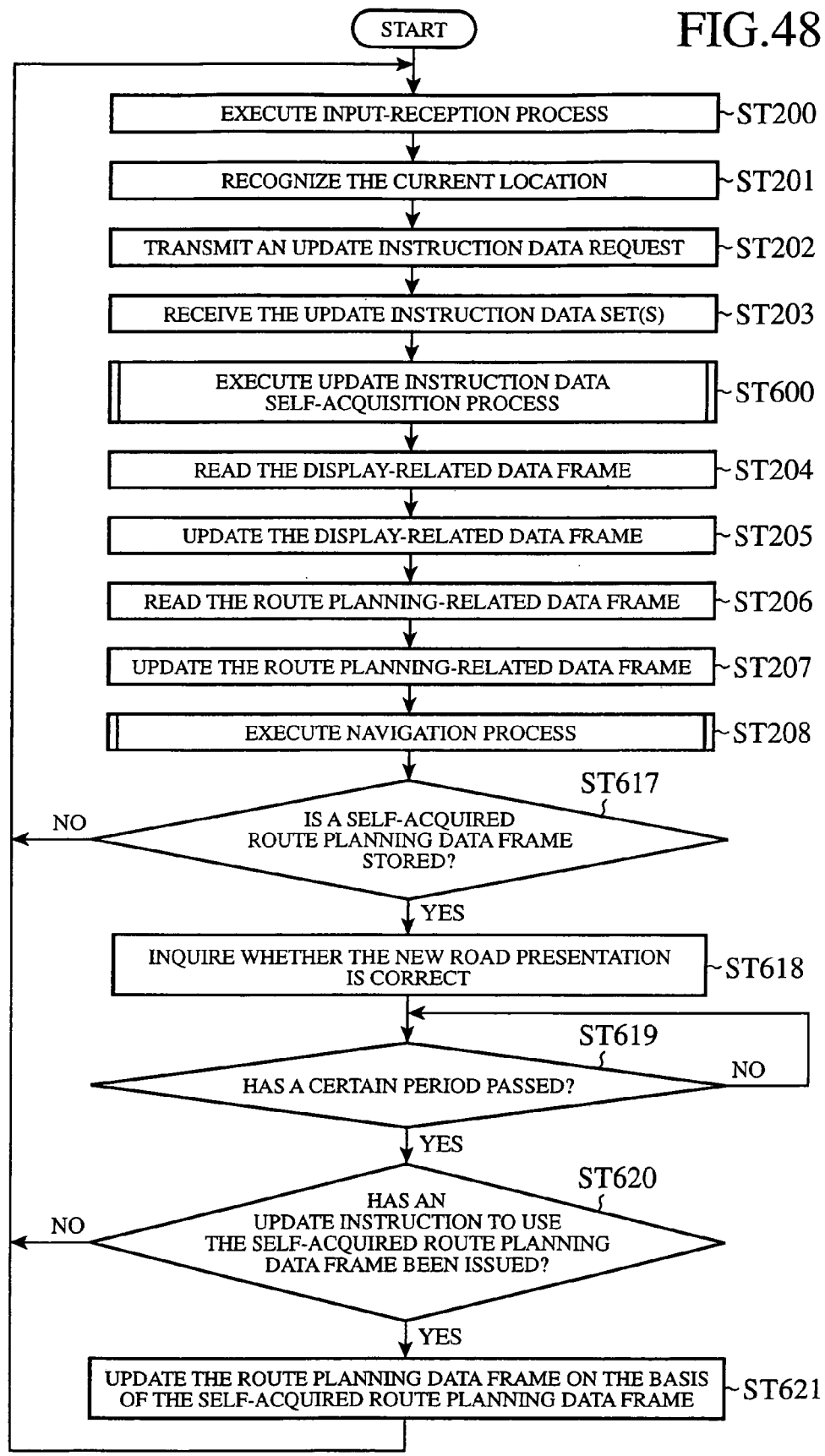
FIG. 48 is a flowchart showing an operation of the map data processing apparatus according to the fourth embodiment of the present invention.

FIG. 48 is a flowchart showing an operation of the processor 6 of the map data processing apparatus a1 according to the fourth embodiment of the present invention. The flowchart of FIG. 48 is similar to the flowchart of FIG. 29, but is different from that in that steps ST600 and ST617 through ST621 are added. After receiving the update instruction data set and storing it in the update instruction data storage 5 at step ST203, the process proceeds to an update instruction data-self-acquisition subroutine at step ST600.

Figure 49:
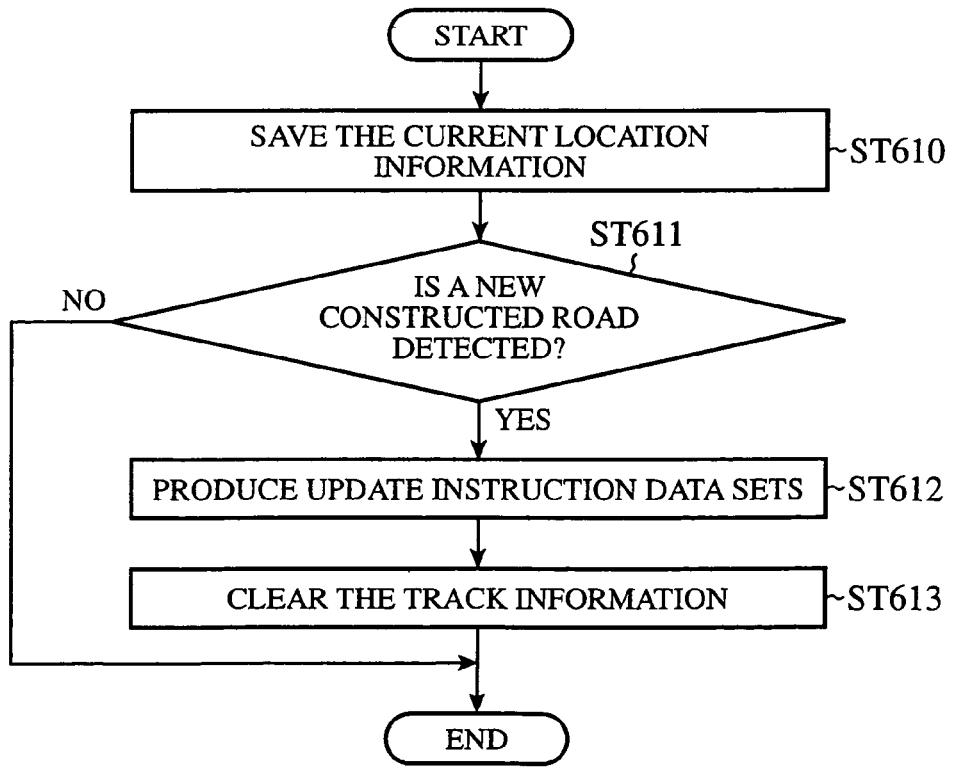
FIG. 49 is a flowchart showing an update instruction data-self-acquisition process in the map data processing apparatus according to the fourth embodiment of the present invention.

FIG. 49 is a flowchart showing in detail the update instruction data-self-acquisition subroutine. At step ST610, the processor 6 stores the current location information on the automobile, which has been recognized at step ST201, as a part of the track information into the track storage unit of the update instruction data storage 5.

At step ST611, the processor 6 determines whether or not a new constructed road is detected. Specifically, the track of the automobile designated in the track storage unit in the update instruction data storage 5 is compared with the intermediate point information on links contained in the road data frame stored in the map data storage 4. The shape of road indicated by the track does not coincide with any road shape indicated by the intermediate point information if the automobile has run through a new road. In practice, if it is determined that the automobile starts at a position on a link recorded in the road data frame and reaches a position on another link recorded in the road data frame without having passed expected intersections, the processor 6 determines that a new road is detected, and the process proceeds to step ST612. Otherwise, the update instruction data-self-acquisition subroutine ends. For example, if the automobile moves from the intermediate point in link Ld3 to the intermediate point in link Ld8 (FIG. 8), a new road (road 6 of FIG. 15) is detected.

At step ST613, the processor 6 produce update instruction data sets for adding data on the new road, which has been detected at step ST612, to the road data frame and the route planning data frame. The update instruction data set for the road data frame is stored in the update instruction data storage unit of the update instruction data storage 5 while the update instruction data set for the route planning data frame is stored in the update instruction data temporary storage unit of the update instruction data storage 5 temporarily. The data architecture of thus produced update instruction data sets is the same as that transported from the map data providing apparatus. For example, when road 6 of FIG. 15 has been detected as a new road, the processor 6 produces update instruction data sets that are the same as those in FIGS. 44 and 27 for accommodating to the alteration of network of roads from the state shown in FIGS. 8 and 9 to the state in FIGS. 17 and 39.

Furthermore, at step ST613, the track information in the update instruction data storage 5 is cleared for a further detection of a new road, and then the update instruction data-self-acquisition subroutine ends.

After completion of the update instruction data-self-acquisition subroutine (step ST600), the processor 6 revises the display-related data frame retrieved from the map data storage 4 in accordance with the update instruction data set, which is stored in the update instruction data storage unit of the update instruction data storage 5, for the road data frame of the display-related data frame, and stores the revised display-related data frame in the map data storage unit of the update instruction data storage 5 (steps ST204 and ST205).

Therefore, if a new road has been detected during the last update instruction data-self-acquisition subroutine, the display-related data frame is updated on the basis of the update instruction data set produced by the map data processing apparatus a1 itself. Otherwise, the display-related data frame is updated on the basis of the update instruction data set supplied from the map data providing apparatus a2.

Additionally, at steps ST206 and ST207, the processor 6 revises the route planning-related data frame retrieved from the map data storage 4 in accordance with the update instruction data set, which is stored in the update instruction data storage unit of the update instruction data storage 5, for the route planning-related data frame, and stores the revised route planning-related data frame in the map data storage unit of the update instruction data storage 5. Therefore, irrespective of detection of a new road during the last update instruction data-self-acquisition subroutine, the route planning-related data frame is updated on the basis of the update instruction data set supplied from the map data providing apparatus a2.

Then, an optimal route is displayed on the map on the display-screen image of the output device 7 at the navigation process subroutine of step ST208. If a new road has been detected during the last update instruction data-self-acquisition subroutine, the new road detected by the map data processing apparatus a1 itself is incorporated in the represented map. In this case, the new road detected by the map data processing apparatus a1 is not incorporated in the route planning-related data frame. However, it should be noted that although the apparatus a1 stores the display-related data frame and the route planning-related data frame being of different versions, the map and route can be presented properly on the basis of the principle described above.

The user of the map data processing apparatus a1 watching the displayed map can compare the displayed new road with the automobile's track in his recollection. After completion of navigation process at step ST208, if it is determined at step ST617 that the update instruction data temporary storage unit of the update instruction data storage 5 stores the self-acquired route planning data frame, the processor 6 at step ST618 inquires the user whether the new road presentation is correct or not, using the output device 7. Then, at step ST619, the processor 6 waits for the user's answer for a certain period, of which the length is sufficient for the user to confirm the presented new road. During the period, the user may input his answer with the input device 1. Only if the user answer that the new road is correct, the input device 1 provides the processor 6 with an instruction for updating the route planning data frame.

Next, at step ST620, the processor 6 determines whether or not the instruction for updating the route planning data frame has been issued from the input device 1. If the instruction for updating the route planning data frame has been issued, the process proceeds to step ST621. Otherwise, the process returns to step ST200.

At step ST621, the route planning data frame is updated on the basis of the self-acquired route planning data frame. More specifically, the update instruction data set for route planning data frame stored temporarily in the update instruction data temporary storage unit of the update instruction data storage 5 is recorded in the update instruction data storage unit of the update instruction data storage 5. This will result in that the route planning-related data frame will be replaced at next steps ST206 and ST207 with the self-acquired route planning data frame produced at the input device 1 due to the detection of the new road. Accordingly, the update instruction data storage unit stores the display-related data frame and the route planning-related data frame being of the same version.

As described above, according to the fourth embodiment, each map data processing apparatus a1 can produce update instruction data sets for itself, thereby updating the road data frame and the route planning data frame. In addition, by virtue of the data architecture of map data according to the first or second embodiment, although only the up-to-date road data frame has been stored in the map data processing apparatus a1 on the basis of the self-acquired update instruction data set produced at the map data processing apparatus a1, the map data processing apparatus a1 can display an optimal route including alternative links properly. Furthermore, by virtue of the data architecture of update instruction data set according to the first or second embodiment, the map data processing apparatus a1 may update corresponding records automatically in compliance with the designations in the update-operation records.

Even in the present embodiment, it is possible to use the data architecture of map data according to the second embodiment. In this case, it is not necessary to update any multilink data records for multilinks of which corresponding roads have not been altered. Therefore, the amount of data to be processed is small, so that even a map data processing apparatus with a low throughput capacity can produce the update instruction data sets. It is possible to lessen the amount of data to be processed, and to shorten the time for updating data frames even for a map data processing apparatus with a low throughput capacity.

While the present invention has been particularly shown and described with references to preferred embodiments thereof, it will be understood by those skilled in the art that various changes in form and details may be made therein without departing from the spirit and scope of the invention as defined by the claims. Such variations, alterations, and modifications are intended to be encompassed in the scope of the present invention.

Hereinafter, examples of variations, alterations, and modifications will be described.

In the above description with regard to the first through fourth embodiments, an original link is replaced with two alternative links. However, an original link may be replaced with three or more alternative links.

In the above description with the first through fourth embodiments, the shape of a road indicated by a multilink including alternative links is the same as that indicated by their original link. However, the shape of a road indicated by alternative links may be different from that indicated by their original link. For example, in a real situation, when a new road is constructed, the shapes of other roads connected with the new road are frequently altered, whereby the alternative links do not coincide with their original link. In such a case, the coordinates of either or both of terminals and/or intermediate points of the alternative links are also changed, so that it is preferable that the update instruction data sets contain instructions for rewriting information on such coordinates, whereby the map data processing apparatus a1 can update the map data appropriately.

In the first through fourth embodiments, whenever the current location is recognized, the map data processing apparatus a1 sends the update instruction data request to the map data providing apparatus a2 as shown in FIG. 29. However, it is not intended to limit the scope of the present invention to the embodiments. Rather, it is possible to choose the schedule of transmission of the update instruction data request, optionally depending on usage. For example, the map data processing apparatus a1 may inquire the map data providing apparatus a2 whether or not there is a new version of data frame in advance to the transmission of the request, and may send the update instruction data request to the map data providing apparatus a2 if there is the data frame to be updated at the apparatus a1.

In the first through fourth embodiments, the map data processing apparatus a1 records the updated map data into the update instruction data storage 5. However, the updated map data may be stored in the map data storage 4 for overwriting the old version.

In the first through fourth embodiments, update instruction data sets are transported from the map data providing apparatus a2 via communication means, but it is not intended to limit the method for distributing the update instruction data to communications. Rather, various removable storage media, for example, memory cards or discs, may be used.

In the above-described embodiments, the map data processing apparatus a1 is a car navigation system mounted on an automobile. However, it is not intended to limit the scope of the present invention to the embodiments. Rather, the map data processing apparatus a1 may be situated on another mobile processor, e.g., a mobile phone or a personal digital assistance. Alternatively, the map data processing apparatus a1 may be a fixed computer terminal. In these alternative embodiment, location detector 2 may be included where the map data processing apparatus a1 is a mobile processor, but the location detector 2 may be excluded where the map data processing apparatus a1 is a fixed terminal.

In addition, the spirit of the present invention can be utilized for other types of map data architecture, e.g., a hierarchical map data architecture including layers of road map data frames having different contraction scales; one data frame describes arterial roads, and another data frame describes secondary roads in addition to the arterial roads. In this map data structure, if only one of the road map data frames is updated, there is likelihood that a new arterial road is presented on the basis of the updated data frame while it is not presented on the basis of the non-updated data frame. However, even in this modification, original links and alternative links may be associated with each other according to the present invention, so as to eliminate the inconsistency between the displayed images due to difference between the latest version and the old version.

What is claimed is:

1. A computer-readable storage medium storing a data architecture of map data comprising:

a plurality of node/link data items designating a plurality of links, respectively, each of links corresponding to a specific part of a road constituting in an actual road network, each node/link data item including: link identification information identifying the corresponding link; link validity information identifying whether the corresponding link is valid or invalid; and interconnection information for indicating interconnections between the corresponding link and other links, wherein for instances in which the corresponding link is an original link replaced by a plurality of alternative links in the map data, the link validity information identifies that the corresponding link is invalid, and the interconnection information indicates that the original link is associated with the alternative links, whereby a map data processing apparatus recognizes a relationship between the original link and the alternative links and updates the map data individually for each link based on said node/link data.

2. A method of designating instructions to a map data processing apparatus for updating map data having the data architecture according to claim 1, comprising:

providing first update-operation information for causing the map data processing apparatus to modify the node/link data item corresponding to the original link; and providing second update-operation information for causing the map data processing apparatus to add new node/link data items to the map data, the new node/link data items concerning alternative links which substitute for any of original links in the map data, wherein the first update-operation information designating an instruction to rewrite the corresponding link validity information so that the link validity information identifies that the corresponding original link is invalid, and another instruction to rewrite the corresponding interconnection information indicates that the corresponding original link is associated with the alternative links, and wherein the second update-operation information causing causes the corresponding new node/link data items to include link validity information identifying that the corresponding alternative links are valid, and interconnection information indicating that the corresponding alternative links are associated with the original link.

3. A map data processing apparatus comprising:

a storage unit for storing map data having a plurality of node/link data items designating a plurality of links, respectively, each of links corresponding to a specific part of a road of an actual road network, each node/link data item including: link identification information identifying the corresponding link; link validity information identifying whether the corresponding link is valid or invalid; and interconnection information for indicating interconnections between the corresponding link and other links, wherein for instances in which the corresponding link is an original link replaced by a plurality of alternative links in the map data, the link validity information identifies that the corresponding link is invalid, and the interconnection information indicates that the original link is associated with the alternative links, whereby the map data processing apparatus recognizes a relationship between the original link and the alternative links;

a receiving unit for receiving update instruction data including providing first update-operation information for causing the map data processing apparatus to modify individually the node/link data item corresponding to the original link; and providing second update-operation information for causing the map data processing apparatus to add individually new node/link data items to the map data, the new node/link data items concerning alternative links which substitute for any of original links in the map data, wherein the first update-operation information designates an instruction to rewrite the corresponding link validity information so that the link validity information identifies that the corresponding original link is invalid, and another instruction to rewrite the corresponding interconnection information to indicate that the corresponding original link is associated with the alternative links, and wherein the second update-operation information causes the corresponding new node/link data items include link validity information identifying that the corresponding alternative links are valid, and interconnection information indicating that the corresponding alternative links are associated with the original link and designating instructions to the map data processing apparatus for updating the map data; and an update processor for updating the map data in accordance with the update instruction data.

4. A map data providing apparatus comprising:

an update instruction data storage storing update instruction data including first update-operation information for causing the map data processing apparatus to individually modify the node/link data item corresponding to the original link; and second update-operation information for causing the map data processing apparatus to individually add new node/link data items to the map data, the new node/link data items concerning alternative links which substitute for any of original links in the map data, wherein the first update-operation information designates an instruction to rewrite the corresponding link validity information so that the link validity information identifies that the corresponding original link is invalid, and another instruction to rewrite the corresponding interconnection information indicates that the corresponding original link is associated with the alternative links, and wherein the second update-operation information causes the corresponding new node/link data items to include link validity information identifying that the corresponding alternative links are valid, and interconnection information indicating that the corresponding alternative links are associated with the original link and designating instructions to a map data processing apparatus for updating map data, data; and a transmitter for sending the update instruction data to the map data processing apparatus.

5. A computer-readable storage medium in which map data is stored, the map data including a plurality of node/link data items, each node/link data item designating a node and a link corresponding to the node, the link corresponding to a road segment of an actual road network, the node representing an interconnection point between road segments, the map data comprising:

an original node/link data item representing an original node and an original link, the original link corresponding to the road segment of an original actual road network, the original node corresponding to the interconnection point of the original actual road network;

an new node/link data item representing an alternative node and an alternative link, the alternative link corresponding to the road segment of a new actual road network, the alternative node and the alternative link substituting for the original link and the original node, respectively;

the original node/link data item comprising:

link validity information identifying that the original link is invalid; and interconnection information representing a relationship between the original node and the alternative node;

the new node/link data item comprising:

link validity intimation identifying that the alternative link is valid; and interconnection information representing a relationship between the new node and another node connected to the original node;

wherein a map processing apparatus processes the map data representing the new actual road network based on the original node/link data item and the new node/link data item.

6. A computer-readable storage medium in which update instruction data is stored, the update instruction data designating instructions to a map data processing apparatus for updating map data, the map data including a plurality of node/link data items, each node/link data item designating a node and a link corresponding to the node, the link corresponding to a road segment of an actual road network, the node representing an interconnection point between road segments, wherein one of the node/link data items is original node/link data item representing an original node and an original link, the original link corresponding to the road segment of an original actual road network, the original node corresponding to an interconnection point of the original actual road network, wherein the original node/link data item includes link validity information identifying whether the original link is valid or invalid, and interconnection information representing a relationship between the original node and another node corresponding to another link, the update instruction data comprising:

first update-operation information for causing the map data processing apparatus to modify individually the original node/link data item; and second update-operation information for causing the map data processing apparatus to add individually new node/link data item corresponding to an alternative link which substitutes for the original link, wherein the first update-operation information designates an instruction to set the link validity information so that the link validity information identifies that the original link is invalid, and another instruction to set the interconnection information to indicate that the original node is associated with the alternative node, and wherein the second update-operation information causes the new node/link data item to include link validity information identifying that the alternative link is valid, and interconnection information indicating that the alternative node is associated with the another node.

7. A map data providing apparatus comprising:

an accessing unit for accessing the update instruction data from the storage medium according to claim 6;

a designating unit for designating an instruction to a map data processing apparatus for updating the map data.

8. The map data providing apparatus according to claim 7 further comprising:

a transmitter for transmitting the update instruction data to the map data processing apparatus.

9. A map data processing apparatus comprising:

an accessing unit for accessing a storage medium having map data including a plurality of node/link data items, each node/link data item of designating a node and a link corresponding to the node, the link corresponding to a road segment of an actual road network, the node representing an interconnection point between road segments;

a receiving unit for receiving the update instruction data transmitted by the map data providing apparatus according to claim 8; and an updating unit for updating the map data based on the update instruction data received by the receiving unit.

10. A map data updating method for updating map data including a plurality of node/link data items, each node/link data item designating a node and a link corresponding to the node, the link corresponding to a road segment of an actual road network, the node representing an interconnection point between road segments, wherein one of the node/link data items is original node/link data item representing an original node and an original link, the original link corresponding to a road segment of an original actual road network, the original node corresponding to an interconnection point of the original actual road network, wherein the original node/link data item includes link validity information identifying whether the original link is valid or invalid, and interconnection information representing a relationship between the original node and another node corresponding to another link, the method comprising steps of:

receiving update instruction data including first update-operation information for modifying individually the original node/link data item, and second update-operation information for adding individually new node/link data item corresponding to an alternative link which substitutes for the original link and corresponds to a new actual road network, and setting the link validity information of the original node/link data item invalid, modifying the interconnection information so that the interconnection information represents a relationship between the original node and alternative node designated by the new node/link data item.

* * * * *

UNITED STATES PATENT AND TRADEMARK OFFICE
CERTIFICATE OF CORRECTION

PATENT NO. : 7,330,788 B2  
APPLICATION NO. : 11/331094  
DATED : February 12, 2008  
INVENTOR(S) : Makoto Mikuriya et al.

Page 1 of 1

It is certified that error appears in the above-identified patent and that said Letters Patent is hereby corrected as shown below:

In Claim 5, Column 51, Line 62

The line reading "link validity intimation identifying"

should read

--link validity information identifying--

Signed and Sealed this

Twenty-ninth Day of July, 2008

JON W. DUDAS  
*Director of the United States Patent and Trademark Office*